United States Patent
Yoshizawa et al.

(10) Patent No.: US 9,411,673 B2
(45) Date of Patent: Aug. 9, 2016

(54) MANAGEMENT SERVER, MANAGEMENT SYSTEM, AND MANAGEMENT METHOD

(75) Inventors: Masahiro Yoshizawa, Tokyo (JP);
Masayuki Oyamatsu, Tokyo (JP);
Tatsuya Sato, Tokyo (JP)

(73) Assignee: Hitachi, Ltd., Tokyo (JP)

(*) Notice: Subject to any disclaimer, the term of this patent is extended or adjusted under 35 U.S.C. 154(b) by 162 days.

(21) Appl. No.: 14/353,223

(22) PCT Filed: Dec. 26, 2011

(86) PCT No.: PCT/JP2011/080071
§ 371 (c)(1),
(2), (4) Date: Apr. 21, 2014

(87) PCT Pub. No.: WO2013/098915
PCT Pub. Date: Jul. 4, 2013

(65) Prior Publication Data
US 2014/0281760 A1   Sep. 18, 2014

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/0787* (2013.01); *G06F 11/0709* (2013.01); *G06F 11/3065* (2013.01); *G06F 11/3476* (2013.01)

(58) Field of Classification Search
CPC .................................................... G06F 11/065
IPC .................................................. G06F 11/0793
See application file for complete search history.

(56) References Cited

U.S. PATENT DOCUMENTS

| 6,721,898 B1 * | 4/2004 | Hasha | ...................... G06F 8/38 712/E9.084 |
| 7,197,561 B1 * | 3/2007 | Lovy | ................... H04L 41/0233 709/217 |
| 7,424,530 B2 * | 9/2008 | Chagoly | ............. G06F 11/3466 705/7.38 |
| 7,509,537 B1 * | 3/2009 | Jensen | ............... G05B 23/0229 714/47.2 |
| 7,689,857 B2 * | 3/2010 | Lewis | ................. H04L 41/0213 370/229 |

(Continued)

FOREIGN PATENT DOCUMENTS

| JP | 2009-110293 | 10/2010 |
| JP | 2010-224829 | 10/2010 |
| JP | 2011-108034 | 6/2011 |

OTHER PUBLICATIONS

International Search Report and Written Opinion on application PCT/JP2011/080071 mailed Mar. 6, 2012; 6 pages (with English translation of International Search Report).

*Primary Examiner* — Amine Riad
(74) *Attorney, Agent, or Firm* — Foley & Lardner LLP

(57) ABSTRACT

It is provided a management server is configured to store an access log including a monitoring subject ID, or a monitoring item ID when a request for outputting a historical data is inputted, an incident data including a time, a monitoring subject ID, or a monitoring item ID when an incident indicating a failure in the each of the devices; associate the incident data with the access log; update data included in the access log to a string of characters abstracted; generate an abstract access log; identify first abstract access log from the generated abstract access log based on the first incident data when a value indicating first incident data is inputted; identify a condition for the historical data to be outputted based on the first abstract access log and the first incident data; and output the identified condition for the historical data.

15 Claims, 29 Drawing Sheets

(56) References Cited

U.S. PATENT DOCUMENTS

| | | | | |
|---|---|---|---|---|
| 7,930,687 B2* | 4/2011 | Moorthy | G06F 9/4425 717/106 |
| 8,751,623 B2* | 6/2014 | Bose | H04L 41/50 709/223 |
| 2009/0249130 A1* | 10/2009 | Shimada | G06Q 10/10 714/48 |
| 2012/0216081 A1* | 8/2012 | Duvvoori | G06Q 10/06 714/48 |
| 2014/0325290 A1* | 10/2014 | Gutjahr | G06F 11/079 714/48 |
| 2015/0149826 A1* | 5/2015 | Anderson | G06F 11/3476 714/37 |
| 2015/0293801 A1* | 10/2015 | Kim | G06F 11/079 714/37 |
| 2015/0378865 A1* | 12/2015 | Robertson | G06F 11/3495 714/57 |
| 2016/0085655 A1* | 3/2016 | Ito | G06F 11/3065 702/186 |

* cited by examiner

| HISTORICAL DATA ID | GROUP ID | MONITORING SUBJECT ID | MONITORING ITEM ID | MEASURING TIME | VALUE | |
|---|---|---|---|---|---|---|
| 1 | A | host1 | CPU USAGE RATE OF OS | 2011-01-17 00:00:00 | 3.04 | 1011 |
| 2 | A | host1 | AVAILABLE MEMORY FOR OS | 2011-01-17 00:00:00 | 3,801,800 | 1012 |
| 3 | A | host1 | NUMBER OF ACTIVE SESSIONS OF WEB CONTAINER | 2011-01-17 00:00:00 | 12 | 1013 |
| 4 | A | host1 | NUMBER OF ACTIVE DB CONNECTIONS OF WEB CONTAINER | 2011-01-17 00:00:00 | 1 | 1014 |
| 5 | A | host1 | RESPONSE TIME OF WEB APPLICATION | 2011-01-17 00:00:00 | 1.193 | 1015 |
| 6 | A | host1 | CPU USAGE RATE OF OS | 2011-01-17 00:10:00 | 6.52 | 1016 |
| 7 | A | host1 | AVAILABLE MEMORY FOR OS | 2011-01-17 00:10:00 | 3,810,816 | 1017 |

HISTORICAL DATA 1000

*Fig. 4*

| SCREEN ID 1101 | GROUP ID 1102 | MONITORING SUBJECT ID 1103 | MONITORING ITEM ID 1104 | ABSTRACTION SCHEME 1105 | DISPLAY OF THRESHOLD 1106 | DISPLAY OF BASE LINE 1107 |
|---|---|---|---|---|---|---|
| 1 | A | host1 | CPU USAGE RATE OF OS | MAXIMUM VALUE | NONE | NONE |
| 1 | A | host2 | CPU USAGE RATE OF OS | MAXIMUM VALUE | NONE | NONE |
| 2 | A | host1 | AVAILABLE MEMORY FOR OS | MINIMUM VALUE | NONE | NONE |
| 2 | A | host1 | NUMBER OF ACTIVE SESSIONS OF WEB CONTAINER | AVERAGE VALUE | NONE | NONE |
| 3 | A | host1 | NUMBER OF ACTIVE DB CONNECTIONS OF WEB CONTAINER | MAXIMUM VALUE | YES (THRESHOLD OF 50) | NONE |
| 4 | A | host1 | RESPONSE TIME OF WEB APPLICATION | MAXIMUM VALUE | NONE | YES (DATA OF ONE WEEK AGO) |
| 5 | A | host1 | LOG OF WEB APPLICATION | NONE | NONE | NONE |

HISTORICAL DATA DISPLAY SETTING 1100

*Fig. 5*

| OPERATIONS MANAGER ID | PASSWORD | GROUP ID | |
|---|---|---|---|
| operator1 | abcdEfgh | A | 1211 |
| operator2 | ijklmnOpq | A | 1212 |
| operator3 | rstuvWx | B | 1213 |
| operator4 | yzabcdef | B | 1214 |
| operator5 | GhiJklmn | B | 1215 |

1201 1202 1203

OPERATIONS MANAGER DATA 1200

*Fig. 6*

| | 1301 | 1302 | 1303 | 1304 | 1305 | 1306 |
|---|---|---|---|---|---|---|
| | ACCESS LOG ID | INCIDENT ID | ACCESS TIME | GROUP ID | OPERATIONS MANAGER ID | SESSION ID |
| | 1 | | 2011-01-17 09:10:10 | A | operator1 | DADABABAEDDF |
| | 2 | | 2011-01-17 09:10:42 | A | operator1 | DADABABAEDDF |
| | 3 | | 2011-01-17 09:14:20 | A | operator1 | DADABABAEDDF |
| | 4 | | 2011-01-17 09:22:42 | A | operator1 | DADABABAEDDF |
| | 5 | | 2011-01-17 09:30:12 | A | operator2 | CDF123DFA94B |
| | 6 | | 2011-01-17 09:35:32 | A | operator2 | CDF123DFA94B |
| | 31 | 2 | 2011-01-20 09:03:09 | B | operator5 | ED93FD3212EC |
| | 32 | 2 | 2011-01-20 09:13:11 | B | operator5 | ED93FD3212EC |
| | 33 | 2 | 2011-01-20 09:20:12 | B | operator5 | ED93FD3212EC |
| | 34 | 2 | 2011-01-20 09:30:12 | B | operator5 | ED93FD3212EC |
| | 200 | 9 | 2011-01-22 11:30:11 | C | operator9 | F928D432GEDB |

| 1307 | 1308 | 1309 | 1310 | |
|---|---|---|---|---|
| MONITORING SUBJECT ID | MONITORING ITEM ID | DISPLAY PERIOD | REFINING CONDITION | |
| host1 | CPU USAGE RATE OF OS | 2011-01-17 | NONE | 1311 |
| switch1 | BAND USAGE RATE | 2011-01-17 | NONE | 1312 |
| host3 | CPU USAGE RATE OF OS | 2011-01-17 | NONE | 1313 |
| host1 | LOG OF WEB SERVER | 2011-01-17 | NONE | 1314 |
| host1 | NUMBER OF SESSIONS OF WEB SERVER | 2011-01-17 | NONE | 1315 |
| host1 | LOG OF WEB SERVER | 2011-01-17 | NONE | 1316 |
| host32 | CPU USAGE RATE OF OS | 2011-01-18 | NONE | 1317 |
| host33 | CPU USAGE RATE OF OS | 2011-01-18 | NONE | 1318 |
| host32 | LOG OF WEB SERVER | 2011-01-18 | NONE | 1319 |
| host32 | LOG OF WEB SERVER | 2011-01-18 12:51~13:51 | NONE | 1320 |
| host17 | LOG OF WEB SERVER | 2011-01-22 | SEARCH BY "upload data error" | 1321 |

ACCESS LOG 1300

*Fig. 7*

| 1401 | 1402 | 1403 | 1404 | 1405 | 1406 | 1407 |
|---|---|---|---|---|---|---|
| INCIDENT ID | GROUP ID | TYPE | MONITORING SUBJECT ID | MONITORING ITEM ID | CONTENT OF INCIDENT | DATE/TIME OF OCCURRENCE |
| 1 | A | CPU LOAD | host1 | CPU USAGE RATE OF OS | THRESHOLD(90%) CONTINUOUSLY EXCEEDED FOR 5 MINUTES | 2011-01-17 09:00:00 |
| 2 | B | CPU LOAD | host32 | CPU USAGE RATE OF OS | THRESHOLD(80%) CONTINUOUSLY EXCEEDED FOR 20 MINUTES | 2011-01-18 13:21:00 |
| ... | ... | ... | ... | ... | ... | ... |
| 9 | C | APPLICATION ERROR | host17 | LOG OF WEB APPLICATION B | ERROR "upload data error" OCCURRED | 2011-01-22 11:24:00 |
| 10 | D | CPU LOAD | host50 | CPU USAGE RATE OF OS | THRESHOLD(80%) CONTINUOUSLY EXCEEDED FOR 20 MINUTES | 2011-01-30 15:50:00 |

| 1408 | 1409 | 1410 | 1411 | 1412 | 1413 | 1414 | |
|---|---|---|---|---|---|---|---|
| PERSON IN CHARGE | STATUS | DATE/TIME OF SOLUTION | CAUSE | MONITORING SUBJECT ID OF CAUSE | MONITORING ITEM ID OF CAUSE | MEASURE | |
| operator1 | SOLVED | 2011-01-17 10:40:00 | (OMITTED) | host3 | LOG OF DATABASE | (OMITTED) | 1421 |
| operator4 | SOLVED | 2011-01-20 10:40:00 | (OMITTED) | host32 | LOG OF WEB SERVER | (OMITTED) | 1422 |
| ... | ... | ... | ... | ... | ... | ... | 1423 |
| operator9 | SOLVED | 2011-01-22 14:29:00 | (OMITTED) | host17 | LOG OF WEB SERVER | (OMITTED) | |
| operator7 | UN-SOLVED | | | | | | 1424 |

INCIDENT DATA 1400

Fig. 8

| OPERATIONS MANAGER ID | RESPONSIBLE MONITORING SUBJECT | RESPONSIBLE MONITORING ITEM | |
|---|---|---|---|
| operator1 | host1 | ALL | 1511 |
| operator1 | host2 | ALL | 1512 |
| operator2 | host10 | RESPONSE TIME OF WEB APPLICATION | 1513 |
| operator3 | ALL IN GROUP B | RESPONSE TIME OF WEB APPLICATION | 1514 |

1501 / 1502 / 1503

RESPONSIBILITY DATA 1500

Fig. 9

| | 1601 | 1602 | 1603 | 1604 | 1605 | 1606 |
|---|---|---|---|---|---|---|
| | ACCESS LOG ID | INCIDENT ID | ACCESS TIME | GROUP ID | OPERATIONS MANAGER ID | SESSION ID |
| | 1 | 1 | 2011-01-17 09:10:10 | A | operator1 | DADABABAEDDF |
| | 2 | 1 | 2011-01-17 09:10:42 | A | operator1 | DADABABAEDDF |
| | 3 | 1 | 2011-01-17 09:14:20 | A | operator1 | DADABABAEDDF |
| | 4 | 1 | 2011-01-17 09:22:42 | A | operator1 | DADABABAEDDF |
| | 31 | 2 | 2011-01-20 09:03:09 | B | operator5 | ED93FD3212EC |
| | 32 | 2 | 2011-01-20 09:13:11 | B | operator5 | ED93FD3212EC |
| | 33 | 2 | 2011-01-20 09:20:12 | B | operator5 | ED93FD3212EC |
| | 34 | 2 | 2011-01-20 09:30:12 | B | operator5 | ED93FD3212EC |
| | 200 | 9 | 2011-01-22 11:30:11 | C | operator9 | F928D432GEDB |

| | 1607 | 1608 | 1609 | 1610 | |
|---|---|---|---|---|---|
| | MONITORING SUBJECT ID | MONITORING ITEM ID | DISPLAY PERIOD | REFINING CONDITION | |
| | host1 | CPU USAGE RATE OF OS | 2011-01-17 | NONE | 1611 |
| | switch1 | BAND USAGE RATE | 2011-01-17 | NONE | 1612 |
| | host3 | CPU USAGE RATE OF OS | 2011-01-17 | NONE | 1613 |
| | host1 | LOG OF WEB SERVER | 2011-01-17 | NONE | 1614 |
| | host32 | CPU USAGE RATE OF OS | 2011-01-18 | NONE | 1617 |
| | host33 | CPU USAGE RATE OF OS | 2011-01-18 | NONE | 1618 |
| | host32 | LOG OF WEB SERVER | 2011-01-18 | NONE | 1619 |
| | host32 | LOG OF WEB SERVER | 2011-01-18 12:51~13:51 | NONE | 1620 |
| | host17 | LOG OF WEB SERVER | 2011-01-22 | SEARCH BY "upload data error" | 1621 |

INCIDENT-SPECIFIC ACCESS LOG 1600

*Fig. 10*

| INFLUENCING DEVICE | INFLUENCED DEVICE | TYPE |
|---|---|---|
| switch1 | host1 | UPSTREAM SWITCH |
| switch1 | host2 | UPSTREAM SWITCH |
| host3 | host1 | DATABASE |
| switch8 | host50 | UPSTREAM SWITCH |
| switch8 | host51 | UPSTREAM SWITCH |
| switch8 | host52 | UPSTREAM SWITCH |
| host60 | host50 | DATABASE |

DEPENDENCY RELATION DATA 1700

Fig. 11

| SERVICE ID | COMPONENT | TYPE |
|---|---|---|
| service-A | host1 | WEB SERVER |
| service-A | host3 | DATABASE |
| service-B | host32 | WEB SERVER |
| service-B | host33 | WEB SERVER |
| service-B | host34 | WEB SERVER |
| service-C | host17 | WEB SERVER |
| service-G | host50 | WEB SERVER |
| service-G | host51 | WEB SERVER |
| service-G | host52 | WEB SERVER |

SERVICE DATA 1800

Fig. 12

| 1901 ABSTRACT ACCESS LOG ID | 1902 ACCESS LOG ID | 1903 INCIDENT ID | 1904 MONITORING SUBJECT ID | 1905 MONITORING ITEM ID | 1906 DISPLAY PERIOD | 1907 REFINING CONDITION | |
|---|---|---|---|---|---|---|---|
| 1 | 1 | 1 | INCIDENT-CAUSING DEVICE | INCIDENT-CAUSING DEVICE | OCCURRENCE DATE OF INCIDENT | NONE | 1911 |
| 2 | 2 | 1 | UPSTREAM SWITCH OF INCIDENT-CAUSING DEVICE | BAND USAGE RATE | OCCURRENCE DATE OF INCIDENT | NONE | 1912 |
| 3 | 3 | 1 | DATABASE ON WHICH INCIDENT-CAUSING DEVICE DEPENDS | INCIDENT-CAUSING DEVICE | OCCURRENCE DATE OF INCIDENT | NONE | 1913 |
| 4 | 4 | 1 | INCIDENT-CAUSING DEVICE | LOG OF WEB SERVER | OCCURRENCE DATE OF INCIDENT | NONE | 1914 |
| 5 | 31 | 2 | INCIDENT-CAUSING DEVICE | INCIDENT-CAUSING DEVICE | OCCURRENCE DATE OF INCIDENT | NONE | 1915 |
| 6 | 32 | 2 | WEB SERVER PARALLEL TO INCIDENT-CAUSING DEVICE | INCIDENT-CAUSING DEVICE | OCCURRENCE DATE OF INCIDENT | NONE | 1916 |
| 7 | 33 | 2 | INCIDENT-CAUSING DEVICE | LOG OF WEB SERVER | OCCURRENCE DATE OF INCIDENT | NONE | 1917 |
| 8 | 34 | 2 | INCIDENT-CAUSING DEVICE | LOG OF WEB SERVER | 30 MINUTES BEFORE AND AFTER OCCURRENCE TIME OF INCIDENT | NONE | 1918 |
| 43 | 200 | 9 | INCIDENT-CAUSING DEVICE | LOG OF WEB SERVER | OCCURRENCE DATE OF INCIDENT | SEARCH BY KEYWORD IN INCIDENT | 1920 |

ABSTRACT ACCESS LOG 1900

*Fig. 13*

| MONITORING SUBJECT ID | MONITORING ITEM ID | DISPLAY PERIOD | REFINING CONDITION | IMPORTANCE | |
|---|---|---|---|---|---|
| INCIDENT-CAUSING DEVICE | INCIDENT-CAUSING DEVICE | OCCURRENCE DATE OF INCIDENT | NONE | 3 | 2011 |
| INCIDENT-CAUSING DEVICE | LOG OF WEB SERVER | OCCURRENCE DATE OF INCIDENT | NONE | 3 | 2012 |
| UPSTREAM SWITCH OF INCIDENT-CAUSING DEVICE | BAND USAGE RATE | OCCURRENCE DATE OF INCIDENT | NONE | 2 | 2013 |
| DATABASE ON WHICH INCIDENT-CAUSING DEVICE DEPENDS | INCIDENT-CAUSING DEVICE | OCCURRENCE DATE OF INCIDENT | NONE | 2 | 2014 |
| WEB SERVER PARALLEL TO INCIDENT-CAUSING DEVICE | INCIDENT-CAUSING DEVICE | OCCURRENCE DATE OF INCIDENT | NONE | 1 | 2015 |
| INCIDENT-CAUSING DEVICE | LOG OF WEB SERVER | 30 MINUTES BEFORE AND AFTER OCCURRENCE TIME OF INCIDENT | NONE | 1 | 2016 |

WEIGHTED ABSTRACT ACCESS LOG 2000

*Fig. 17*

| MONITORING SUBJECT ID (2101) | MONITORING ITEM ID (2102) | DISPLAY PERIOD (2103) | REFINING CONDITION (2104) | IMPORTANCE (2105) | |
|---|---|---|---|---|---|
| host50 | CPU USAGE RATE OF OS | 2011-01-30 | NONE | 3 | 2111 |
| host50 | LOG OF WEB SERVER | 2011-01-30 | NONE | 3 | 2112 |
| switch8 | BAND USAGE RATE | 2011-01-30 | NONE | 2 | 2113 |
| host60 | CPU USAGE RATE OF OS | 2011-01-30 | NONE | 2 | 2114 |
| host51 | CPU USAGE RATE OF OS | 2011-01-30 | NONE | 1 | 2115 |
| host52 | CPU USAGE RATE OF OS | 2011-01-30 | NONE | 1 | 2116 |
| host50 | LOG OF WEB SERVER | 2011-01-30 15:20 -16:20 | NONE | 1 | 2117 |

ACCESS PATTERN 2100

*Fig. 18*

| ABSTRACT INCIDENT ID | INCIDENT ID | MONITORING SUBJECT ID | MONITORING ITEM ID | CONTENT OF INCIDENT |
|---|---|---|---|---|
| 1 | 1 | host1 | CPU USAGE RATE OF OS | THRESHOLD EXCEEDED |
| 2 | 1,3 | MONITORING SUBJECT INFLUENCED BY switch 1 | CPU USAGE RATE OF OS | THRESHOLD EXCEEDED |
| 3 | 1 | MONITORING SUBJECT INFLUENCED BY host 3 | CPU USAGE RATE OF OS | THRESHOLD EXCEEDED |
| 4 | 1,2,3,4 | WEB SERVER | CPU USAGE RATE OF OS | THRESHOLD EXCEEDED |
| 5 | 1,3 | WEB SERVER of SERVICE service-A | CPU USAGE RATE OF OS | THRESHOLD EXCEEDED |
| 6 | 2 | host32 | CPU USAGE RATE OF OS | THRESHOLD EXCEEDED |
| 7 | 2,4 | WEB SERVER of SERVICE service-B | CPU USAGE RATE OF OS | THRESHOLD EXCEEDED |
| ... | ... | ... | ... | ... |
| 31 | 9 | host17 | LOG OF WEB APPLICATION B | ERROR "upload data error" OCCURRED |
| 32 | 9 | host17 | LOG OF WEB APPLICATION B | ERROR "ERROR MESSAGE" OCCURRED |
| 33 | 9 | host17 | LOG OF WEB APPLICATION | ERROR "upload data error" OCCURRED |
| 34 | 9 | host17 | LOG OF WEB APPLICATION | ERROR "ERROR MESSAGE" OCCURRED |
| 35 | 9 | WEB SERVER | LOG OF WEB APPLICATION B | ERROR "upload data error" OCCURRED |
| 36 | 9 | WEB SERVER | LOG OF WEB APPLICATION B | ERROR "ERROR MESSAGE" OCCURRED |
| 37 | 9 | WEB SERVER | LOG OF WEB APPLICATION | ERROR "upload data error" OCCURRED |
| 38 | 9 | WEB SERVER | LOG OF WEB APPLICATION | ERROR "ERROR MESSAGE" OCCURRED |

ABSTRACT INCIDENT DATA

Fig. 23

MANAGEMENT SERVER, MANAGEMENT SYSTEM, AND MANAGEMENT METHOD

BACKGROUND OF THE INVENTION

This invention relates to a management server, and more particularly, to a management server for a service management business.

An operations manager of a computer system performs a service management business (or monitoring business) for monitoring a failure that affects a service operational on the computer system, and an anomaly predictive of the failure. When a failure or anomaly is detected in a monitoring business, the operations manager analyzes the cause of the detected failure or anomaly to take measures thereagainst as necessary in accordance with the analysis result.

The above-mentioned failure and anomaly are hereinafter referred to as "incident" in accordance with the terms of Information Technology Infrastructure Library (ITIL).

The software that supports the above-mentioned monitoring business includes a monitoring tool and an incident management tool.

The monitoring tool is software that supports detection of incidents, and an analysis of the causes for the incidents. The monitoring tool has a first function of communicating to/from the hardware and software of a monitoring subject to collect data indicating the operational statuses of the system.

The data indicating the operational statuses includes data (values) indicative of the performance of the computer system, such as a CPU usage rate, and a log (string of characters) of an application or the like. In recent years, there has been proposed a monitoring tool that collects a wide variety of logs, and permits an operations manager to search the collected logs. Those values and strings of characters are hereinafter generally referred to as "historical data".

Further, the monitoring tool has a second function of transmitting an alert to the operations manager when historical data satisfies conditions specified in advance. Further, the monitoring tool has a third function of processing historical data into display data, such as a line graph and bar graph, that permits the operations manager to recognize the content of the historical data, and displaying the processed data on the screen of a manager terminal.

The incident management tool is software for managing the contents of past incidents, and measures that have been taken against the past incidents. When a new incident occurs, the operations manager registers the content of the incident into the incident management tool. The operations manager also registers the cause of the incident that has been found in the course of processing the incident, and the measure taken against the incident in the incident management tool. This registration is made in order to permit the operations manager to use the know-how of the past when an incident similar to the past incident occurs in the future.

Because the monitoring tool and the incident management tool are used in combination in many cases, a product which is the integration of the monitoring tool and the incident management tool has also been proposed. Such a product is hereinafter referred to as "service management server". The service management server is effective in shortening the working time of the operations manager.

For example, the service management server can automatically register an incident in a storage area connected to the service management server based on an alert transmitted by the monitoring tool. Accordingly, the service management server can eliminate the need for the work for the operations manager to register an incident.

Further, for example, the service management server can display data about an incident on the screen, thus leading the operations manager to the screen showing historical data of a monitoring subject where the displayed incident has been detected. Accordingly, the service management server can eliminate the need for the work for the operations manager to retrieve historical data of the monitoring subject where the incident has been detected.

The operations manager needs to view multifarious kinds of historical data to analyze the cause for an incident. Therefore, the monitoring operation using the service management server undesirably takes a longer time to analyze the cause for an incident as the types or number of software and hardware with which one operations manager performs the monitoring operation increase.

In addition, the service management server employing a rule-based technology to analyze the causes for incidents has appeared in recent years. Even when such a rule-based technology is used, however, the operations manager needs to view historical data to verify the correctness of the root cause detected automatically. Therefore, the monitoring work with the service management server has a problem of making the view time of the operations manager longer.

One way of achieving the shortening of the view time is to let a service management server hold, in advance, a procedure manual describing the procedures of the work of an operations manager (including viewing of historical data), and permitting the operations manager to refer to the procedure manual based on the contents of an incident so that the operations manager can grasp the historical data to be checked by the operations manager, and measures to be taken against the incident. This case, however, requires a cost for the operations manager to create the procedure manual in advance.

Further, another technology for achieving the reduction in view time has been proposed that automatically generates procedures for remote maintenance operation based on the status of an incidents and a knowledge DB (for example, see Japanese Patent Application Laid-open No. 2010-224829). The technology disclosed in Japanese Patent Application Laid-open No. 2010-224829 automatically generates some of the procedures based on the status of an incident, thus reducing the cost for generating a procedure manual. However, the technology disclosed in Japanese Patent Application Laid-open No. 2010-224829 cannot generate procedures for an incident the knowledge on which has not been stored in the DB in advance.

A further technology for reducing the view time has been proposed that identifies a past incident similar to an incident that has occurred newly, and provides an operations manager with a measure against the identified past incident (for example, see Japanese Patent Application Laid-open No. 2009-110293). However, with the technology disclosed in Japanese Patent Application Laid-open No. 2009-110293, even when the measure against the past incident is identified, it takes time for the operations manager to interpret what meaning the identified measure has if the identified measure is for a new incident. Further, because the contents of measures against past incidents may contain company secrets, measures against past incidents may not be directly shared in monitoring operations among different companies.

By way of contrast, the related-art recommendation technology applied to a Web site or the like can calculate the deviation of the number of accesses to each piece of data and recommend the user the access that is to be carried out frequently. Accordingly, a technology for reducing the view time has further been proposed that applies such a recommendation technology to a service management server to shorten the time for viewing historical data without the need for an operations manager to create a procedure manual in advance (for example, see Japanese Patent Application Laid-open No. 2011-108034). The technology disclosed in Japanese Patent Application Laid-open No. 2011-108034 concerns a technology for recommending a Web page based on an access log for Web pages having a plurality of attributes.

Historical data has a monitoring subject, a monitoring item (type of a value included in the historical data), or a date and time or the like as an attribute, and hence the service management server can process historical data in the same way as the Web page is processed. For a service management server, however, historical data to be accessed by an operations manager varies depending on the content of an incident, and hence intensive access to specific historical data is not likely to occur frequently. Therefore, the related-art recommendation technology, if applied to an access log for a service management server, may not recommend adequate measures.

SUMMARY OF THE INVENTION

It is an object of this invention to provide a technology for allowing a service management server to recommend historical data to be checked by an operations manager to the operations manager based on the content of a new incident occurred without the need for the operations manager to create a procedure manual in advance.

The representative one of inventions disclosed in this application is outlined as follows. There is provided a management server, which is to be coupled to devices, for collecting historical data indicating a status of each of the devices, the historical data including a value indicating the status of the each of the devices, a time at which the historical data is generated, a monitoring subject ID assigned to the each of the devices whose status is indicated by the historical data, and a monitoring item ID indicating a meaning of the value indicating the status. The management server comprises a processor, a memory, and an interface. The management server stores, in the memory, in case where a request for outputting the historical data is inputted via the interface, an access log including at least one of a time at which outputting of the historical data is requested, the monitoring subject ID included in the historical data requested to be outputted, or the monitoring item ID included in the historical data requested to be outputted; stores, in the memory, in case where an incident indicating a failure or prediction of a failure occurs in the each of the devices, incident data including at least one of a time at which the incident has occurred, a monitoring subject ID assigned to the each of the devices where the incident has occurred, or a monitoring item ID for which the incident has occurred; associates the incident data with the access log; updates data included in the access log to a string of characters abstracted by a predetermined rule in accordance with the incident data associated with the access log and the access log; generates an abstract access log including the data updated to the abstracted string of characters; identifies, in case where a value indicating first incident data is inputted via the interface, at least one first abstract access log from the generated abstract access log based on the first incident data; identifies a condition for the historical data to be outputted based on the first abstract access log and the first incident data, the condition including at least one of pieces of data including a time at which the historical data is generated, a monitoring subject ID included in the historical data, and a monitoring item ID included in the historical data; and outputs the identified condition for the historical data.

According to one embodiment of this invention, it is possible to recommend historical data to be checked by an operations manager to the operations manager.

BRIEF DESCRIPTION OF THE DRAWINGS

FIG. 4 is an explanatory diagram illustrating historical data according to the first embodiment of this invention.

FIG. 5 is an explanatory diagram illustrating historical data display setting according to the first embodiment of this invention.

FIG. 6 is an explanatory diagram illustrating operations manager data according to the first embodiment of this invention.

FIG. 7 is an explanatory diagram illustrating an access log according to the first embodiment of this invention.

FIG. 8 is an explanatory diagram illustrating incident data according to the first embodiment of this invention.

FIG. 9 is an explanatory diagram illustrating responsibility data according to the first embodiment of this invention.

FIG. 10 is an explanatory diagram illustrating an incident-specific access log according to the first embodiment of this invention.

FIG. 11 is an explanatory diagram illustrating dependency relation data according to the first embodiment of this invention.

FIG. 12 is an explanatory diagram illustrating service data according to the first embodiment of this invention.

FIG. 13 is an explanatory diagram illustrating an abstract access log according to the first embodiment of this invention.

FIG. 17 is an explanatory diagram illustrating a weighted abstract access log according to the first embodiment of this invention.

FIG. 18 is an explanatory diagram illustrating an access pattern according to the first embodiment of this invention.

FIG. 23 is an explanatory diagram illustrating abstract incident data according to the second embodiment of this invention.

DETAILED DESCRIPTION OF THE PREFERRED EMBODIMENTS

First Embodiment

A service management server according to this invention abstracts an access log showing a history of accesses to historical data by an operations manager based on data on an incident that has triggered individual accesses and data indicative of the relationship between the monitoring subjects. The abstracted access logs (hereinafter referred to as "abstract access logs") can permit a common part in monitoring subjects or monitoring items between abstract access logs to be easily found. Accordingly, the number of abstract access logs is biased.

Therefore, the service management server applies the recommendation technology to abstract access logs to put the individual abstract access logs in order. When a new incident occurs, the service management server determines historical data to be recommended to an operations manager using the new incident, the ordered abstract access logs, and data indicating the relationship between monitoring subjects.

The service management server according to this embodiment has data indicating the relationship between monitoring subjects to abstract access logs. However, the data indicating the relationship between monitoring subjects is generated by some automatic means, and hence the cost of generating the data indicating the relationship between monitoring subjects is lower than the cost of creating a procedure manual. Methods of generating data indicating the relationship between monitoring subjects include, for example, traffic analysis, transformation from a configuration management database (CMDB), and transformation from a file for setting monitoring subjects.

Now a first embodiment of this invention is described referring to the accompanying drawings.

Figure 1:
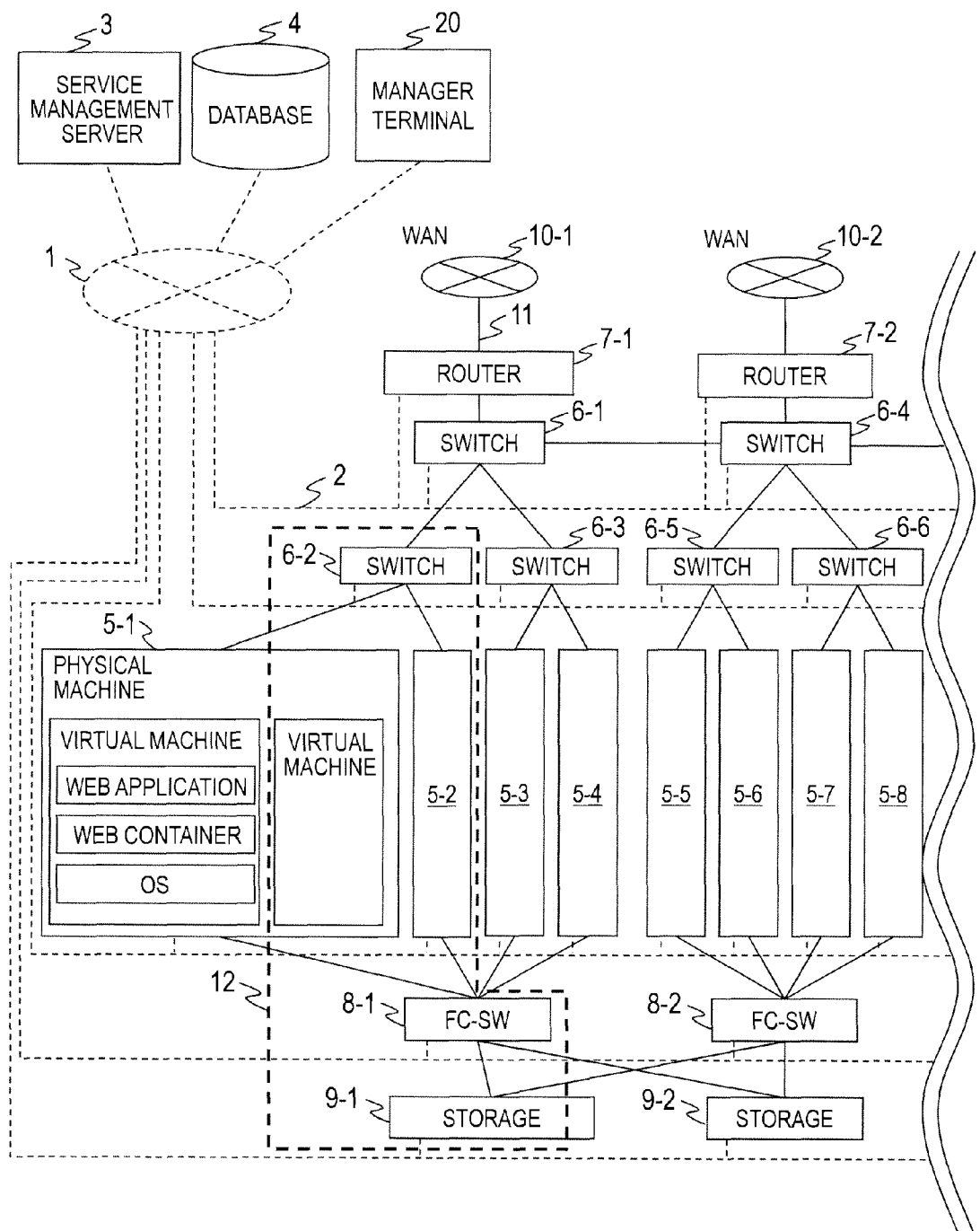
FIG. 1 is a block diagram illustrating the physical configuration of a computer system according to a first embodiment of this invention.

FIG. 1 is a block diagram illustrating the physical configuration of a computer system according to the first embodiment of this invention.

The computer system according to the first embodiment includes a service management server 3, a database 4, a manager terminal 20, and a plurality of devices. The service management server 3, the database 4, the manager terminal 20, and the plurality of devices are coupled to one another via a management network 1.

The plurality of devices in the computer system according to the first embodiment provide users with services. The plurality of devices include a plurality of physical machines 5 (5-1 to 5-8), a plurality of switches 6 (6-1 to 6-6), a plurality of routers 7 (7-1, 7-2), a plurality of fibre channel switches (FC-SW) 8 (8-1, 8-2), and storages 9 (9-1, 9-2). These devices are coupled to the management network 1 via physical communication lines 2.

Further, to provide users with services, the devices in the computer system according to the first embodiment are mutually coupled to wide area networks (WANs) 10 (10-1, 10-2) via physical communication lines 11.

Each of the physical machines 5, the switches 6, and the routers 7 is a computer including a processor, such as a CPU, and a memory, and executes an operating system (OS). When each of the FC-SWs 8 and the storages 9 includes a controller of its own, each of the FC-SWs 8 and the storages 9 is a computer including a processor, such as a CPU, and a memory, and executes an OS.

One physical machine 5 may be implemented with a plurality of virtual machines. Alternatively, a plurality of physical machines 5 may be implemented with a single virtual machine. Each virtual machine may execute the OS in the physical machine 5.

The switch 6 is a network device that connects the physical machines 5 to the associated router 7. The router 7 is a network device that connects the computer systems monitored or configured by an operations manager to the associated WAN 10. The FC-SW 8 is a network device that mediates traffic between the physical machines 5 and the associated storages 9. Each storage 9 is a device that stores data which is used by the associated physical machines.

The devices in the computer system according to the first embodiment are rented to a plurality of companies or organizations. In this embodiment, a group 12 is a set of devices to be rented to each company. The devices to be rented may be rented for each physical machine 5, or for each virtual machine. For example, a single virtual machine, a physical machine 5-2, a switch 6-2, an FC-SW 8-1, and a part of the storage area of a storage 9-1 may be rented as a group 12.

In general, an operations manager in a company or organization rented with a certain group 12 cannot gain access to a device such as a virtual machine or a storage 9 in another group 12. By way of contrast, some of the devices, such as a switch 6 or an FC-SW 8, may be rented to a plurality of groups of 12. This design is to configure, for example, a switch 6 in such a way that the switch 6 switches communication from each WAN 10 to each physical machine 5 or a virtual machine for each group 12. In addition, the FC-SW 8 is configured to switch communication from each physical machine 5 to a partial storage area of a storage 9 for each group 12.

In addition, historical data of a service, and incident data in a group 12 that is rented to an individual company may contain company secrets of individual companies. For this reason, an operations manager of one group 12 cannot view historical data and incident data in another group 12.

The management network 1 and the communication lines 2 in the computer system 1 according to the first embodiment serve as a network for operations managers to monitor and configure the respective devices. It should be noted that an operations manager may monitor and configure individual devices via the communication lines 11 without using the management network 1. This is because when the traffic for transmitting and receiving data for monitoring an individual device is so light that traffic for monitoring and traffic associated with a service provided by each device are sufficiently accommodated in the communication line 11, for example, the operations manager only needs to monitor or configure the individual device via the communication line 11.

The service management server 3 provides an operations manager with the functions of a monitoring tool that collects historical data from the hardware of the individual devices (physical machine 5, switch 6, router 7, FC-SW 8, and storage 9) and software that is executed by the hardware, and the functions of an incident management tool that manages incident data. Further, the service management server 3 according to this invention has a function of providing an operations manager with the function of recommending historical data.

The database 4 is a storage area for storing historical data collected from each device. The database 4 is also a storage area for storing data necessary to provide the functions of the monitoring tool, the functions of the incident management tool, and the recommendation function of this invention.

The manager terminal 20 is a terminal that is used by the operations manager of the computer system according to the first embodiment. Specifically, the manager terminal 20 is a device for displaying the functions provided by the service management server 3 to the operations manager. The manager terminal 20 is also a device for transmitting a request to the service management server 3, which is inputted by the operations manager, to the service management server 3.

The manager terminal 20 has software for communicating to/from each of the programs held in the service management server 3. This software is hereinafter referred to as "management client". The management client of the manager terminal 20 is, for example, a graphical user interface (GUI) that uses a dedicated communication protocol, or a Web browser that performs communication by the HTTP. In this embodiment, the management client is a Web browser.

Figure 2:
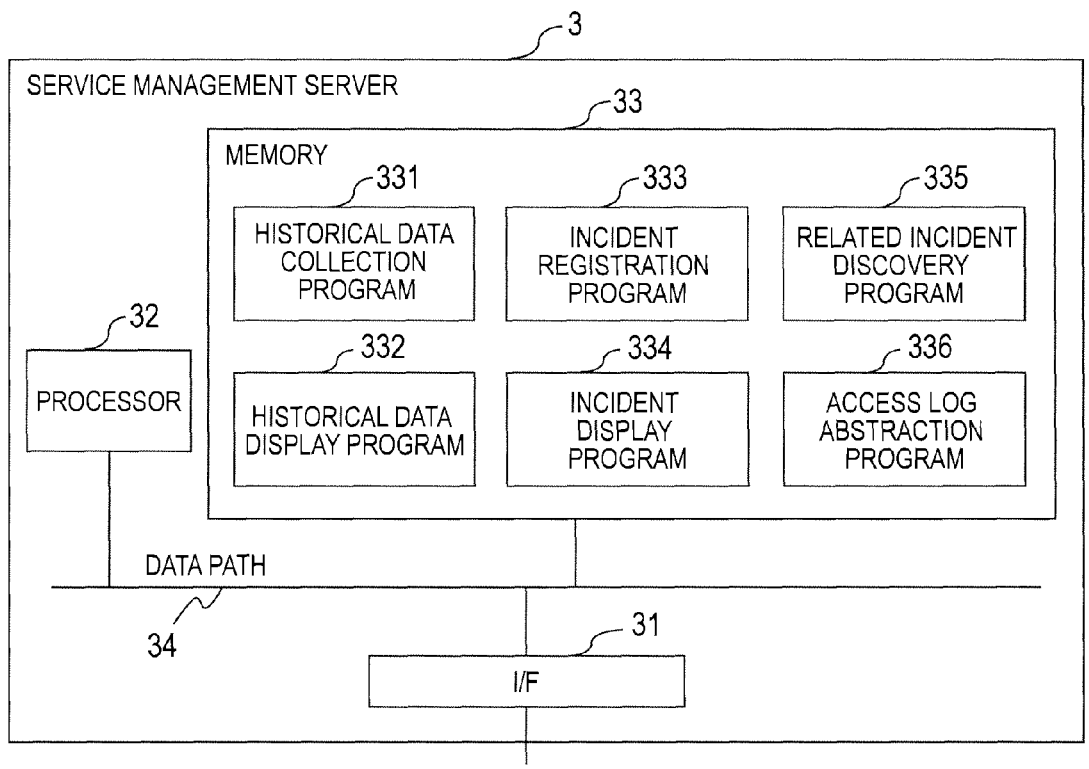
FIG. 2 is a block diagram illustrating the physical configuration of a service management server and data held in the service management server according to the first embodiment of this invention.

FIG. 2 is a block diagram illustrating the physical configuration of the service management server 3 and data held in the service management server 3 according to the first embodiment of this invention.

The service management server 3 is a computer including an interface (I/F) 31, a processor 32, and a memory 33. The I/F 31, the processor 32, and the memory 33 are connected by a data path 34.

The service management server 3 communicates to/from the network management 1 via the I/F 31. The processor 32 is an arithmetic and logic unit such as a CPU. The memory 33 is a storage area for storing programs and data. The processor 32 reads each program stored in the memory 33 via the data path 34 to execute each program.

The memory 33 holds a historical data collection program 331, a historical data display program 332, an incident registration program 333, an incident display program 334, a related incident discovery programs 335, and an access log abstraction program 336.

The historical data collection program 331 serves to collect historical data from each device illustrated in FIG. 1. The general collection methods include a method of executing an agent, such as Simple Network Management Protocol (SNMP), in each device in advance. Then, the historical data collection program 331 communicates to/from the agent on each device to collect historical data. The historical data collection program 331 stores the collected historical data in the database 4.

It should be noted that a device among the individual devices of the computer system according to this embodiment which is equipped with the OS outputs data indicating the performance of that device, such as the CPU usage rate or the memory usage rate, to a predetermined device regularly or at a specified time by the function of the OS or the agent program installed on the OS. Each device also outputs data indicating the execution status of an application that is executed by the device to provide each associated service to a predetermined device by the function of the application regularly or when an incident occurs.

The historical data collection program 331 collects, as historical data, data indicating the performance of each device and data indicating the execution status of the application, both of which are outputted to that device.

The historical data includes an identifier of the device whose performance is indicated by the historical data or an identifier of the device that runs the application whose execution status is indicated by the historical data. In this embodiment, those devices whose performances or execution statuses are indicated by historical data are referred to as "monitoring subjects".

In addition, the historical data also includes an identifier of the name of the performance indicated by the historical data or an identifier of the name of the execution status indicated by the historical data. In this embodiment, those names of the performances or execution statuses indicated by historical data are referred to as "monitoring items".

The monitoring subjects in this embodiment include virtual machines. Therefore, virtual machines in this embodiment are also assigned with identifiers for monitoring subjects in advance.

In response to a request transmitted from the manager terminal 20, the historical data display program 332 identifies a group 12 to which the operations manager who has transmitted the request belongs, and displays historical data of the identified group 12 on the manager terminal 20.

To increase the convenience for the operations manager, the historical data display program 332 has a function for customizing the type of historical data to be displayed on one screen in response to the request made by the operations manager. Further, the historical data display program 332 according to this embodiment stores an access log indicating the detailed history of the use of the historical data display program 332 in the database 4.

The detailed history of the use of the historical data display program 332 is hereinafter simply referred to as "access log". Specifically, an access log in this embodiment indicates the history of displaying the historical data by the operations manager, namely, the history of the accesses to the historical data by the operations manager. The historical data display program 332 provides the operations manager with the historical-data recommending function to be described later using an abstract access log obtained by processing the access log.

The incident registration program 333 generates data about an incident (hereinafter, referred to as "incident data") based on input data showing the contents of the input to the manager terminal 20 made by the operations manager, and transmitted from the manager terminal 20, or alert data indicating the contents of an alert transmitted by the monitoring tool. Then, the incident registration program 333 stores the generated incident data in the database 4. The incident registration program 333 also updates the incident data stored in the database 4 in accordance with the data input by the operations manager.

In response to a request transmitted from the manager terminal 20, the incident display program 334 identifies a group 12 to which the operations manager who has transmitted the request belongs, and displays incident data of the identified group 12 on the manager terminal 20. The incident display program 334 further provides a function of displaying historical data of a monitoring subject where an incident has been detected (function of displaying a link to the historical data display program 332 when the incident display program 334 is implemented by a Web application).

When historical data is displayed by the function of displaying the historical data of the monitoring subject where an incident has been detected, the incident display program 334 according to this embodiment inputs an identifier (incident ID) uniquely indicating the incident displayed by the incident display program 334 to the historical data display program 332. This input is performed in order for the incident display program 334 to associate an access log indicating that the historical data is displayed with the incident that triggers the display of the historical data.

Specifically, when the incident display program 334 is implemented by a Web application, the identifier of the incident is included in the parameters of a URL, which is inputted to the historical data display program 332.

The related incident discovery program 335 identifies an incident related to each access log stored in the database 4. When an incident ID is not inputted to the historical data display program 332 by a program, such as the incident display program 334, at the time the historical data display program 332 is executed, the incident ID is not associated with the access log.

However, such access logs may contain an access log associated with an analysis of the cause for the incident. The related incident discovery program 335 associates an access log that has not yet been associated with an incident, and indicates a history related to an incident with the incident.

The access log abstraction program 336 generates an abstract access log using individual pieces of data stored in the database 4. The related incident discovery program 335 and the access log abstraction program 336 may be executed regularly by a batch process.

Flowcharts illustrating the processes of the historical data display program 332, the related incident discovery programs 335, and the access log abstraction program 336 are described later.

Although the service management server 3 provides the individual functions by the programs illustrated in FIG. 2, the functions of the individual programs may be implemented by a single program. Further, a single program may be implemented by a plurality of programs by dividing each program illustrated in FIG. 2 process by process.

The functions of the programs illustrated in FIG. 2 may be implemented in the service management server 3 by a processing unit of an LSI device or the like that has a processor. Specifically, the function of the historical data collection program 331 may be implemented in the service management server 3 as a historical data collecting part.

Further, the individual programs illustrated in FIG. 2 may be installed in a program distribution server, or in the service management server 3 by means of a computer-readable non-transitory storage medium, or may be stored in a nonvolatile storage device (not shown) included in the service management server 3.

Figure 3:
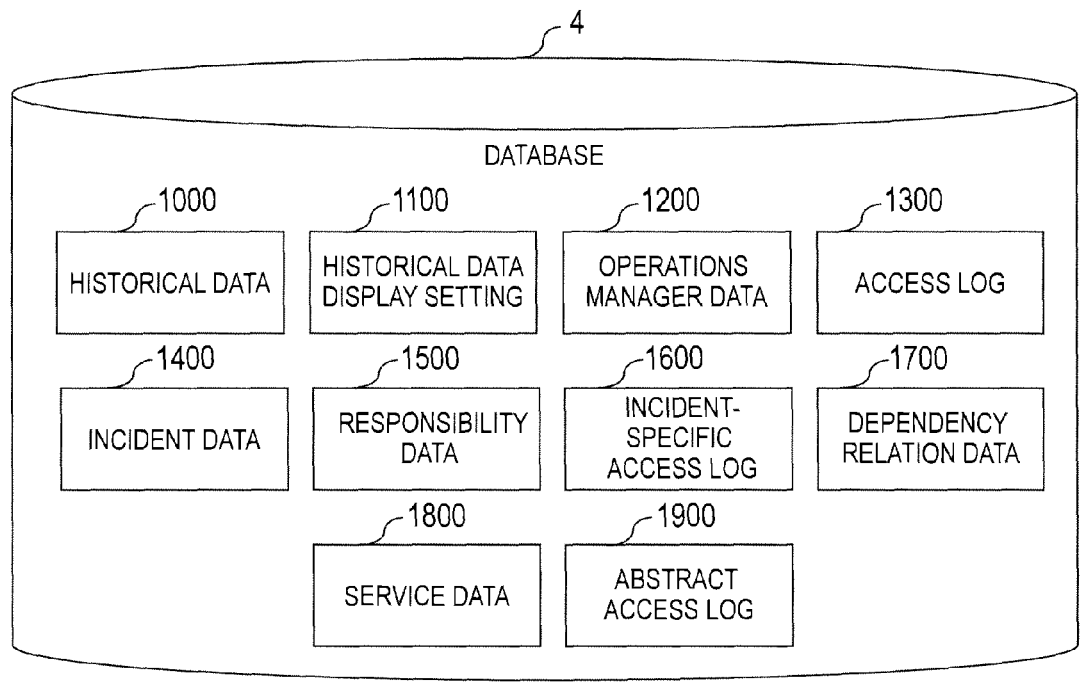
FIG. 3 is an explanatory diagram illustrating data stored in a database according to the first embodiment of this invention.

FIG. 3 is an explanatory diagram illustrating data to be stored in the database 4 according to the first embodiment of this invention.

The database 4 stores historical data 1000, historical data display setting 1100, operations manager data 1200, an access log 1300, incident data 1400, responsibility data 1500, incident-specific access log 1600, dependency relation data 1700, service data 1800, and abstract access log 1900.

The historical data 1000, the historical data display setting 1100, and the operations manager data 1200 are each a table in which the service management server 3 stores the data necessary to provide monitoring tools. The incident data 1400 is a table in which the service management server 3 stores the data necessary to provide incident management tools.

The access log 1300, the responsibility data 1500, the incident-specific access log 1600, the dependency relation data 1700, the service data 1800, and the abstract access log 1900 are tables that store data needed for the service management server 3 to provide the recommendation function of this embodiment.

In this embodiment, all pieces of data to be stored in the database 4 are stored in the tables, but may be stored in the database 4 by any method as long as the contents of each piece of data are identifiable. For example, data may be stored by any method such as CSV or a list.

FIG. 4 is an explanatory diagram illustrating the historical data 1000 according to the first embodiment of this invention.

The historical data 1000 is the historical data that is collected by the historical data collection program 331. Monitoring subjects included in the historical data indicates devices that are monitored by the service management server 3 (in other words, monitored by the operations manager). In addition, monitoring items included in the historical data are meanings that are indicated by values acquired by individual devices and included in the historical data.

The historical data 1000 includes columns 1001 to 1006. The historical data 1000 illustrated in FIG. 4 also includes rows 1011 to 1017. The individual rows included in the historical data 1000 show historical data collected from the respective devices.

The column 1001 shows an identifier (historical data ID) for uniquely identifying historical data in the computer system according to this embodiment. The column 1002 shows an identifier (group ID) for uniquely identifying a group 12 that contains a monitoring subject where historical data is generated. The historical data collection program 331 or the agent of each device assigns a group ID to each historical data.

The column 1003 shows an identifier (monitoring subject ID) for uniquely identifying a monitoring subject that has output each historical data. The monitoring subject ID, which is, for example, a host name or an IP address, is an identifier uniquely assigned to a physical machine 5, a virtual machine, or the like. The monitoring subject ID in this embodiment is a host name.

The column 1004 includes an identifier (monitoring item ID) for uniquely identifying a monitoring item included in the historical data. The monitoring item ID is a string of characters indicating an item related to the operational status of the OS (e.g., CPU usage rate of the OS), an item related to the operational status of middleware (e.g., database, Web container, or the like) shared to be used by a plurality of applications that are executed by the OS, or an application-specific item.

Although a string of characters is stored the column 1004 of FIG. 4, a numeral, a symbol, or the like may be stored therein as long as the numeral, the symbol, or the like can be identified by the operations manager.

The column 1005 shows the time at which historical data is measured. The column 1006 is a value that is acquired by each device and included in historical data. Based on the value included in the column 1006, the operations manager determines whether a device to be monitored is normal or not in the content of the monitoring items. For example, a value included in the column 1006 is a numeral, a ratio, a string of characters in a log, or the like.

FIG. 5 is an explanatory diagram illustrating the historical data display setting 1100 according to the first embodiment of this invention.

The historical data display setting 1100 contains data about the configuration of a screen to be displayed by the historical data display program 332. Each row of the historical data display setting 1100 shows historical data displayed on one screen and a display method therefor. The historical data display setting 1100 may be set in advance in the service management server 3, or may be generated by the historical data display program 332 when the operations manager customizes the screen.

The historical data display setting 1100 includes columns 1101 to 1107. The historical data display setting 1100 illustrated in FIG. 5 also includes rows 1111 to 1117.

The column 1101 shows an identifier (screen ID) for uniquely identifying each screen displayed by the historical data display program 332. The historical data that has the same screen ID is the historical data which is displayed on the same screen. The column 1101 may include, as the screen ID, a parameter, such as a URL corresponding to the screen, or a session ID included in a URL corresponding to the screen.

The column 1102 shows the group ID of the monitoring subject whose historical data is to be displayed on the screen is outputted. Only the operations manager who manages the group 12 shown in the column 1102 can view the screen shown by the column 1101.

The column 1103 shows the ID of the monitoring subject whose historical data to be displayed on the screen is outputted. The column 1104 shows the monitoring item ID of historical data to be displayed on the screen. For example, the rows 1111 and 1112 show that the screen with the screen ID of 1 displays historical data whose monitoring subjects are host 1 and host 2 and whose monitoring item is "CPU usage rate of OS".

The column 1105 shows a method of abstracting the value of historical data to be displayed on the screen. The abstraction methods include a method of calculating a maximum value, minimum value, average value, or the like of the value of historical data (corresponding to the column 1006 of the historical data 1000) over a certain period of time. The column 1105 according to this embodiment includes a string of characters indicating the maximum value, minimum value, average value, or the like.

The column 1106 shows the presence/absence of a threshold on the display screen, and a threshold value displayed thereon. The column 1106 illustrated in FIG. 5 includes a character string "None" when a threshold is not displayed, and a character string "Yes" when a threshold is displayed. For example, the column 1106 in the row 1115 shows that a threshold of 50 is displayed.

The column 1107 shows whether a base line is displayed on the screen or not, and the contents of historical data to be displayed as a base line. A base line is an indication for comparing the displayed historical data. For example, the base line is the average value or the like of historical data generated over a certain period in the past, and the column 1107 includes a period or the like over which historical data used for the base line has been generated. The column 1107 includes a character string "None" when the base line is not displayed, and a character string "Yes" when the base line is displayed.

FIG. 6 is an explanatory diagram illustrating the operations manager data 1200 according to the first embodiment of this invention.

The operations manager data 1200 relates to a user who can use each program held in the service management server 3, i.e., an operations manager. The operations manager data 1200 is preset by the operations manager in the database 4.

The operations manager data 1200 includes columns 1201 to 1203. The operations manager data 1200 illustrated in FIG. 6 also includes rows 1211 to 1215.

The column 1201 shows an identifier (operations manager ID) for uniquely identifying the operations manager of the computer system of this embodiment. The operations manager ID is used in access control for various types of data and recording of an access log.

The column 1202 shows a password used in access control for various kinds of data.

The column 1203 shows the group ID of the group 12 that is managed by the operations manager ID. The group ID of the column 1203 is used to control access by the operations manager.

FIG. 7 is an explanatory diagram illustrating the access log 1300 according to the first embodiment of this invention.

The access log 1300 stores the history of accesses to the historical data 1000 made by the operations manager via the historical data display program 332. The accesses via the historical data display program 332 include a request for the display of each historical data and the like. The access log 1300 is generated or updated by the historical data display program 332 every time the operations manager inputs a request for the display of historical data or the like to the historical data display program 332.

The access log 1300 includes columns 1301 to 1310. The access log 1300 illustrated in FIG. 7 also includes rows 1311 to 1321. The individual rows included in the access log 1300 include access logs indicating accesses made by the operations manager.

The column 1301 shows an identifier (access log ID) for uniquely identifying an access log in the computer system according to this embodiment.

The column 1302 shows an incident ID entered in the historical data display program 332 when the historical data is accessed. A value is not stored in the column 1302 when the incident ID is not inputted to the historical data display program 332 from the incident display program 334 or the like.

The column 1303 shows the time at which the operations manager has accessed historical data via the historical data display program 332. The column 1304 shows the group ID of the operations manager who has accessed historical data via the historical data display program 332 at the time shown by the column 1303. The column 1305 shows the operations manager ID of the operation management who has accessed historical data via the historical data display program 332 at the time shown by the column 1303.

The column 1306 shows a session ID to associate accesses that have been made consecutively within a certain short period of time. When the historical data display program 332 is a Web application, the column 1306 includes a session ID included in HttpCookie.

The column 1307, the column 1308, and the column 1309 show the monitoring subject ID, monitoring item ID, and display period of the historical data displayed on the screen by the historical data display program 332, respectively.

Generally, the monitoring tool can flexibly change the period for displaying historical data. For example, the access log in the row 1319 shows an access log for one day of historical data that was outputted by a monitoring subject on Jan. 18, 2011. In addition, the access log in the row 1320 shows an access log for one hour of historical data that was outputted by a monitoring subject between 12:51 and 13:51 on Jan. 18, 2011.

The column 1310 shows a refining condition that is specified by the operations manager to narrow down historical data to be displayed. The refining condition includes a keyword, threshold, or the like for retrieving historical data. For example, when the operations manager specifies to display historical data including a specific error message, the column 1310 shows the specified error message.

The access log 1300 that is stored in the database 4 by the historical data display program 332 may be limited to an access log related to the historical data displayed on the display of the manager terminal 20. When the historical data display program 332 outputs a screen whose size does not fit in the display of the manager terminal 20, for example, the operations manager cannot check every piece of historical data on the screen unless the displayed screen is scrolled. In such a case, the data stored in the access log 1300 may not accurately show the historical data that has actually been checked by the operations manager.

Therefore, the historical data display program 332 may detect the historical data actually displayed on the display of the manager terminal 20, and store the access log of the detected historical data in the access log 1300. The historical data display program 332 may detect historical data displayed on the display by, for example, embedding a JavaScript (registered trademark; hereinafter the same) program in a Web page that is outputted by the historical data display program 332. In this manner, the actual condition of monitoring can be reflected more accurately in the recommendation of historical data to be described later.

FIG. 8 is an explanatory diagram illustrating the incident data 1400 according to the first embodiment of this invention.

The incident data 1400 stores data about an incident registered in the database 4 by the incident registration program 333, or data about an incident that has occurred in the computer system according to this embodiment.

The incident data 1400 includes columns 1401 to 1414. The incident data 1400 illustrated in FIG. 8 includes rows 1421 to 1424. Each row of the incident data 1400 indicates incident data about an incident that has occurred in the computer system according to this embodiment.

The column 1401 shows an incident ID in the computer system according to this embodiment.

The column 1402 shows the group ID of the group 12 containing the device where an incident has occurred. The incident registration program 333 specifies a group ID to be stored in the column 1402 by extracting a row of the operations manager data 1200 including the operations manager ID of the operations manager who has stored data about the incident in the incident data 1400. Further, the incident registration program 333 specifies a group ID to be stored in the column 1402 in accordance with a string of characters or the like indicating a monitoring subject included in an alert indicating an incident.

The column 1403 shows the type of an incident. The type of an incident to be stored in the column 1403 is entered by the operations manager in accordance with the contents of the incident, or is assigned by the incident registration program 333 in accordance with a string of characters or the like included in an alert indicating an incident. The type of an incident shown by the column 1403 is used in determination of similarity of an incident, which is described later.

The columns 1404 to 1407 show historical data used by the operations manager to determine whether or not there is an incident, and conditions for the historical data. The columns 1404 to 1407 are entered by the operations manager when an incident occurs.

The column 1408 shows the operations manager ID of the operations manager who becomes in charge of an incident. In general, since a person in charge of an incident is determined when the incident occurs, the person in charge of another operations manager enters the operations manager ID of the person in charge of in the column 1408. A person in charge of according to this embodiment is the operations manager who analyzes the cause for an incident.

The column 1409 shows the status of an incident (solved or unsolved). When values are entered in the columns 1410 to 1414, the incident registration program 333 may store a value indicating a "solved" in the column 1409, or the operations manager may update the value in the column 1409.

The columns 1410 to 1414 are inputted by the operations manager after an incident is solved. In the process described later, the columns 1410 to 1414 are used when a similar incident occurs.

The column 1410 shows the date and time at which an incident has been solved. The column 1411 is a text describing the cause for the incident.

The column 1412 and the column 1413 respective show the monitoring subject and the monitoring item that are closely associated with the cause for the incident. Further, the column 1412 and the column 1413 are data for specifying historical data closely associated with the cause for the incident. The column 1412 shows the monitoring subject ID of the monitoring subject that has caused the incident. The column 1413 shows the monitoring item ID of the monitoring item that has caused the incident.

The column 1414 shows a text describing the measure to be taken against an incident.

FIG. 9 is an explanatory diagram illustrating the responsibility data 1500 according to the first embodiment of this invention.

The responsibility data 1500 stores data indicating the monitoring subject and monitoring item which are to be monitored by each operations manager. The responsibility data 1500 is created in advance and stored in the database 4 by the operations manager.

The responsibility data 1500 includes columns 1501 to 1503. The responsibility data 1500 illustrated in FIG. 9 also includes rows 1511 to 1514

The column 1501 shows the operations manager ID. The column 1502 shows the monitoring subject ID of the monitoring subject which is to be monitored by the operations manager. The column 1503 shows the monitoring item ID of the monitoring item which is to be monitored by the operations manager. Each cell in the columns 1502 and 1503 may include an identifier indicating a plurality of monitoring subjects or a plurality of monitoring items (for example, "all" or all in group B" illustrated in FIG. 9).

FIG. 10 is an explanatory diagram illustrating the incident-specific access log 1600 according to the first embodiment of this invention.

The incident-specific access log 1600 stores an access log that is associated with a specific incident (incident-specific access log).

The incident-specific access log 1600 includes columns 1601 to 1610. The incident-specific access log 1600 illustrated in FIG. 10 also includes rows 1611 to 1614 and rows 1617 to 1621.

The columns 1601 to 1610 correspond to the columns 1301 to 1310 of the access log 1300, respectively. It should be noted, however, that only the access log having an incident ID already stored in the column 1302 and the access log to which an incident ID has been assigned by the related incident discovery program 335 among the access logs of the access log 1300 are stored in the incident-specific access log 1600.

For example, the rows 1311 to 1314 illustrated in FIG. 7 do not have values stored in the column 1302. However, when the related incident discovery program 335 assigns incidents related to the access logs of the rows 1311 to 1314 through a process to be described later (the operations manager data is a person in charge of the incident with the incident ID of 1), values corresponding to the access logs in the rows 1311 to 1314 are stored in the incident-specific access log 1600 as in the column 1602 of the rows 1611 to 1614.

More specifically, the column 1305 in the rows 1311 to 1314 indicates "operator 1", which is the value of the column 1408 of the row 1421 of the incident data 1400 illustrated in FIG. 8, namely, the person in charge of the incident with the incident ID of 1. Accordingly, the related incident discovery program 335 stores "1" as the incident ID in the column 1602 of the rows 1611 to 1614.

When the related incident discovery program 335 cannot assign a related incident to the access logs in the rows 1315 and 1316 illustrated in FIG. 7, on the other hand, the access logs corresponding to the rows 1315 and 1316 are not stored in the incident-specific access log 1600.

FIG. 11 is an explanatory diagram illustrating the dependency relation data 1700 according to the first embodiment of this invention.

The dependency relation data 1700 stores dependency relation data showing the dependence relation between monitoring subjects. The dependency relation data 1700 illustrated in FIG. 11 is an example of the dependency relation data between monitoring subjects.

For example, a first monitoring subject and a second monitoring subject different from the first monitoring subject have a dependency relation with each other in this embodiment when a service for the second monitoring subject is stopped or the quality of the service for the second monitoring subject drops upon occurrence of a failure in the first monitoring subject.

In general, when an incident occurs, the operations manager often view data of a monitoring subject or monitoring item which has a dependency relation with an incident-causing device. Accordingly, the dependency relation data 1700 indicating the dependency relation between monitoring subjects is used in the process of recommending historical data which is described later.

The dependency relation includes the connection relation between a server and a switch, the relation between a hypervisor and a virtual machine which runs on the hypervisor, and the relation between a Web application and a database. The dependency relation data 1700 may be generated in advance by the operations manager, or may be generated based on data that is automatically collected from the computer system and the standards set by the operations manager.

Specifically, a program (not shown) may automatically generate the dependency relation data 1700 by performing analysis of traffic transmitted and received in the computer system of this embodiment, transformation from a database showing the configurations of the individual devices, or transformation from data where monitoring subjects are set, in accordance with the standards set by the operations manager.

The dependency relation data 1700 includes columns 1701 to 1703. The dependency relation data 1700 illustrated in FIG. 11 also includes rows 1711 to 1717.

The column 1701 shows the monitoring subject ID of an influencing device, in other words, a monitoring subject on the influencing side. The column 1702 shows the monitoring subject ID of an influenced device, in other words, a monitoring subject on the influenced side. Specifically, when an incident occurs in a monitoring subject shown by the column 1701, the service for a monitoring subject shown by the column 1702 is influenced in such a way that the service is stopped, or the quality of the service is degraded, for example. The monitoring subject shown by the column 1701 is not influenced by an incident occurred in the monitoring subject shown by the column 1702.

The column 1703 is an identifier that indicates the type of the dependency relation. For example, when the result of analyzing the traffic of the computer system of this embodiment shows detection of connection from a monitoring subject "host 1" to a monitoring subject "host 3" in order to refer to the database held in the monitoring subject "host 3", the monitoring subject "host 1" and the monitoring subject "host 3" have a dependency relation. In this case, in the dependency relation data 1700, "host 3" is stored in the column 1701, "host 1" is stored in the column 1702, and "database" is stored in the column 1703 as shown in the row 1713.

FIG. 12 is an explanatory diagram illustrating the service data 1800 according to the first embodiment of this invention.

The service data 1800 stores service data indicating a monitoring subject that provides each service. The service data 1800 illustrated in FIG. 12 is an example of service data indicating the relation between a plurality of monitoring subjects that provide the same service.

In general, when an incident occurs, the operations manager often views data of a monitoring subject or monitoring item that provides the same service as that of the incident-causing device. Accordingly, the service data 1800 showing the relation between the monitoring subjects that provide the same service is used in the function of recommending historical data to be described later.

The relation between the monitoring subjects that provide the same service includes, for example, the relation between a plurality of Web servers that operate in parallel to provide individual services, or the relation between the primary DNS server and the secondary DNS server for each service. The service data 1800, like the dependency relation data 1700, may be generated in advance by the operations manager, or may be generated based on data that is automatically collected from the computer system and the standards set by the operations manager. In addition, the operations manager sets the standards for identifying a service provided by each device as a single service.

The service data 1800 includes columns 1801 to 1503. The service data 1800 illustrated in FIG. 12 also includes rows 1811 to 1819.

The column 1801 shows an identifier for uniquely identifying the service (service ID). The operations manager uniquely assigns a service ID to each service. The column 1802 shows the monitoring subject ID of a component, in other words, a monitoring subject that provides a service. The column 1803 shows the function or role of each monitoring subject in a service.

For example, in the service data 1800 illustrated in FIG. 12, monitoring subjects that provide a service whose service ID is "service-A" are the monitoring subject "host 1" and the monitoring subject "host 3". In the service whose service ID is "service-A", the monitoring subject "host 1" has a role of a Web server, and the monitoring subject "host 3" has a role of a database.

The dependency relation data 1700 illustrated in FIG. 11 and the service data 1800 illustrated in FIG. 12 show the latest status of the computer system. Alternatively, the dependency relation data 1700 and the service data 1800 based on the past status of the computer system, and data on a time at which the status of the computer system has been acquired may be accumulated in the database 4 by a program (not shown) of the service management server 3. In this manner, the access log abstraction program 336 can generate an abstract access log to be described later more accurately. Because the access log abstraction program 336 can calculate an abstract access log based on the accurate status of the computer system when an incident has occurred, the above-mentioned method is particularly effective when the configuration of the computer system is changed frequently.

FIG. 13 is an explanatory diagram illustrating the abstract access log 1900 according to the first embodiment of this invention.

The abstract access log 1900 stores the abstraction access log resulting from the abstraction of the incident-specific access log 1600 by the access log abstraction program 336. The abstract access log 1900 is used in the recommendation of historical data.

The abstraction in this embodiment is a process of transforming a monitoring subject, a monitoring item, a display period, and a refining condition that indicate the contents of viewed historical data into a string of characters showing a common concept between operations managers in the monitoring operations. The abstraction process in this embodiment is executed so that what kind of data the historical data that is viewed frequently provides in connection with an incident, or by what motive the operations manager frequently views the historical data is expressed by a string of general characters, and is shared by a plurality of operations managers.

The service management server 3 in this embodiment generates an abstract character string indicating the historical data to be viewed to cope with an incident by abstracting (or generalizing) the contents of the viewed historical data, and identifies specific historical data to be viewed from the generated abstract character string.

The abstract access log 1900 includes columns 1901 to 1907. The abstract access log 1900 illustrated in FIG. 13 also includes rows 1911 to 1918 and a row 1920.

The column 1901 shows an identifier (abstract access log ID) for uniquely identifying an abstract access log in the computer system according to this embodiment. The column 1902 shows the access log ID of an original access log from which the abstract access log is generated.

The column 1903 shows the incident ID of an incident used in the abstraction of this abstract access log. The columns 1904 to 1907 show the results of abstracting the columns 1607 to 1610 of the incident-specific access log 1600, respectively.

The abstraction of the columns 1607 and 1610 ensures general classification of the values to be stored in the columns 1904 to 1907, making it clear on what contents and by what motive the operations manager has viewed historical data much.

For example, the values of the columns 1607 to 1610 in the rows 1611 to 1620 of FIG. 10 do not match at all. However, as to the values of the columns 1904 to 1907, the rows 1911 and 1915 of FIG. 13 are identical to each other, and the rows 1914 and 1917 of FIG. 13 are identical to each other. Accordingly, the rows 1911 and 1915 show access logs originating from the same motive, and the rows 1914 and 1917 likewise show access logs originating from the same motive.

As the abstract access logs whose columns 1904 to 1907 have matching values increase, the abstract access log 1900 may show the tendency in which the operations manager views the historical data when coping with the incident. In the recommendation process of this embodiment, such a tendency that is shown by the abstract access log 1900 is used.

Figure 14A:
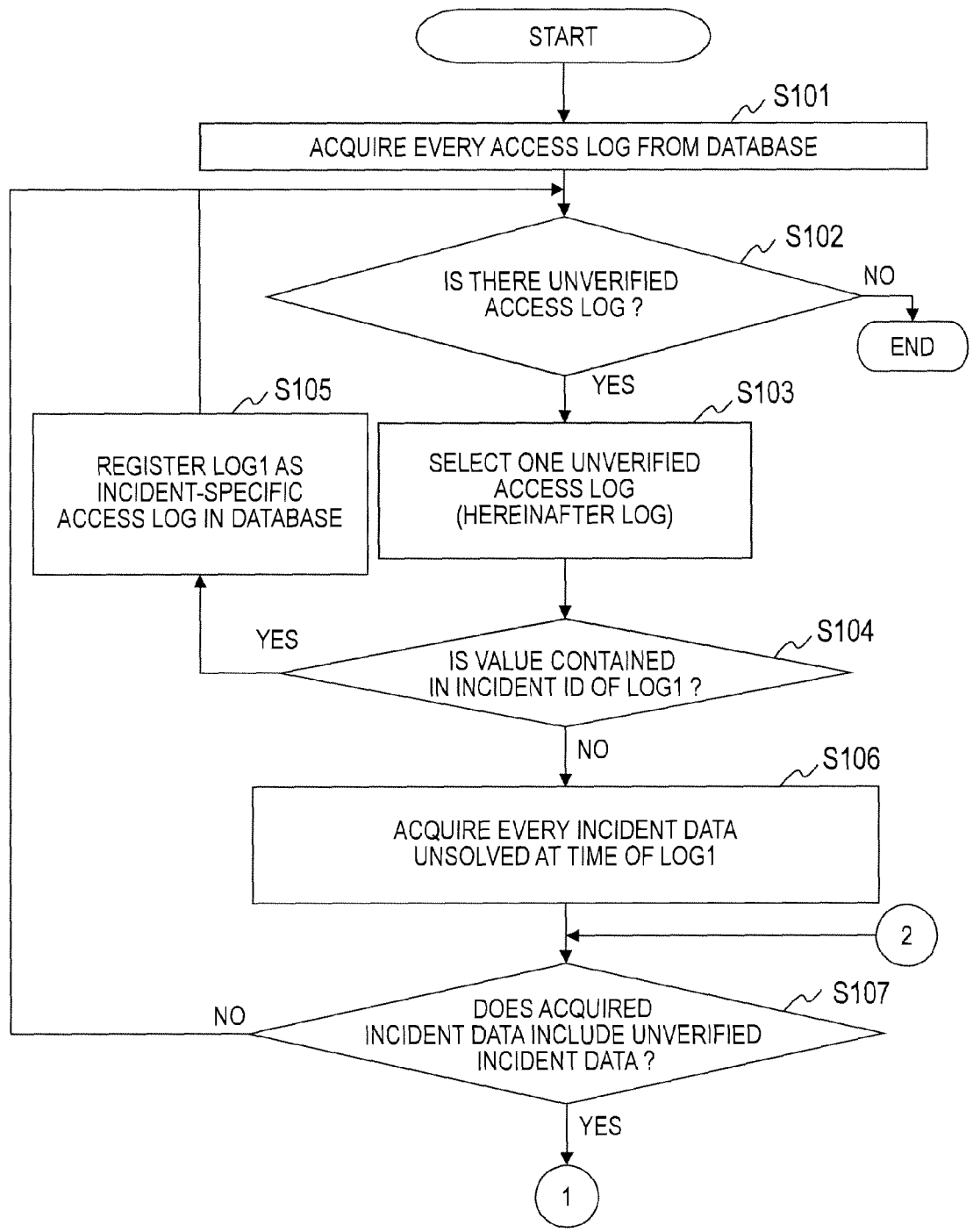
FIG. 14A is a flowchart illustrating a process of acquiring related incident data based a time in a process of generating an incident-specific access log according to the first embodiment of this invention.

FIG. 14A is a flowchart illustrating a process of acquiring related incident data based on a time in the process of generating the incident-specific access log 1600 according to the first embodiment of this invention.

Figure 14B:
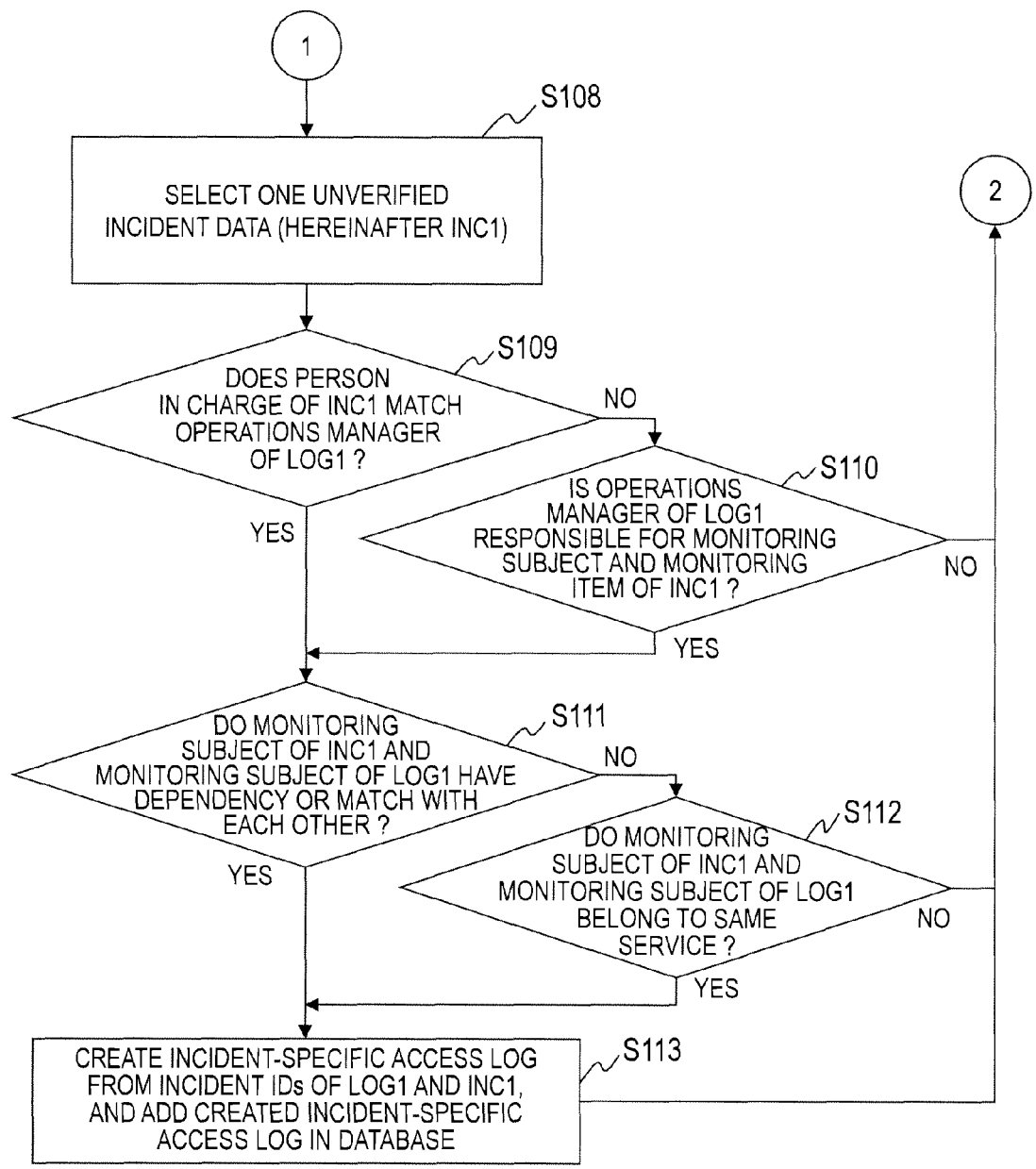
FIG. 14B is a flowchart illustrating a process of acquiring related incident data through one of an operations manager and a monitoring subject in the process of generating an incident-specific access log according to the first embodiment of this invention.

FIG. 14B is a flowchart illustrating a process of acquiring related incident data through one of an operations manager and a monitoring subject in the process of generating the incident-specific access log 1600 according to the first embodiment of this invention.

The related incident discovery program 335 executes the processes illustrated in FIGS. 14A and 14B, to thereby generate the incident-specific access log 1600 from the access log 1300.

The processes of FIGS. 14A and 14B that are executed by the related incident discovery program 335 may be executed when the incident data 1400 is updated as well as when a new access log is added to the access log 1300. This is because the incident data associated with each access log may be changed as a result of update of each column in the incident data 1400 (particularly, a person in charge shown by the column 1408).

The related incident discovery program 335 acquires all of the access logs included in the individual rows in the access log 1300 from the database 4 (Step S101). Then, the related incident discovery program 335 determines whether or not the access logs acquired in Step S101 include an access log that has not been subjected to the process of Step S104 and subsequent processes (Step S102). When there is not any access log that has not been subjected to the process of Step S104 and subsequent processes, the related incident discovery program 335 terminates the processes illustrated in FIGS. 14A and 14B.

When the access logs acquired in Step S101 include an access log that has not been subjected to the process of Step S104 and subsequent processes, the related incident discovery program 335 selects one access log that has not been subjected to the process of Step S104 and subsequent processes from the access logs acquired in Step S101 (Step S103). The access log selected in Step S103 is hereinafter referred to as "LOG1".

After Step S103, the related incident discovery program 335 determines whether or not the column 1302 of the LOG1 includes an incident ID (Step S104). When it determined in Step S104 that the column 1302 includes an incident ID, an incident is already associated in the LOG1. Accordingly, the related incident discovery program 335 stores the LOG1 as an incident-specific access log in the incident-specific access log 1600 of the database 4 (Step S105). For example, the column 1302 in the row 1317 illustrated in FIG. 7 includes an incident ID, and hence the related incident discovery program 335 stores the row 1317 in the row 1617 illustrated in FIG. 10.

After Step S105, the related incident discovery program 335 executes Step S102 to associate a new access log with the incident data.

When it is determined in Step S104 that the column 1302 of the LOG1 does not include an incident ID, on the other hand, the related incident discovery program 335 extracts incident data to be associated with the LOG1 through Steps S106 to S113 to be described later. First, the related incident discovery program 335 acquires, from the incident data 1400 in the database 4, every pieces of incident data that indicates an incident that has occurred before the access time shown by the column 1303 of the LOG1 and an incident unsolved at the point of the access time shown by the column 1303 of the LOG1 (Step S106).

For example, when the LOG1 is the row 1311 of FIG. 7 in Step S106, the related incident discovery program 335 acquires the row 1421 of FIG. 8 from the incident data 1400. This is because the incident shown by the row 1421 has occurred at 9:00 on Jan. 17, 2011 and has been solved at 10:40 on Jan. 17, 2011, while the access log in the row 1311 shows that the operations manager has accessed the historical data at 9:10 on Jan. 17, 2011. In other words, it is likely that access to the historical data shown by the row 1311 has been made to solve the incident shown by the row 1421.

After Step S106, the related incident discovery program 335 determines whether or not the incident data acquired in Step S106 includes incident data that has not been subjected to the process of Step S109 and subsequent processes illustrated in FIG. 14B (Step S107). When incident data that has not been subjected to the process of Step S109 and subsequent processes illustrated in FIG. 14B does not exist, the related incident discovery program 335 executes Step S102 to associate a new access log 1300 with the incident data.

When it is determined in Step S107 illustrated in FIG. 14A that there is incident data that has not been subjected to the process of Step S109 and subsequent processes illustrated in FIG. 14B, the related incident discovery program 335 selects from the incident data acquired in Step S106 one piece of incident data that has not been subjected to the process of Step S109 and subsequent processes (Step S108). The incident data selected in Step S108 is hereinafter referred to as "INC1".

In Steps S109 and S110, the access log abstraction program 336 determines whether or not the operations manager who has made the access shown by the LOG1 is related to the INC1.

After Step S108, the related incident discovery program 335 determines whether or not the person in charge shown by the column 1408 of the INC1 matches the operations manager shown by the column 1305 of the LOG1 (Step S109). When the person in charge shown by the INC1 matches the operations manager shown by the LOG1, it is likely that the access shown by the LOG1 has been made to solve the incident shown by the INC1. Accordingly, the related incident discovery program 335 executes Step S111 to further determine whether or not the INC1 is related to the LOG1.

When it is determined in Step S109 that the person in charge shown by the INC1 does not match the operations manager shown by the LOG1, the related incident discovery program 335 refers to the responsibility data 1500 to determine whether or not the operations manager shown by the column 1305 of the LOG1 is responsible for the monitoring subject shown by the column 1404 of the INC1 and the monitoring item shown by the column 1405 (Step S110). This determination is made because the LOG1 is associated with the INC1 when the operations manager shown by the LOG1 is the person in charge who needs to view the historical data due to the incident shown by the INC1.

Specifically, when the responsibility data 1500 includes a row whose column 1501 includes the value in the column 1305 of the LOG1, whose column 1502 includes the value in the column 1404 of the INC1, and whose column 1503 includes the value in the column 1405 of the INC1, the related incident discovery program 335 determines in Step S110 that the operations manager shown by the LOG1 is responsible for the monitoring subject and the monitoring item that are shown by the INC1.

When determined in Step S110 that the operations manager shown by the LOG1 is not responsible for the monitoring subject and the monitoring item that are shown by the INC1, the operations manager shown by the LOG1 has not accessed the historical data to solve the incident shown by the INC1. Accordingly, the related incident discovery program 335 executes Step S107 to further retrieve an incident related to the LOG1.

When determined in Step S110 that the operations manager shown by the LOG1 is responsible for the monitoring subject and the monitoring item that are shown by the INC1, it is likely that the access shown by the LOG1 has been made to solve the incident shown by the INC1. Accordingly, the related incident discovery program 335 executes Step S111.

In Steps S111 and S112, the related incident discovery program 335 determines whether or not the historical data that is displayed by the access shown by the LOG1 is related to the INC1.

After Step S109 or S110, the related incident discovery program 335 uses the dependency relation data 1700 to determine whether or not the monitoring subject shown by the column 1404 of the INC1 has a dependency relation with the monitoring subject shown by the column 1307 of the LOG1, or whether or not the monitoring subject shown by the column 1404 of the INC1 matches the monitoring subject shown by the column 1307 of the LOG1 (Step S111).

Specifically, when the dependency relation data 1700 includes a row whose column 1702 includes the monitoring subject shown by the INC1 and whose column 1701 includes the monitoring subject shown by the LOG1, or a row whose column 1701 includes the monitoring subject shown by the INC1 and whose column 1702 includes the monitoring subject shown by the LOG1, the related incident discovery program 335 determines in Step S111 that the monitoring subject shown by the INC1 has a dependency relation with the monitoring subject shown by the LOG1.

When it is determined in Step S111 that the monitoring subject shown by the INC1 has a dependency relation with the monitoring subject shown by the LOG1, or that the monitoring subject shown by the INC1 matches the monitoring subject shown by the LOG1, it is likely that the access shown by the LOG1 has been made to solve the INC1. Accordingly, the related incident discovery program 335 executes Step S113.

When it is determined in Step S111 that the monitoring subject shown by the INC1 does not have a dependency relation with the monitoring subject shown by the LOG1, and that the monitoring subject shown by the INC1 does not match the monitoring subject shown by the LOG1, the related incident discovery program 335 uses the service data 1800 to determine whether or not the monitoring subject shown by the INC1 and the monitoring subject shown by the LOG1 provide the same service (Step S112).

Specifically, when rows having the monitoring subject shown by the INC1 included in the column 1802 and rows having the monitoring subject shown by the LOG1 included in the column 1802 include a row having the same value in the column 1801, the related incident discovery program 335 determines in Step S112 that the monitoring subject shown by the INC1 and the monitoring subject shown by the LOG1 provide the same service.

When it is determined in Step S112 that the monitoring subject shown by the INC1 and the monitoring subject shown by the LOG1 do not provide the same service, the access shown by the LOG1 is not associated with the incident shown by the INC1. Accordingly, the related incident discovery program 335 executes Step S107 to further retrieve an incident related to the LOG1.

When it is determined in Step S112 that the monitoring subject shown by the INC1 and the monitoring subject shown by the LOG1 provides the same service, it is likely that the access shown by the LOG1 has been made to solve the incident shown by the INC1. Accordingly, the related incident discovery program 335 executes Step S113.

After Step S111 or S112, the related incident discovery program 335 generates an incident-specific access log that contains values to be stored in the column 1301 and the columns 1303 to 1310 of the LOG1, and a value to be stored in the column 1401 of the INC1. Then, the generated incident-specific access log is stored in the incident-specific access log 1600 of the database 4 (Step S113).

For example, the incident-specific access log in the row 1611 illustrated in FIG. 10 is generated based on the access log in the row 1311 illustrated in FIG. 7, and the incident ID in the row 1421 illustrated in FIG. 8. In other words, the incident ID "1" shown by the column 1401 of the row 1421 is stored in the column 1602 of the row 1611. The column 1301 of the row 1311 is stored in the column 1601 of the row 1611, and the columns 1303 to 1310 of the row 1311 are stored in the columns 1603 to 1610 of the row 1611.

After Step S113, the related incident discovery program 335 executes Step S107 to further retrieve an incident related to the LOG1.

When one access to historical data is associated with a plurality of incidents, rows including the same access log ID and including different incident IDs may be stored in the incident-specific access log 1600 through the processes illustrated in FIGS. 14A and 14B.

Further, every time the processes illustrated in FIGS. 14A and 14B are carried out, the related incident discovery program 335 may delete a past incident-specific access log 1600 and generate a new incident-specific access log 1600. In this manner, the incident-specific access log 1600 is always updated based on the latest access and incident.

Further, in the processes illustrated in FIG. 14B and FIG. 14A, the related incident discovery program 335 executes the processes of Steps S106, S109, S110, S111, and S112 to identify the incident data to be associated with the access log. However, the related incident discovery program 335 may execute any process other than the above-mentioned processes as long as the incident data is associated with the access log.

Further, the related incident discovery programs 335 may associate the access log with the incident data by performing at least one of Steps S106, S109, S110, S111, and S112.

Figure 15A:
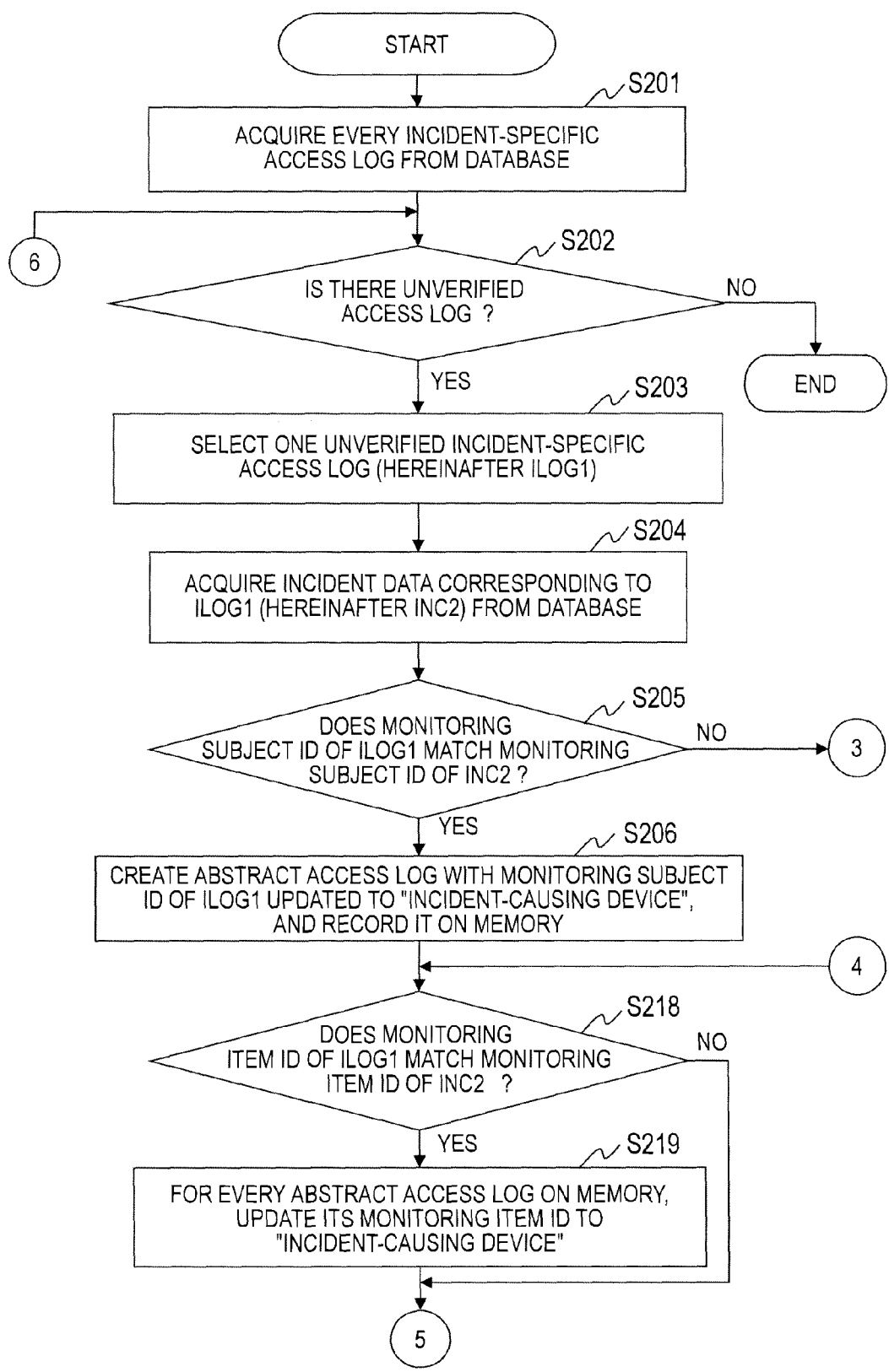
FIG. 15A is a flowchart illustrating a process of abstracting a monitoring subject and a monitoring item in a process of abstracting an access log according to the first embodiment of this invention.

FIG. 15A is a flowchart illustrating a process of abstracting a monitoring subject and a monitoring item in a process of abstracting an access log according to the first embodiment of this invention.

Figure 15B:
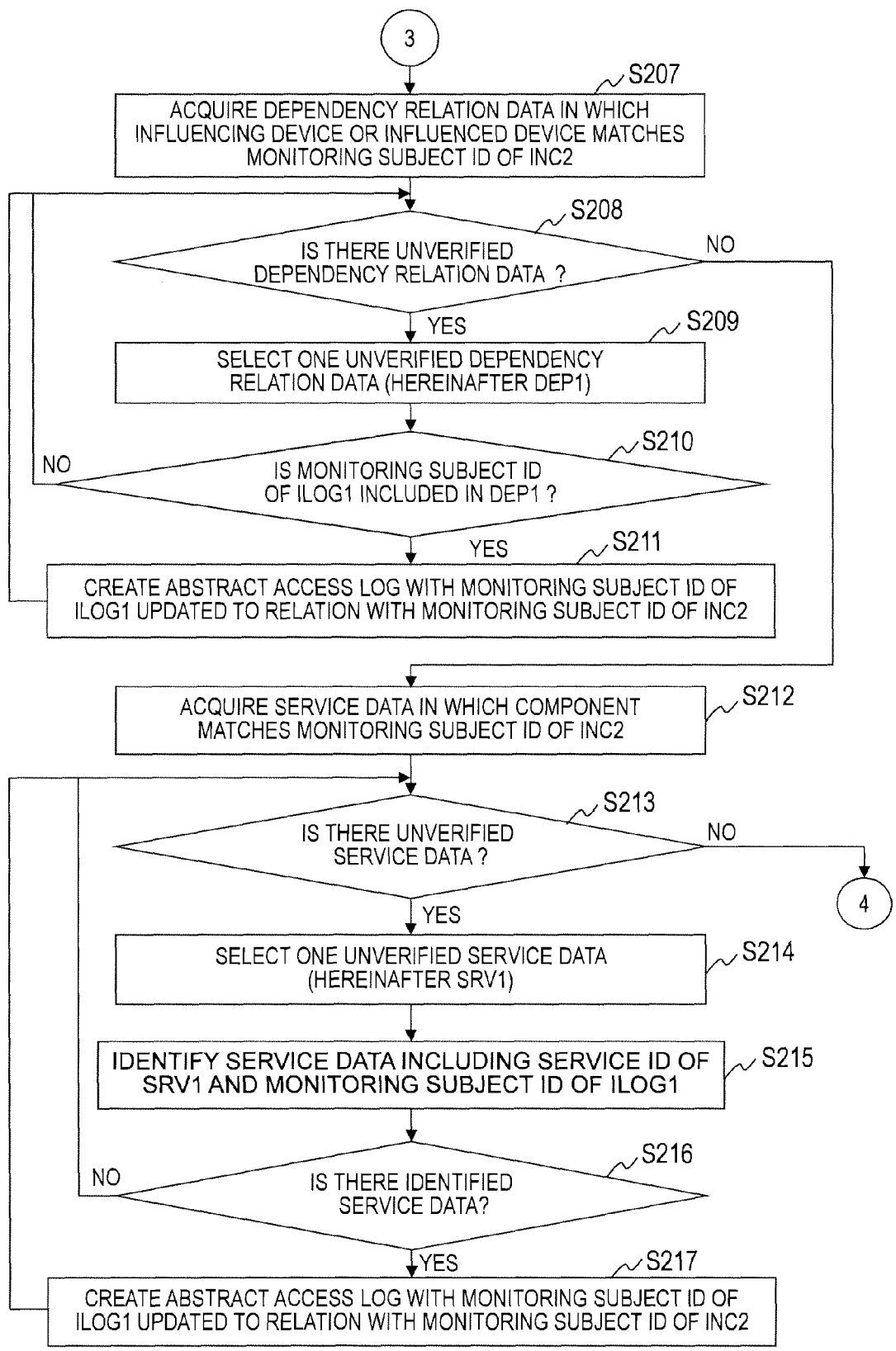
FIG. 15B is a flowchart illustrating a process of abstracting a monitoring subject other than an incident-causing device in the process of abstracting an access log according to the first embodiment of this invention.

FIG. 15B is a flowchart illustrating a process of abstracting a monitoring subject other than an incident-causing device in the process of abstracting an access log according to the first embodiment of this invention.

Figure 15C:
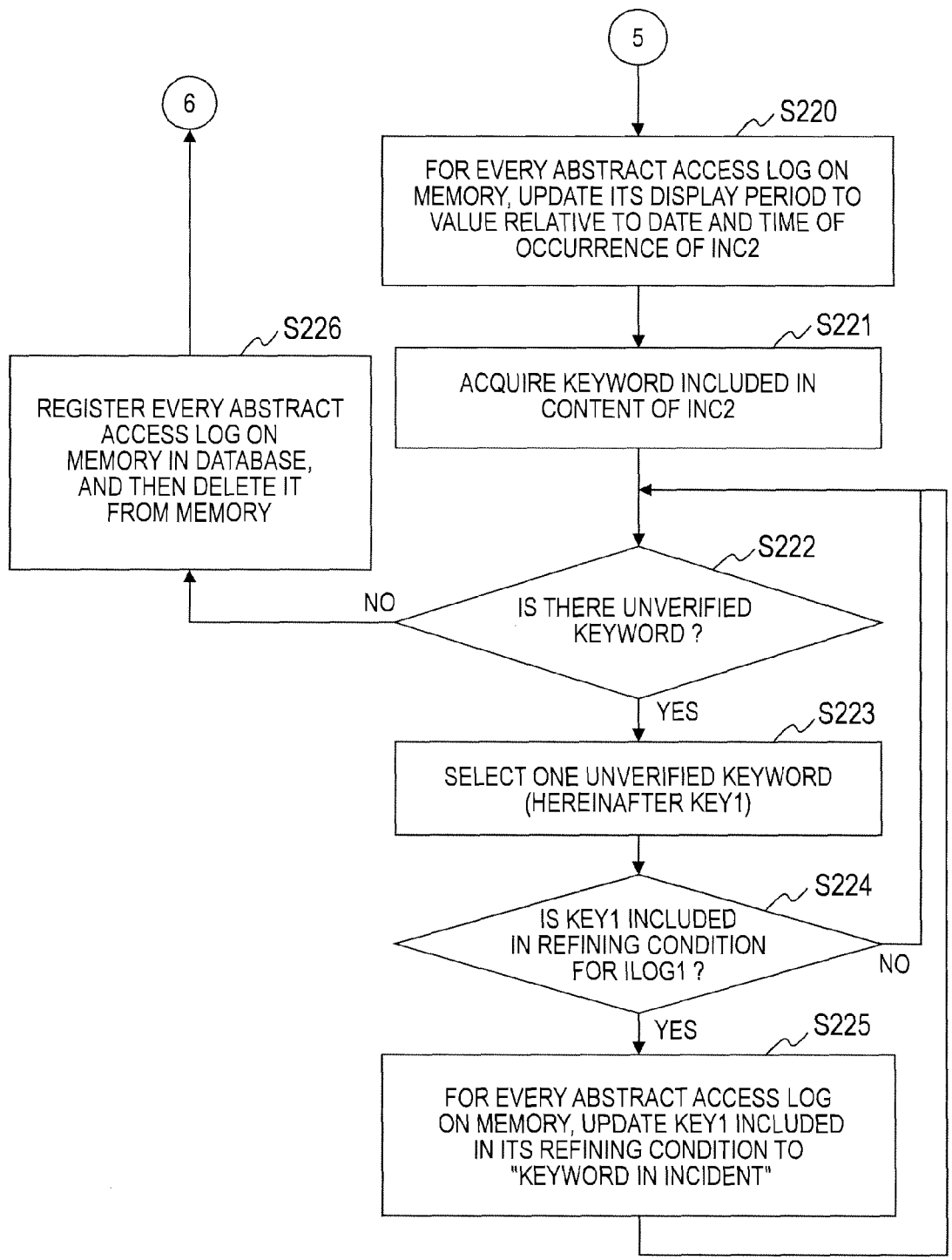
FIG. 15C is a flowchart illustrating a process of abstracting a display period and a refining condition in the process of abstracting an access log according to the first embodiment of this invention.

FIG. 15C is a flowchart illustrating a process of abstracting a display period and a refining condition in the process of abstracting an access log according to the first embodiment of this invention.

The access log abstraction program 336 executes the abstraction process of transforming the incident-specific access log 1600 into the abstract access log 1900 through the processes illustrated in FIGS. 15A to 15C. When a new incident-specific access log is stored in the incident-specific access log 1600, the access log abstraction program 336 starts the process illustrated in FIG. 15A.

The access log abstraction program 336 acquires every incident-specific access log from the abstract access log 1900 in the database 4 (Step S201). After Step S201, the access log abstraction program 336 determines whether or not the incident-specific access logs acquired in Step S201 include an incident-specific access log which has not been subjected to the process of Step S204 and subsequent processes (Step S202). When there is not any incident-specific access log which has not been subjected to the process of Step S204 and subsequent processes, the access log abstraction program 336 terminates the processes of FIGS. 15A to 15C.

When it is determined in Step S202 that there is an incident-specific access log which has not been subjected to the process of Step S204 and subsequent processes, the access log abstraction the program 336 selects one incident-specific access log which has been acquired in Step S201 and has not been subjected to the process of Step S204 and subsequent processes (Step S203). The incident-specific access log selected in Step S203 is hereinafter referred to as "ILOG1".

For the incident-specific access logs that have been subjected to the abstraction process of FIGS. 15A to 15C by the access log abstraction program 336 in the past and that satisfy the following conditions, the access log abstraction program 336 may not acquire such incident-specific access logs in Step S201. This is because even when the incident-specific access logs subjected to the abstraction process in the past and satisfying all of the following conditions are subjected to the abstraction process again, only the same results as have been obtained in the past abstraction process are obtained. Therefore, the access log abstraction program 336 does not acquire the incident-specific access logs subjected to the abstraction process in the past and satisfying all of the following conditions in Step S201, thereby shortening the processing time.

The first condition for the incident-specific access logs that are not acquired in Step S201 is that the incident ID shown by an incident-specific access log 1600 (corresponding to the column 1602 of the incident-specific access log 1600) has not been changed since the previous execution of the processes of FIGS. 15A to 15C.

The second condition for the incident-specific access logs that are not acquired in Step S201 is that the row of the dependency relation data 1700 including an incident-causing device where incident data shown by the incident-specific access log has occurred (corresponding to the column 1404 of incident data 1400) and the monitoring subject in the incident-specific access log (corresponding to the column 1607 of the incident-specific access log 1600) has not been changed since the previous execution of the processes of FIGS. 15A to 15C.

The third condition for the incident-specific access logs that are not acquired in Step S201 is that the row of the service data 1800 including an incident-causing device where incident data shown by the incident-specific access log has occurred (corresponding to the column 1412 of incident data 1400) and the monitoring subject in the incident-specific access log (corresponding to the column 1607 of the incident-specific access log 1600) has not been changed since the previous execution of the processes of FIGS. 15A to 15C.

After Step S203, the access log abstraction program 336 acquires, as incident data, rows of the incident data 1400 including the incident ID shown by the column 1602 of the ILOG1 in the column 1401 from the database 4 (Step S204). The incident data acquired in Step S204 is hereinafter referred to as "INC2".

It should be noted that in Step S204, the access log abstraction program 336 stores the column 1601, the column 1602, and the columns 1607 to 1610 of the ILOG1 in the memory 33 as a column 1902, a column 1903, and columns 1904 to 1907 of the abstract access log corresponding to the ILOG1, respectively. In Steps S205 and S206 illustrated in FIG. 15A, and in Steps S207 to S217 illustrated in FIG. 15B, the access log abstraction program 336 stores the abstracted monitoring subject ID in the column 1904 of the abstract access log corresponding to the ILOG1.

After Step S204, the access log abstraction program 336 determines whether or not the monitoring subject shown by the column 1607 of the ILOG1 matches the monitoring subject shown by the column 1404 of the INC2 (Step S205). This determination is made to abstract the monitoring subject ID of the ILOG1 based on the relation between the monitoring subject viewed by the access shown by the ILOG1 and the monitoring subject where the INC2 has occurred.

When it is determined in Step S205 that the monitoring subject shown by the column 1607 of the ILOG1 matches the monitoring subject shown by the column 1404 of the INC2, the access log abstraction program 336 updates a value included in the column 1607 of the ILOG1 with a character string "incident-causing device", to thereby generate an abstract access log in the memory 33 (Step S206). Specifically, in Step S206, the access log abstraction program 336 updates the column 1904 of the abstract access log stored in the memory 33 corresponding to the ILOG1 with "incident-causing device".

This is because when the monitoring subject shown by the column 1607 of the ILOG1 matches the monitoring subject shown by the column 1404 of the INC2, the ILOG1 shows an access to the historical data that is generated by the monitoring subject of the incident-causing device. It should be noted that the character string "incident-causing device" is a character string set in advance by the operations manager or the like.

When it is determined in Step S205 that the monitoring subject shown by the column 1607 of the ILOG1 does not match the monitoring subject shown by the column 1404 of the INC2, the access log abstraction program 336 executes the abstraction process of Steps S207 to S217 illustrated in FIG. 15B.

In Step S207 of FIG. 15B, the access log abstraction program 336 acquires, from the dependency relation data 1700 in the database 4, the dependency relation data showing that the monitoring subject of the influencing device shown by the column 1701 or the monitoring subject of the influenced device shown by the column 1702 matches the monitoring subject shown by the column 1404 of the INC2 (Step S207).

After Step S207, the access log abstraction program 336 determines whether or not the dependency relation data acquired in Step S207 includes dependency relation data which has not been subjected to the process of Step S210 (Step S208). When there is no dependency relation data which has not been subjected to the process of Step S210, the access log abstraction program 336 executes the process of Step S212.

When it is determined in Step S208 that there is dependency relation data which has not been subjected to the process of Step S210, the access log abstraction program 336 selects one piece of dependency relation data which has not been subjected to the process of Step S210 from the dependency relation data acquired in Step S207 (Step S209). The dependency relation data selected in Step S209 is hereinafter referred to as "DEP1".

After Step S209, the access log abstraction program 336 determines whether or not the monitoring subject of the influencing device shown by the column 1701 of the DEP1 or the monitoring subject of the influenced device shown by the column 1702 of the DEP1 includes the monitoring subject shown by the column 1607 of the ILOG1 (Step S210). When the monitoring subject ID shown by the column 1607 of the ILOG1 is included in the DEP1, the monitoring subject shown by the column 1404 of the INC2 has a dependency relation with the monitoring subject shown by the column 1607 of the ILOG1.

In other words, when the monitoring subject shown by the column 1607 of the ILOG1 is included in DEP1, the access log abstraction program 336 can abstract the monitoring subject ID shown by the column 1607 using the dependency relation between the monitoring subject shown by the column 1404 of the INC2 and the monitoring subject shown by the column 1607 of the ILOG1. Specifically, the access log abstraction program 336 generates an abstract access log corresponding to the ILOG1 by updating the value included in the column 1904 of the abstract access log corresponding to the ILOG1 with a character string indicating the dependency relation between the monitoring subject shown by the column 1607 of the ILOG1 and the monitoring subject of the incident-causing device shown by the column 1404 of the INC2 (Step S211).

For example, when the INC2 is the row 1421 illustrated in FIG. 8, and the ILOG1 is the row 1612 illustrated in FIG. 10, the DEP1 is a row 1711 or a row 1713 of FIG. 11. Through the processes of Steps S208 to S210, the access log abstraction program 336 determines that the monitoring subject (switch 1) shown by the column 1607 of the row 1612 is included in the row 1711. Then, the access log abstraction program 336 updates the value "switch 1" in the column 1607 of the ILOG1 with a character string "upstream switch of incident-causing device" in Step S211 to generate an abstract access log which is the abstracted version of the monitoring subject of the ILOG1.

Here, the character string with which the value of the column 1607 is updated is determined in advance in accordance with the value included in the DEP1. After Step S211, the access log abstraction program 336 executes Step S208 to further retrieve dependency relation data including the monitoring subject shown by the ILOG1.

After Step S208, in other words, after the ILOG1 is updated to an abstract access log based on the dependency relation between the INC2 and the ILOG1, the access log abstraction program 336 acquires service data where the monitoring subject shown by the column 1802 matches the monitoring subject shown by the column 1404 of the INC2 from the service data 1800 in the database 4 (Step S212).

After Step S212, the access log abstraction program 336 determines whether or not the service data acquired in Step S212 includes service data which has not been subjected to the processes of Steps S215 and S216 (Step S213). When there is not any service data which has not been subjected to the processes of Steps S215 and S216, the access log abstraction program 336 terminates the process illustrated in FIG. 15B, and executes Step S218 illustrated in FIG. 15A.

When it is determined in Step S213 that there is service data which has not been subjected to the processes of Steps S215 and S216, the access log abstraction program 336 selects one piece of service data which has not been subjected to the processes of Steps S215 and S216 from the service data acquired in Step S212 (Step S214). The service data selected in Step S214 is hereinafter referred to as "SRV1".

After Step S214, the access log abstraction program 336 uses the service data 1800 in the database 4 to identify service data where the service ID shown by the column 1801 matches the service ID shown by the column 1801 of the SRV1 and the component shown by the column 1802 matches the monitoring subject shown by the column 1607 of the ILOG1 (Step S215). In other words, the access log abstraction program 336 identifies one of the services provided by the monitoring subject shown by the INC2 which matches the service provided by the monitoring subject shown by the ILOG1.

After Step S215, the access log abstraction program 336 determines from the result of Step S215 whether or not service data is identified in the service data 1800 (Step S216). When it is determined from the result of Step S215 that service data is not identified in the service data 1800, the access log abstraction program 336 executes Step S213 to further retrieve service data including the monitoring subject shown by the ILOG1.

When it is determined from the result of Step S215 that service data is identified in the service data 1800, the monitoring subject shown by the column 1404 of the INC2 and the monitoring subject shown by the column 1607 of the ILOG1 provide the same service. When the monitoring subject shown by the column 1404 of the INC2 and the monitoring subject shown by the column 1607 of the ILOG1 provide the same service, the access log abstraction program 336 updates the column 1904 of the abstract access log corresponding to the ILOG1 with a character string indicating the service data identified in Step S216 (Step S217).

Specifically, when the abstract access log corresponding to the ILOG1 has already been generated in the memory 33 in Step S211, the access log abstraction program 336 adds in Step S217 a character string indicating the service data identified in Step S216 to the column 1904 of the abstract access log to be stored in the memory 33. In other words, the access log abstraction program 336 adds a character string indicating the service data identified in Step S216 to the character string indicating the dependency relation between the monitoring subject shown by the INC2 and the monitoring subject shown by the ILOG1. As a result, the monitoring subject ID shown by the ILOG1 is abstracted by the dependency relation between the monitoring subject shown by the INC2 and the monitoring subject shown by the ILOG1 and the service data that is provided by both of the monitoring subject shown by the INC2 and the monitoring subject shown by the ILOG1.

When Step S211 is not executed, the access log abstraction program 336 updates in Step S217 the value included in the column 1607 of the ILOG1 with the character string indicating the service data identified in Step S216, to thereby generate an abstract access log corresponding to the ILOG1.

After Step S217, the access log abstraction program 336 executes Step S213 to further retrieve service data including the monitoring subject shown by the ILOG1.

Although the column 1904 illustrated in FIG. 13 includes a character string that is abstracted by a text whose meaning is recognizable by a person, the column 1904 of the abstract access log 1900 of this embodiment may hold character strings to be added in Steps S211 and S217 by separating the character strings by, for example, a comma.

As indicated by the processes illustrated in FIGS. 15A and 15B, the access log abstraction program 336 according to this embodiment abstracts an access log by a plurality of rules by abstracting the monitoring subject ID of the ILOG1 using the character string indicating the dependency relation between the monitoring subject shown by the INC2 and the monitoring subject shown by the ILOG1 or the character string indicating the service provided by both of the monitoring subject shown by the INC2 and the monitoring subject shown by the ILOG1. Through the above-mentioned abstraction of the monitoring subject ID by a plurality of rules, the access log abstraction program 336 can increase abstract access logs available in the process of recommending historical data to be described later, and can further increase the accuracy of the recommendation process.

After Step S206 illustrated in FIG. 15A or Step S213 illustrated in FIG. 15B, the access log abstraction program 336 abstracts the monitoring item of the ILOG1 in Steps S218 and S219. The access log abstraction program 336 determines whether or not the monitoring item shown by the column 1608 of the ILOG1 matches the monitoring item shown by the column 1405 of the INC2 (Step S218).

When it is determined in Step S218 that the monitoring item shown by the column 1608 of the ILOG1 matches the monitoring item shown by the column 1405 of the INC2, the access log abstraction program 336 updates the column 1905 of every abstract access log corresponding to the ILOG1 stored in the memory 33 through the processes up to the process of Step S218 with a character string "incident-causing device" (Step S219).

When the INC2 is the row 1421 illustrated in FIG. 8 and the ILOG1 is the row 1611 illustrated in FIG. 10, the monitoring item where an incident has occurred is the same as the monitoring item of the displayed historical data. Accordingly, the access log abstraction program 336 updates the column 1905 of the abstract access log corresponding to the ILOG1 stored in the memory 33 with the character string "incident-causing device".

After Step S219 or when it is determined in Step S218 that the monitoring item shown by the column 1608 of the ILOG1 does not match the monitoring item shown by the column 1405 of the INC2, the access log abstraction program 336 executes Step S220 illustrated in FIG. 15C. When it is determined in Step S218 that the monitoring item shown by the column 1608 of the ILOG1 does not match the monitoring item shown by the column 1405 of the INC2, the access log abstraction program 336 does not update the column 1905 of the abstract access log corresponding to the ILOG1 stored in the memory 33. In other words, the access log abstraction program 336 determines the value of the column 1905 of the abstract access log for the value stored in the column 1608 of the ILOG1.

When it is determined in Step S218 that the monitoring item shown by the column 1608 of the ILOG1 does not match the monitoring item shown by the column 1405 of the INC2, the access log abstraction program 336 may abstract the monitoring item shown by the column 1608 of the ILOG1 in accordance with a predetermined rule. When the column 1608 of the ILOG1 indicates "CPU usage rate of OS", for example, the access log abstraction program 336 may update the column 1608 with a character string "performance value of OS" in accordance with a predetermined rule. In addition, when the column 1608 shows "log of Web application A", the column 1608 may be updated with a character string "log of Web application".

Updating the character string in accordance with a predetermined rule to increase the degree of abstraction of monitoring items shown by the incident-specific access log 1600 this way reduces the accuracy of the historical data to be recommended to the operations manager. However, increasing the degree of abstraction makes it possible to roughly classify abstract access logs, leading to an advantage that the tendency indicating what historical data is displayed frequently can be obtained in the recommendation process to be described later. Therefore, the above-mentioned rule-based abstraction is effective in a case where there are few rows to be stored in the incident-specific access log 1600 in the database 4.

After Step S219 or S218, the access log abstraction program 336 executes Step S220 in FIG. 15C. In Step S220, the access log abstraction program 336 abstracts the display period shown by the column 1609 of the ILOG1. The access log abstraction program 336 updates the value of the column 1906 of every abstract access log corresponding to the ILOG1 in the memory 33 with a character string indicating the relative relation between the display period shown by the column 1609 of the ILOG1 and the date and time of occurrence shown by the column 1407 of the INC2.

When the INC2 is the row 1421 illustrated in FIG. 8 and the ILOG1 is the row 1611 illustrated in FIG. 10, for example, the date and time of occurrence of the incident shown by the column 1407 of the INC2 is the same as the display period for the historical data shown by the column 1609 of the ILOG1, and hence the access log abstraction program 336 updates the column 1906 of the abstract access log corresponding to the ILOG1 in the memory 33 with a character string "date and time of occurrence of incident".

After Step S220, the access log abstraction program 336 abstracts a refining condition for the ILOG1. First, the access log abstraction program 336 acquires a feature word (hereinafter, keyword) from the contents of the incident shown by the column 1406 of the INC2 by using a template for a predetermined alert character string or a morphological analysis engine (Step S221).

After Step S221, the access log abstraction program 336 determines whether or not the keywords acquired in Step S221 include a keyword which has not been subjected to the process of Step S224 (Step S222).

When it is determined in Step S222 that there are some keywords which have not been subjected to the process of Step S224, the access log abstraction program 336 selects one keyword which has not been subjected to the process of Step S224 from the keywords acquired in Step S221 (Step S223). The selected keyword is hereinafter referred to as "KEY1".

After Step S223, the access log abstraction program 336 determines whether or not the KEY1 is included in the refining condition shown by the column 1610 of the ILOG1 (Step S224). When the KEY1 is included in the refining condition shown by the column 1610, the access log abstraction program 336 updates the KEY1 included in the column 1907 of every abstract access log stored in the memory 33 with a character string "keyword in incident" (Step S225).

When the INC2 is the row 1423 illustrated in FIG. 8 and the ILOG1 is the row 1621 illustrated in FIG. 10, for example, the keyword (KEY1) acquired from the contents of the incident shown by the column 1406 of the INC2 is "upload data error". The refining condition shown by the column 1610 of the ILOG1 is "search by 'upload data error'" including the KEY1. Accordingly, in Step S225, the access log abstraction program 336 updates the value of the column 1907 of the abstract access log corresponding to the ILOG1 with "search by keyword in incident" as in the column 1907 of the row 1920 in FIG. 13.

After Step S225, the access log abstraction program 336 executes Step S222 to further validate a keyword included in the contents of the incident of the INC2.

When it is determined in Step S222 that there is no keyword which has not been subjected to the process of Step S224, the access log abstraction program 336 adds every abstract access log corresponding to the ILOG1 stored in the memory 33 to the abstract access log 1900 in the database 4 (Step S226). Then, the access log abstraction program 336 deletes all the abstract access logs stored in the memory 33, and executes Step S202 illustrated in FIG. 15A to process a next incident-specific access log.

The historical data display program 332 recommends historical data to the operations manager by using the abstract access log 1900 generated by the processes illustrated in FIGS. 15A to 15C. The following describes an example of the recommendation process.

Figure 16:
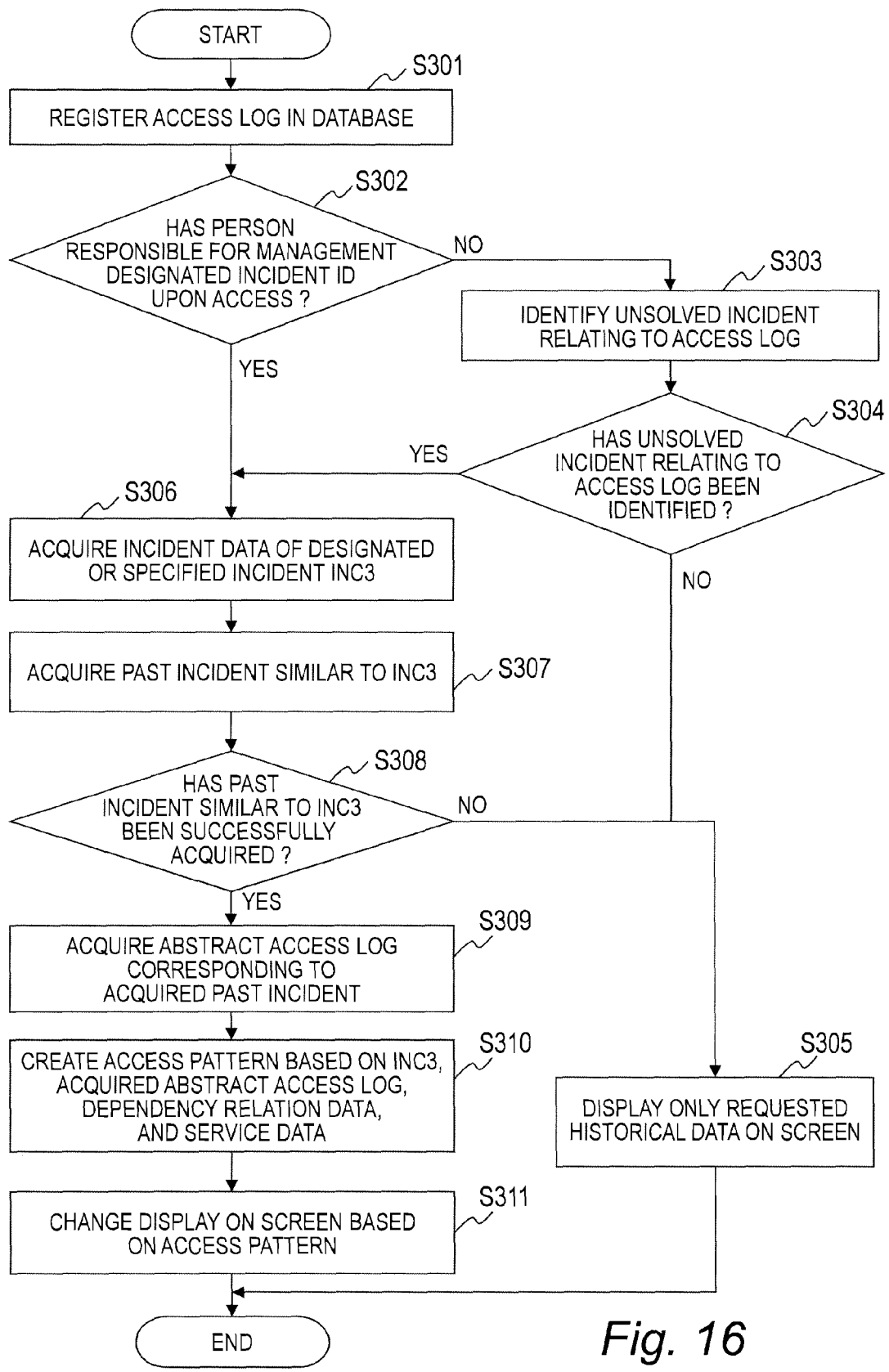
FIG. 16 is a flowchart illustrating a historical-data recommending process that is performed by a historical data display program according to the first embodiment of this invention.

FIG. 16 is a flowchart illustrating a historical-data recommending process that is performed by the historical data display program 332 according to the first embodiment of this invention.

When receiving a request to output historical data (display request) from the operations manager, the historical data display program 332 executes the process of recommending historical data illustrated in FIG. 16.

First, the historical data display program 332 stores an access log showing the historical-data display request received from the operations manager in the access log 1300 in the database 4 (Step S301). After Step S301, the historical data display program 332 determines whether or not the display request made by the operations manager includes the incident ID (Step S302).

According to this embodiment, when the operations manager recognizes the incident ID of the incident whose data is intended to be acquired by the operations manager at the time of inputting the display request for historical data to the manager terminal 20, the operations manager inputs the historical-data display request and the incident ID to the manager terminal 20.

When it is determined in Step S302 that the incident ID is included in the display request for historical data, the historical data display program 332 executes Step S306. When it is determined in Step S302 that the incident ID is not included in the historical-data display request, on the other hand, the historical data display program 332 acquires an access log stored in the access log 1300 in Step S301, that is, an access log showing the display request made by the operations manager. Then, the historical data display program 332 identifies an unsolved incident related to the acquired access log (Step S303).

In Step S303, the historical data display program 332 executes the same processes as Step S106 illustrated in FIG. 14A and as Steps S108 to S113 illustrated in FIG. 14B which are executed by the related incident discovery program 335. Specifically, in Step S303, the historical data display program 332 identifies incident data related to the access log based on an access time (column 1303), the monitoring subject ID (column 1307), the monitoring item ID (column 1308), and the operations manager ID (column 1305) of the access log acquired in Step S303. It should be noted that the historical data display program 332 does not execute Step S107 in Step S303.

However, when the historical data display program 332 executes Step S113 in Step S303, the historical data display program 332 executes Step S304 illustrated in FIG. 16 instead of generating an incident-specific access log. After Step S303, the historical data display program 332 determines whether or not an unsolved incident related to the acquired access log is identified (Step S304).

When an unsolved incident related to the acquired access log is not identified in Step S304, the historical data display program 332 displays only the historical data requested by the historical-data display request on the screen of the manager terminal 20, and then terminates the process (Step S305).

In the process of Step S306 and subsequent processes, a row of the incident data 1400 shown by the incident ID included in the historical-data display request or a row of the incident data 1400 showing the incident identified in Step S303 is referred to as "INC3". When a plurality of pieces of incident data are associated with the access log, the historical data display program 332 may execute the process of Step S306 and subsequent processes on each piece of incident data identified in Step S304.

When an unsolved incident related to the acquired access log is identified in Step S304, the historical data display program 332 acquires the data shown by the INC3 from the incident data 1400 in the database 4 (Step S306). After Step S306, the historical data display program 332 acquires past incident data similar to the INC3 from the incident data 1400 in the database 4 (Step S307).

To acquire past incident data similar to the INC3, the historical data display program 332 compares at least one of the columns 1402 to 1406 of the INC3 with at least one of the columns 1402 to 1406 of each incident data 1400 in Step S307. In the following description, the historical data display program 332 compares only the type of the incident shown by the column 1403 of the INC3 with the type of the incident shown by the column 1403 of each incident data to acquire past incident data similar to the INC3.

When the row 1424 illustrated in FIG. 8 is the INC3, for example, the column 1403 in the row 1424 shows "CPU load", and the column 1403 in both the columns 1421 and 1422 also shows "CPU load". Accordingly, past incident data similar to the INC3 is the row 1421 and the row 1422.

To improve the accuracy of the recommendation process, the historical data display program 332 may acquire similar incident data by comparing a greater number of pieces of data in the columns 1402 to 1406. In addition, the historical data display program 332 may acquire some of pieces of incident data having higher similarity from the top among those pieces of incident data which have been determined to be similar to the INC3 as a result of the comparison as past incident data.

After Step S307, the historical data display program 332 determines whether or not past incident data similar to the INC3 has been successfully acquired from the incident data 1400 in the database 4 in Step S307 (Step S308). When it is determined in Step S308 that past incident data similar to the INC3 cannot be acquired, the historical data display program 332 executes Step S305.

When it is determined in Step S308 that past incident data similar to the INC3 has been successfully acquired, the historical data display program 332 acquires the abstract access log corresponding to the past incident data similar to the INC3 and acquired in Step S307 from the abstract access log 1900 in the database 4 (Step S309). Specifically, the historical data display program 332 acquires, as an abstract access log, a row of the abstract access log 1900 whose column 1903 includes the incident ID (column 1401) of the incident data acquired in Step S307.

After Step S309, the historical data display program 332 generates data for changing the display on the screen based on the INC3, the abstract access log acquired in Step S309, the dependency relation data 1700, and the service data 1800 (Step S310). The data for changing the display on the screen is hereinafter referred to as "access pattern". The process in Step S310 is described later.

After Step S310, the historical data display program 332 changes the display on the screen of the manager terminal 20 based on the access pattern generated in Step S310 (Step S311). After Step S311, the historical data display program 332 terminates the process illustrated in FIG. 16.

The following describes the process of generating an access pattern in Step S310 in detail.

The historical data display program 332 generates an access pattern stepwise. In the first stage, the historical data display program 332 calculates the importance of each abstract access log acquired in Step S309. In the second stage, the historical data display program 332 generates an access pattern based on the abstract access log weighted by the calculated importance.

FIG. 17 is an explanatory diagram illustrating weighted abstract access log 2000 in the first embodiment of this invention.

The weighted abstract access log 2000 includes columns 2001 to 2005. The weighted abstract access log 2000 illustrated in FIG. 17 also includes rows 2011 to 2016.

The columns 2001 to 2004 respectively correspond to the columns 1904 to 1907 of the abstract access log 1900. The column 2005 shows the importance of the abstracted access log.

The weighted abstract access log 2000 is generated in such a way that the combination of the values to be stored in the columns 2001 to 2004 becomes unique. When two abstract access logs that have the same combinations of the values included in the columns 1904 to 1907 are stored in the abstract access log 1900, for example, the two abstract access logs that have the same combinations of the values included in the columns 1904 to 1907 are transformed into a single weighted abstract access log.

Then, the historical data display program 332 calculates the importance shown by the column 2005 in accordance with the number of the abstract access logs that are used in generating the single weighted abstract access log based on the two abstract access logs. In other words, a high importance is calculated for the access that is made frequently when an incident occurs. Further, a high importance is calculated for an abstract access log showing an access that plays an important role in solving the incident. Accordingly, a row that has a higher importance shown by the column 2005 is likely to be used in recommending historical data.

FIG. 18 is an explanatory diagram illustrating access pattern 2100 in the first embodiment of this invention.

The access pattern 2100 includes columns 2101 to 2105. The access pattern 2100 illustrated in FIG. 18 also includes rows 2111 to 2117.

The columns 2101 to 2105 respectively correspond to the columns 2001 to 2005 of the weighted abstract access log 2000. It should be noted however that the columns 2101 to 2104 of the access pattern 2100 include concrete values of the values stored in the columns 2001 to 2005 of the weighted abstract access log 2000. The access pattern 2100 is generated by the historical data display program 332 based on the weighted abstract access log 2000, the dependency relation data 1700, and the service data 1800.

The number of rows in the weighted abstract access log 2000 does not necessarily coincide with the number of rows in the access pattern 2100. This is because two or more access patterns may be generated from a single weighted abstract access log in accordance with the contents of the dependency relation data 1700 and the service data 1800, and no access pattern may be generated from a single weighted abstract access log.

The access pattern 2100 according to this embodiment shows the conditions for historical data that is to be recommended to the operations manager. The historical data display program 332 refers to the access pattern 2100 to generate data for recommending historical data to the operations manager.

Figure 19A:
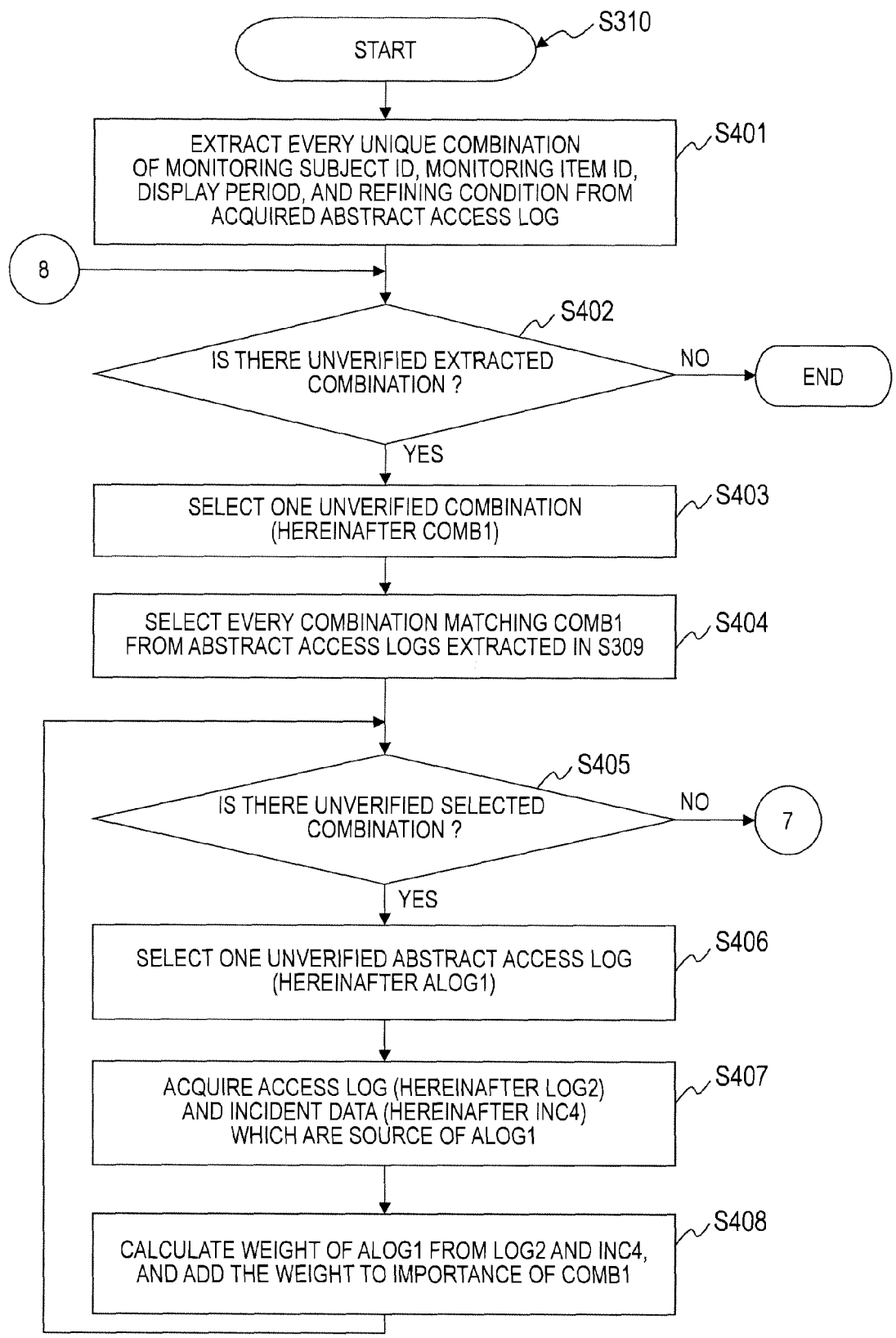
FIG. 19A is a flowchart illustrating a process of generating a weighted abstract access log by the historical data display program according to the first embodiment of this invention.

FIG. 19A is a flowchart illustrating a process of generating a weighted abstract access log 2000 by the historical data display program 332 of the first embodiment of this invention.

Figure 19B:
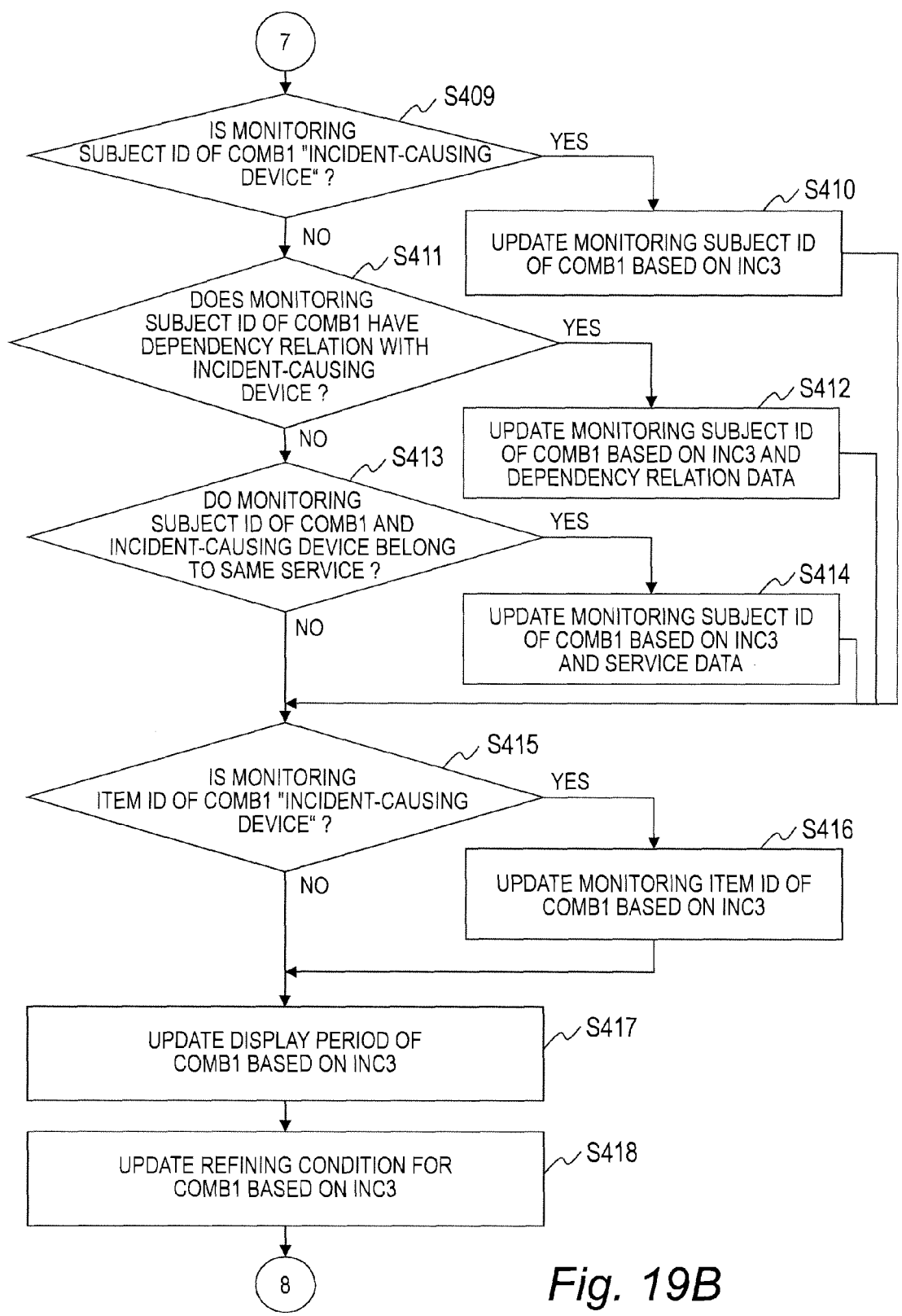
FIG. 19B is a flowchart illustrating a process of generating an access pattern by the historical data display program according to the first embodiment of this invention.

FIG. 19B is a flowchart illustrating a process of generating an access pattern 2100 by the historical data display program 332 of the first embodiment of this invention.

The processes illustrated in FIGS. 19A and 19B are the process of Step S310 illustrated in FIG. 16. Steps S401 to S408 illustrated in FIG. 19A represent the process of generating a weighted abstract access log 2000, and Steps S409 to S418 illustrated in FIG. 19B represent the process of generating an access pattern 2100 by concretizing the weighted abstract access log 2000.

The historical data display program 332 extracts every unique combination of the monitoring subject ID shown by the column 1904, the monitoring item ID shown by the column 1905, the display period shown by the column 1906, and the refining condition shown by the column 1907 from the abstract access log acquired in Step S309, namely, the abstract access log generated by incident data similar to the INC3 (Step S401). Then, the historical data display program 332 stores the extracted combinations in the columns 2001 to 2004 to generate the columns 2001 to 2004 of the weighted abstract access log in the memory 33.

After Step S401, the historical data display program 332 determines whether or not the combinations extracted in Step S401 include a combination which has not been subjected to the processes of Steps S404 and S405 (Step S402). When it is determined in Step S402 that there is no combination which has not been subjected to the processes of Step S404 and Step S405, the historical data display program 332 terminates the processes illustrated in FIG. 19A and FIG. 19B.

When it is determined in Step S402 that there is a combination which has not been subjected to the processes of Steps S404 and S405, the historical data display program 332 selects one of the combinations extracted in Step S401 (Step S403). The combination selected in Step S403 is hereinafter referred to as "COMB1".

With the combination selected in the process of Step S403, the historical data display program 332 can calculate the importance of the combination by calculating the sum of the weights calculated for each abstract access log in the process of Step S405 and subsequent processes.

After Step S403, the historical data display program 332 selects every abstract access log whose combination of the values stored in the columns 1904 to 1906 matches the combination COMB1 from the abstract access logs acquired in Step S309 (Step S404). This selection is made to calculate the importance for each COMB1 in the subsequent processes.

After Step S404, the historical data display program 332 determines whether or not the abstract access logs selected in Step S404 include an abstract access log which has not been subjected to the processes of Steps S407 and S408 (Step S405). When it is determined in Step S405 that there is no abstract access log which has not been subjected to the processes of Steps S407 and S408, the historical data display program 332 executes Step S409 illustrated in FIG. 19B.

When it is determined in Step S405 that there is an abstract access log which has not been subjected to the processes of Steps S407 and S408, the historical data display program 332 selects one of the abstract access logs which have been selected in Step S404 and have not been subjected to the processes of Steps S407 and S408 (Step S406). The abstract access log selected in Step S406 is hereinafter referred to as "ALOG1".

After Step S406, the historical data display program 332 acquires the access log (hereinafter, LOG2) shown by the column 1902 of the ALOG1 and the incident data (hereinafter, INC4) shown by the column 1903 from the access log 1300 and the incident data 1400 in the database 4 (Step S407). After Step S407, the historical data display program 332 calculates the weight of the ALOG1 based on the LOG2 and the INC4, and adds the calculated weight to the importance of the COMB1 (Step S408).

The first to ninth methods described below, for example, are available as the method of calculating the weight of the ALOG1 in Step S408. Further, the weight of the ALOG1 may be calculated by any combination of the following first to ninth methods.

The determination made in the first to ninth methods for calculating the weight of the ALOG1 is used to determine whether or not the access shown by the LOG2 is made to solve the incident shown by the INC4. Therefore, when it is determined that the access shown by the LOG2 has been made to solve the incident shown by the INC4, the abstract historical data shown by the ALOG1 shows historical data that is displayed to cope with a failure or the like, and hence the historical data display program 332 increases the weight of the ALOG1.

According to the first method for calculating the weight of the ALOG1, the historical data display program 332 determines whether or not the operations manager shown by the column 1305 of the LOG2 matches the person in charge shown by the column 1408 of the INC4. When the operations manager shown by the column 1305 of the LOG2 matches the person in charge shown by the column 1408 of the INC4, the historical data display program 332 increases the weight of the ALOG1.

According to the second method for calculating the weight of the ALOG1, the historical data display program 332 determines based on the responsibility data 1500 whether or not the operations manager shown by the column 1305 of the LOG2 is the person responsible for the monitoring subject shown by the column 1404 and the monitoring item shown by the column 1405 of the INC4. When the operations manager shown by the column 1305 of the LOG2 is the person responsible for the monitoring subject shown by the column 1404 and the monitoring item shown by the column 1405 of the INC4, the historical data display program 332 increases the weight of the ALOG1.

According to the third method for calculating the weight of the ALOG1, the historical data display program 332 determines whether or not the access time shown by the column 1303 of the LOG2 is close to the date and time of occurrence shown by the column 1407 of the INC4. When the access time shown by the column 1303 of the LOG2 is close to the date and time of occurrence shown by the column 1407 of the INC4, the historical data display program 332 increases the weight of the ALOG1.

According to the fourth method for calculating the weight of the ALOG1, the historical data display program 332 determines whether or not the access time shown by the column 1303 of the LOG2 is close to the date and time of solution shown by the column 1410 of the INC4. When the access time shown by the column 1303 of the LOG2 is close to the date and time of solution shown by the column 1410 of the INC4, the historical data display program 332 increases the weight of the ALOG1.

According to the fifth method for calculating the weight of the ALOG1, the historical data display program 332 determines whether or not the column 1409 of the INC4 shows "solved". When the column 1409 of the INC4 shows "solved", the historical data display program 332 increases the weight of the ALOG1.

According to the sixth method for calculating the weight of the ALOG1, the historical data display program 332 determines whether or not the monitoring subject shown by the column 1307 and the monitoring item shown by the column 1308 of the LOG2 match the monitoring subject shown by the column 1404 and the monitoring item shown by the column 1405 of the INC4. When the monitoring subject shown by the column 1307 and the monitoring item shown by the column 1308 of the LOG2 match the monitoring subject shown by the column 1404 and the monitoring item shown by the column 1405 of the INC4, the historical data display program 332 increases the weight of the ALOG1.

According to the seventh method for calculating the weight of the ALOG1, the historical data display program 332 determines whether or not the monitoring subject shown by the column 1307 and the monitoring item shown by the column 1308 of the LOG2 match the monitoring subject of cause shown by the column 1412 and the monitoring item of cause shown by the column 1413 of the INC4. When the monitoring subject shown by the column 1307 and the monitoring item shown by the column 1308 of the LOG2 match the monitoring subject of cause shown by the column 1412 and the monitoring item of cause shown by the column 1413 of the INC4, the historical data display program 332 increases the weight of the ALOG1.

According to the eighth method for calculating the weight of the ALOG1, when the session ID (corresponding to the column 1306) of the access log showing the access that is determined to have been made to solve the incident shown by the INC4 by any of the above-mentioned first to seventh methods of calculating the weight of the ALOG1 is the same as the session ID shown by the column 1306 of the LOG2, the historical data display program 332 increases the weight of the ALOG1.

According to the ninth method for calculating the weight of the ALOG1, the historical data display program 332 determines whether or not the group shown by the column 1402 of the INC4 matches the group shown by the column 1304 of the LOG2. When the group shown by the column 1402 of the INC4 matches the group shown by the column 1304 of the LOG2, the historical data display program 332 increases the weight of the ALOG1.

By weighting the ALOG1 using any one of the first to ninth methods, the abstract access log created from the access log that has led to the solution of a past incident is given a greater importance than the abstract access log created from the access log that has not led to the solution of a past incident. Therefore, the historical data display program 332 uses the abstract access log given a large importance in the recommendation of historical data, thereby being capable of recommending historical data leading to the solution of the incident more accurately.

In general, when the service is carried out for a long period of time in the group 12 to which the operations manager belongs, the historical data display program 332 can improve the accuracy in the recommendation of historical data by using, by priority, the abstract access log showing that the group 12 shown by the column 1304 of the access log shown by the column 1902 of the abstract access log is the same as the group 12 including the monitoring subject where the incident shown by the column 1903 has occurred in the recommendation of historical data. This is because an incident specific to each group 12 is likely to occur. Accordingly, the ninth method is used.

In Step S408, the historical data display program 332 adds the weight of the ALOG1 which is calculated by the first to ninth methods described above to the importance of the COMB1.

In addition, the historical data display program 332 may calculate the importance of the abstract access log (COMB1) in accordance with the number of access logs (ALOG1) which are the sources of the abstract access log. For example, when the rows 1911 to 1918 in FIG. 13 have been subjected to the processes of Steps S406 to S408 as the ALOG1, the rows 2011 and 2012 of the weighted abstract access log 2000 have the importance of 2, and the rows 2013 to 2018 have the importance of 1 (the average value of the importance being 1.33, and the standard deviation being 0.52).

This is because, for example, there are two abstract access logs including the combination shown by the row 2011, namely, the rows 1911 and 1915 in FIG. 13, and there are two abstract access logs including the combination shown by the row 2012, namely, the rows 1914 and 1917 in FIG. 13.

However, as mentioned above, when the importance of the abstract access log is calculated in accordance with the number of access logs which are the sources of the abstract access log, the difference between the maximum and minimum values of the importance is small, and hence the operations manager has difficulty in determining the order to check the historical data. In this case, the historical data display program 332 can change the strength of recommendation to the operations manager by increasing the difference between the maximum and minimum values of the importance by using the method of calculating the importance in accordance with the number of access logs which are the sources of the abstract access log, and one of the above-mentioned first to ninth methods.

Specifically, the historical data display program 332 may further use the first method in addition to the method of calculating the importance in accordance with the number of access logs which are the sources of the abstract access log. In other words, the importance may be incremented by 2 when the operations manager shown by the column 1305 of the LOG2 matches the person in charge shown by the column 1408 of the INC4, and the importance may be incremented by 1 when they do not match each other. Accordingly, for example, as illustrated in FIG. 17, the importance of the row 2011 is calculated to be 3, and the importance of the row 2013 is calculated to be 2 (the average value of the importance being 2, and the standard deviation being 0.89).

The reason is as follows. The access logs which are the sources of the abstract access logs of the rows 1911 to 1914 (corresponding to the rows 1311 to 1314) show the access made by the person in charge (corresponding to the column 1408) for the incident data (row 1421) having an incident ID of 1. In addition, the access logs which are the sources of the abstract access logs of the rows 1915 to 1918 (corresponding to the rows 1317 to 1320) do not show the access made by the person in charge (corresponding to the column 1408) for the incident data (corresponding to row 1422) having an incident ID of 2.

Accordingly, the historical data display program 332 executes the process of Step S408. Through the process illustrated in FIG. 19B, the historical data display program 332 generates the access pattern 2100 based on the weighted abstract access log (COMB1) generated by the process of FIG. 19A.

When it is determined in Step S405 that the processes of Steps S406 to S408 have been executed on all of the combinations selected in Step S404, the process illustrated in FIG. 19B is executed. Through the processes of Steps S409 to S414, the historical data display program 332 transforms the monitoring subject ID shown by the column 2001 of the COMB1 into a specific value indicating the monitoring subject.

First, the historical data display program 332 determines whether or not the monitoring subject ID shown by the column 2001 of the COMB1 shows "incident-causing device" (Step S409). In other words, the historical data display program 332 transforms the string of characters of the abstracted monitoring subject ID into a concrete monitoring subject ID by using incident data (INC3) of the incident whose data is intended to be displayed by the operations manager.

When it is determined in Step S409 that the monitoring subject ID shown by the column 2001 of the COMB1 shows "incident-causing device", the historical data display program 332 transforms the value stored in the column 2001 of the COMB1 into the monitoring subject ID shown by the column 1404 of the INC3 (Step S410). After Step S410, the historical data display program 332 executes Step S415.

When it is determined in Step S409 that the monitoring subject ID shown by the column 2001 of the COMB1 does not show "incident-causing device", the historical data display program 332 determines whether or not the monitoring subject shown by the column 2001 of the COMB1 has a dependency relation with the monitoring subject of the incident-causing device (column 1404 of the INC3) using the dependency relation data 1700 (Step S411).

When it is determined in Step S411 that the monitoring subject shown by the column 2001 of the COMB1 has a dependency relation with the monitoring subject of the incident-causing device, the historical data display program 332 transforms the value stored in the column 2001 of the COMB1 into the monitoring subject ID of the monitoring subject having a dependency relation with the incident-causing device of the INC3 (Step S412). After Step S412, the historical data display program 332 executes Step S415.

In Step S412, the historical data display program 332 transforms the value stored in the column 2001 of the COMB1 using the dependency relation data 1700. It should be noted that when there are a plurality of monitoring subjects having a dependency relation with the monitoring subject shown by the column 2001 of the COMB1, the historical data display program 332 may generate a plurality of access patterns.

When it is determined in Step S411 that the monitoring subject shown by the column 2001 of the COMB1 does not have a dependency relation with the monitoring subject of the incident-causing device, the historical data display program 332 determines whether or not the monitoring subject ID shown by the column 2001 of the COMB1 provides the same service as the incident-causing device using the service data 1800 (Step S413).

When it is determined in Step S413 that the monitoring subject ID shown by the column 2001 of the COMB1 provides the same service as the incident-causing device, the historical data display program 332 transforms the value stored in the column 2001 of the COMB1 into the monitoring subject ID of the monitoring subject that provides the same service as the incident-causing device shown by the column 1404 of the INC3 (Step S414). After Step S414, the historical data display program 332 executes Step S415.

In Step S414, the historical data display program 332 transforms the value stored in the column 2001 of the COMB1 using the service data 1800. It should be noted that when there are a plurality of monitoring subjects that provide the same service as the monitoring subject shown by the column 2001 of the COMB1, the historical data display program 332 may generate a plurality of access patterns.

Because the monitoring subject ID in the row 2015 in FIG. 17 is "Web server in parallel to incident-causing device", for example, the historical data display program 332 executes the processes of Steps S413 and S414 on the row 2015. There are two Web servers that provide the same service as "host 50" which is the monitoring subject of the incident-causing device of the INC3 (column 1404), namely, "host 51" shown by the row 1818 and "host 52" shown by the row 1819 of the service data 1800. Therefore, the historical data display program 332 may generate two access patterns (rows 2115 and 2116 in FIG. 18) in Step S414.

When it is determined in Step S413 that the monitoring subject ID shown by the column 2001 of the COMB1 does not provide the same service as the monitoring subject of the incident-causing device, the historical data display program 332 transforms the monitoring item ID shown by the column 2002 of the COMB1 after Step S410, S412, or S414. The historical data display program 332 determines whether or not the value stored in the column 2002 of the COMB1 is "incident-causing device" (Step S415).

When it is determined in Step S415 that the value stored in the column 2002 of the COMB1 is "incident-causing device", the historical data display program 332 transforms the value stored in the column 2002 of the COMB1 into the monitoring item ID shown by the column 1405 of the INC3 (Step S416).

When it is determined in Step S415 that the value stored in the column 2002 of the COMB1 is not "incident-causing device", or after Step S416, the historical data display program 332 updates the display period shown by the column 2003 of the COMB1 based on the date and time of occurrence shown by the column 1407 of the INC3 (Step S417).

After Step S417, the historical data display program 332 updates the refining condition shown by the column 2004 of the COMB1 based on the keyword included in the contents of the incident shown by the column 1406 of the INC3 (Step S418).

After Step S418, the historical data display program 332 executes Step S402 illustrated in FIG. 19A. The above provides the details of the process of generating the access pattern 2100 in Step S310 illustrated in FIG. 16.

In Step S311 of FIG. 16, the historical data display program 332 may display historical data corresponding to the columns 2101 to 2104 in the descending order of the importance shown by the column 2105 of the generated access pattern 2100. Further, in Step S311 of FIG. 16, the historical data display program 332 may select an access pattern whose importance shown by the column 2105 is higher than a predetermined value, and display historical data corresponding to the columns 2101 to 2104 of the selected access pattern.

In FIGS. 16, 19A, and 19B, the historical data display program 332 acquires incident data of incidents similar to the incident whose data is intended to be displayed by the operations manager from the incident data 1400 stored in the past. Then, the historical data display program 332 generates an access pattern showing historical data to recommend to the operations manager using the abstract access log generated from the acquired incident data. Accordingly, the historical data display program 332 can use the access directly leading to the solution of past incidents, thereby increasing the accuracy of the recommendation function.

Figure 20A:
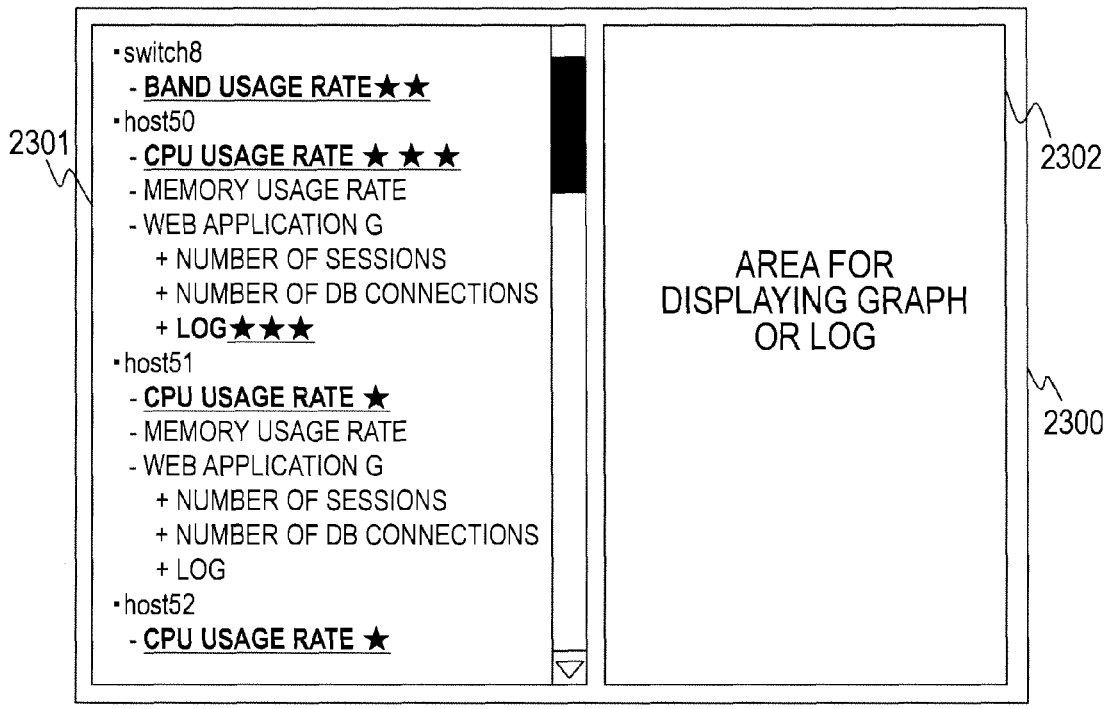
FIG. 20A is an explanatory diagram illustrating a screen for displaying historical data that is recommended to an operations manager according to the first embodiment of this invention.

FIG. 20A is an explanatory diagram illustrating a screen 2300 for displaying historical data that is recommended to the operations manager according to the first embodiment of this invention.

FIG. 20A shows the screen 2300 for recommending, to the operations manager, the historical data to be viewed by the operations manager. The screen 2300 includes two panes (pane 2301 and pane 2302). The left pane 2301 displays links to historical data for selecting the historical data, and the right pane 2302 displays the selected historical data.

FIG. 20A shows an example where, of the links to the historical data that has already been displayed in the pane 2301, the links corresponding to the access pattern 2100 generated by the processes in FIGS. 19A and 19B are highlighted by the historical data display program 332. In Step S311, the historical data display program 332 may highlight links to historical data by displaying the links to historical data in bold. Alternatively, the historical data display program 332 may highlight links to historical data by displaying a greater number of stars in the descending order of the importance showing by the column 2105 in the access pattern 2100.

When the historical data display program 332 displays the screen illustrated in FIG. 20A, the historical data display program 332 does not significantly change the screen familiar to the operations manager. This is advantageous in that the operations manager intuitively and easily understands the historical data to be checked from the screen illustrated in FIG. 20A.

Figure 20B:
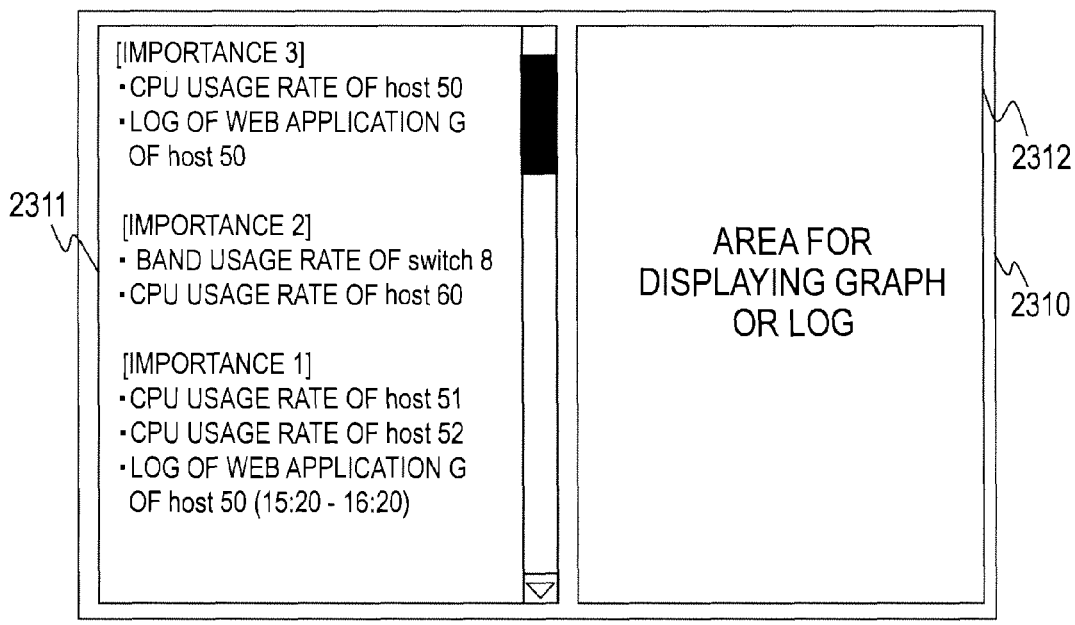
FIG. 20B is an explanatory diagram illustrating a screen for displaying only historical data that is recommended to an operations manager based on an access pattern according to the first embodiment of this invention.

FIG. 20B is an explanatory diagram illustrating a screen 2310 for displaying only historical data that is recommended to the operations manager based on the access pattern 2100 according to the first embodiment of this invention.

FIG. 20B shows the screen 2310 for recommending, to the operations manager, only links to the historical data to be viewed by the operations manager. The screen 2310 includes two panes (pane 2311 and pane 2312). The left pane 2311 displays links for selecting the historical data, and the right pane 2302 displays the selected historical data.

FIG. 20B shows an example where the historical data display program 332 displays only the links to historical data corresponding to the conditions for historical data shown by the access pattern 2100 in the pane 2311 in Step S311 in FIG. 16. The historical data display program 332 may highlight links to historical data by displaying the links to historical data in the descending order of the importance shown by the column 2105 in the access pattern 2100.

When the historical data display program 332 displays the screen 2310, the operations manager is not troubled with edition of the screen so as to display links to historical data to be checked.

As mentioned above, the historical data display program 332 can recommend historical data to be viewed by the operations manager, based on the incident data 1400 of a newly occurred incident, data showing the relation between monitoring subjects (dependency relation data 1700 and service data 1800), and the abstract access log 1900 generated by the access log abstraction program 336.

Further, the historical data display program 332 can highlight the historical data that is particularly helpful in solving the incident compared to other historical data based on the importance assigned to the individual abstract access logs (weighted abstract access logs 2000). Accordingly, the operations manager can quickly view the historical data that is helpful in solving the newly occurred incident. This brings about the effect of shortening the time for the operations manager to solve the incident, and also shortening the service downtime.

Further, the weighted abstract access log 2000 of this embodiment includes a general string of characters showing the monitoring operation, but does not include company secrets. Accordingly, the service management server 3 can share the weighted abstract access logs 2000 among different companies or organizations, and also among different computer systems.

For example, according to the above-described embodiment, the operations manager can use the abstract access log relating to incidents (rows 1421 and 1422 in FIG. 8) occurred in the past in the groups A and B to solve an incident occurred in the group D (row 1424 in FIG. 8). In other words, for a new computer system or group for which data has not yet been stored in the access logs 1300, the service management server 3 of this invention can recommend historical data to the operations manager using the weighted abstract access log 2000 generated in another computer system, and can also advantageously shorten the time for the operations manager to analyze the cause for the incident.

Second Embodiment

A second embodiment of this invention is described referring to the accompanying drawings. The service management server 3 according to the second embodiment abstracts incident data in addition to the abstraction of the access log. The computer system according to the second embodiment is similar to the computer system according to the first embodiment illustrated in FIG. 1. It should be noted however that programs held in the memory 33 and the data stored in the database 4 partially differ from the programs and data in the first embodiment.

Figure 21:
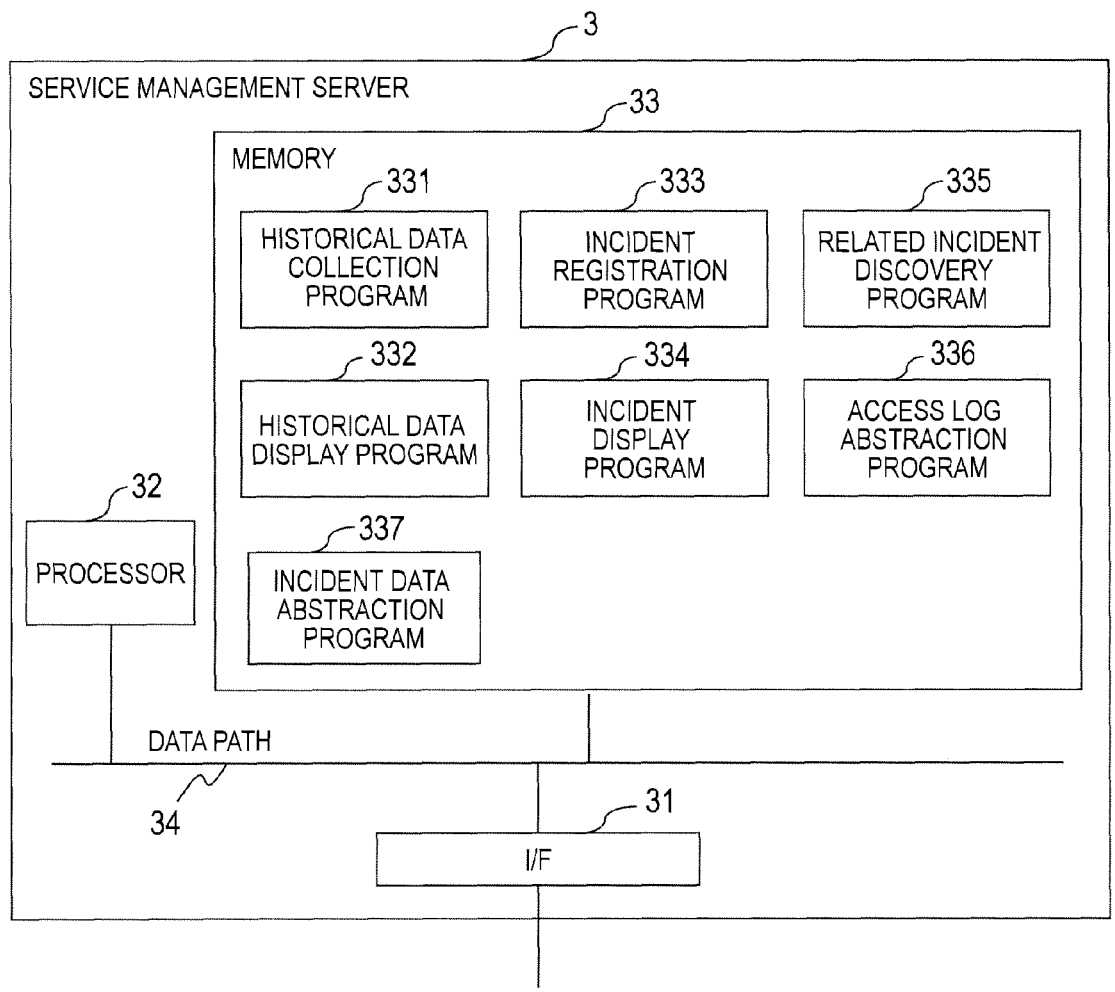
FIG. 21 is a block diagram illustrating the physical configuration of a service management server and data held in the service management server according to a second embodiment of this invention.

FIG. 21 is a block diagram illustrating the physical configuration of the service management server 3 according to the second embodiment of this invention and data held in the service management server 3.

The service management server 3 according to the second embodiment includes the interface (I/F) 31, the processor 32, and the memory 33 similarly to the service management server 3 according to the first embodiment. The memory 33 according to the second embodiment holds the programs held in the memory 33 according to the first embodiment, and an incident data abstraction program 337.

The incident data abstraction program 337 generates abstract incident data by using various kinds of data stored in the database 4. The incident data abstraction program 337 is executed when the incident data 1400 is updated, or is executed by a batch process regularly performed.

Although the service management server 3 according to the second embodiment provides the individual functions by the programs illustrated in FIG. 21, the functions of the individual programs may be implemented by a single program similarly to the program in the first embodiment. Further, a single program may be implemented by a plurality of programs by dividing each program illustrated in FIG. 21 process by process.

The functions of the programs illustrated in FIG. 21 may be implemented in the service management server 3 by a processing unit of an LSI device or the like that has a processor similarly to the first embodiment. Further, the individual programs illustrated in FIG. 21 may be installed in a program distribution server, or in the service management server 3 by means of a computer-readable non-transitory storage medium, or may be stored in a nonvolatile storage device (not shown) included in the service management server 3.

Figure 22:
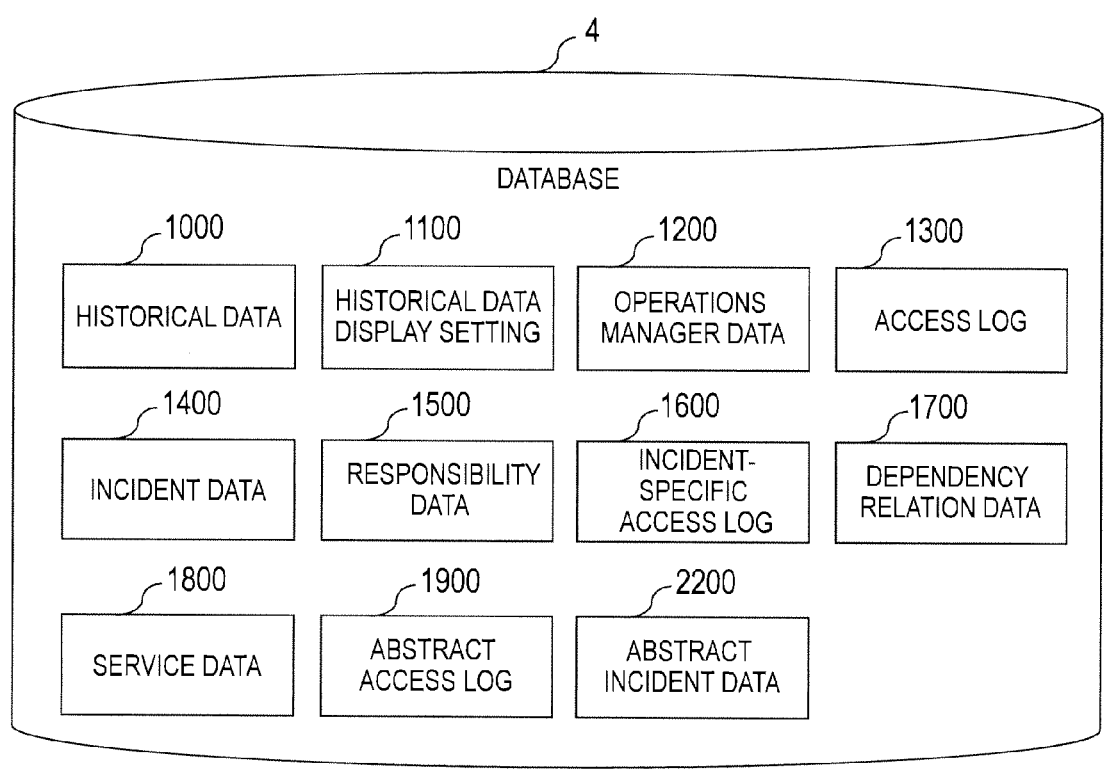
FIG. 22 is an explanatory diagram illustrating data stored in a database according to the second embodiment of this invention.

FIG. 22 is an explanatory diagram illustrating data to be stored in the database 4 according to the second embodiment of this invention.

The database 4 according to the second embodiment stores the data stored in the database 4 according to the first embodiment, and abstract incident data 2200.

The abstract incident data 2200 originates from the abstraction of the incident data 1400 by the incident data abstraction program 337. This abstract incident data 2200 is used to recommend historical data or present the operations manager with the grounds for the recommendation.

The abstract incident data 2200 is stored in a table, but may be stored in the database 4 by any method as long as the contents of each data can be identified.

FIG. 23 is an explanatory diagram illustrating the abstract incident data 2200 in the second embodiment of this invention.

The abstract incident data 2200 includes columns 2201 to 2205. The abstract incident data 2200 illustrated in FIG. 23 also includes rows 2211 to 2217 and rows 2221 to 2228.

The column 2201 shows an identifier (abstract incident ID) for uniquely identifying abstract incident data in the computer system according to this embodiment. The column 2202 shows the incident ID of incident data that is the source for generating the abstract incident data.

The column 2203 corresponds to the column 1404 of the incident data 1400, the column 2204 corresponds to the column 1405 of the incident data 1400, and the column 2205 corresponds to the column 1406 of the incident data 1400. The columns 2203 to 2205 include values included in the columns 1404 to 1406, or abstracted versions of the values included in the columns 1404 to 1406.

Two or more pieces of abstract incident data may be generated from a single piece of incident data (incident ID of 1) as shown in the rows 2211 to 2213 in FIG. 23 as a result of abstracting the incident data 1400 by the incident data abstraction program 337. Further, a single piece of abstract incident data may be generated from two or more pieces of incident data (incident IDs of 1 and 3) as shown in the row 2212 illustrated in FIG. 23.

Figure 24A:
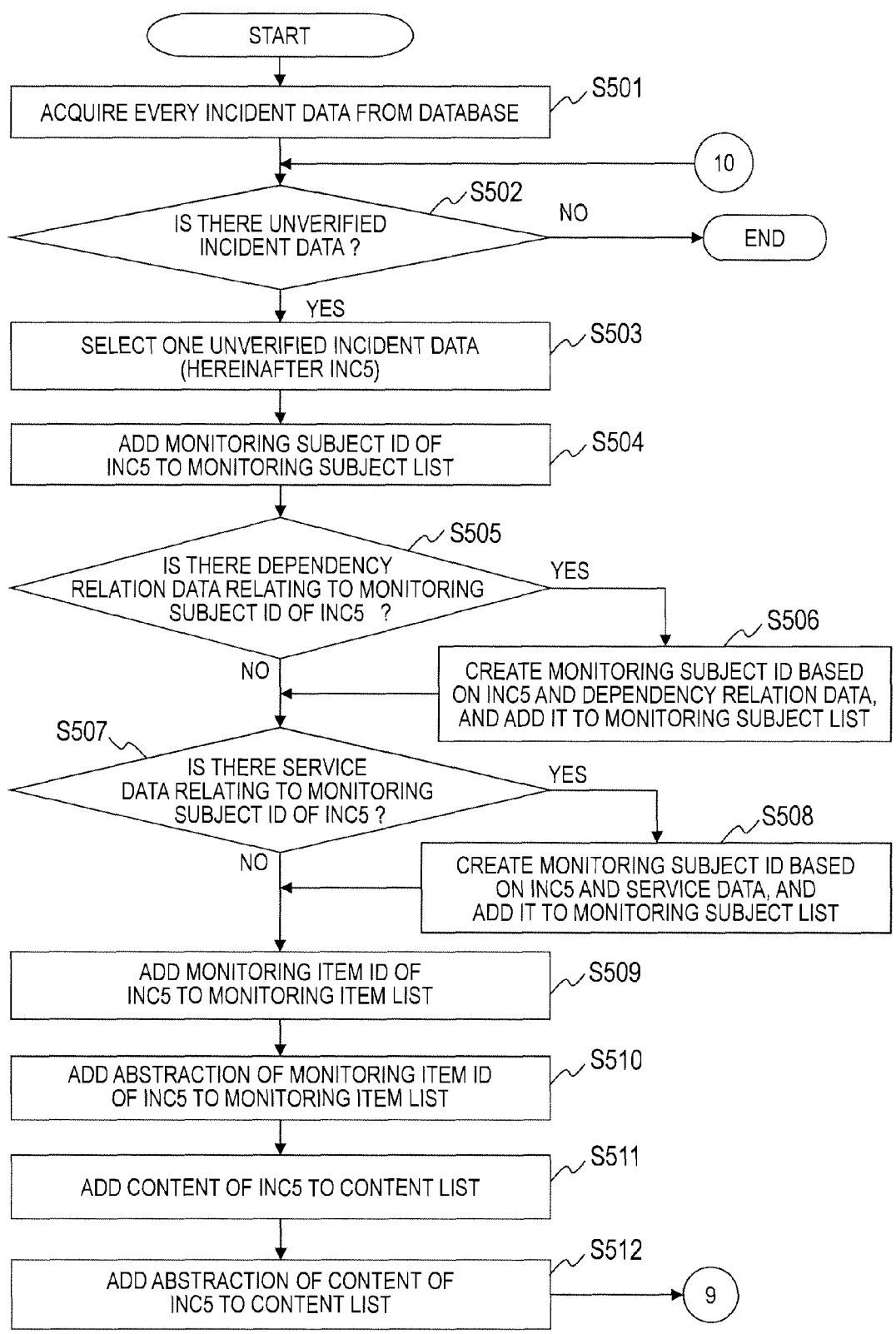
FIG. 24A is a flowchart illustrating a process of abstracting a monitoring subject ID, a monitoring item ID, and the content of an incident in a process of generating abstract incident data according to the second embodiment of this invention.

FIG. 24A is a flowchart illustrating a process of abstracting a monitoring subject ID, a monitoring item ID, and the content of an incident in a process of generating abstract incident data according to the second embodiment of this invention.

Figure 24B:
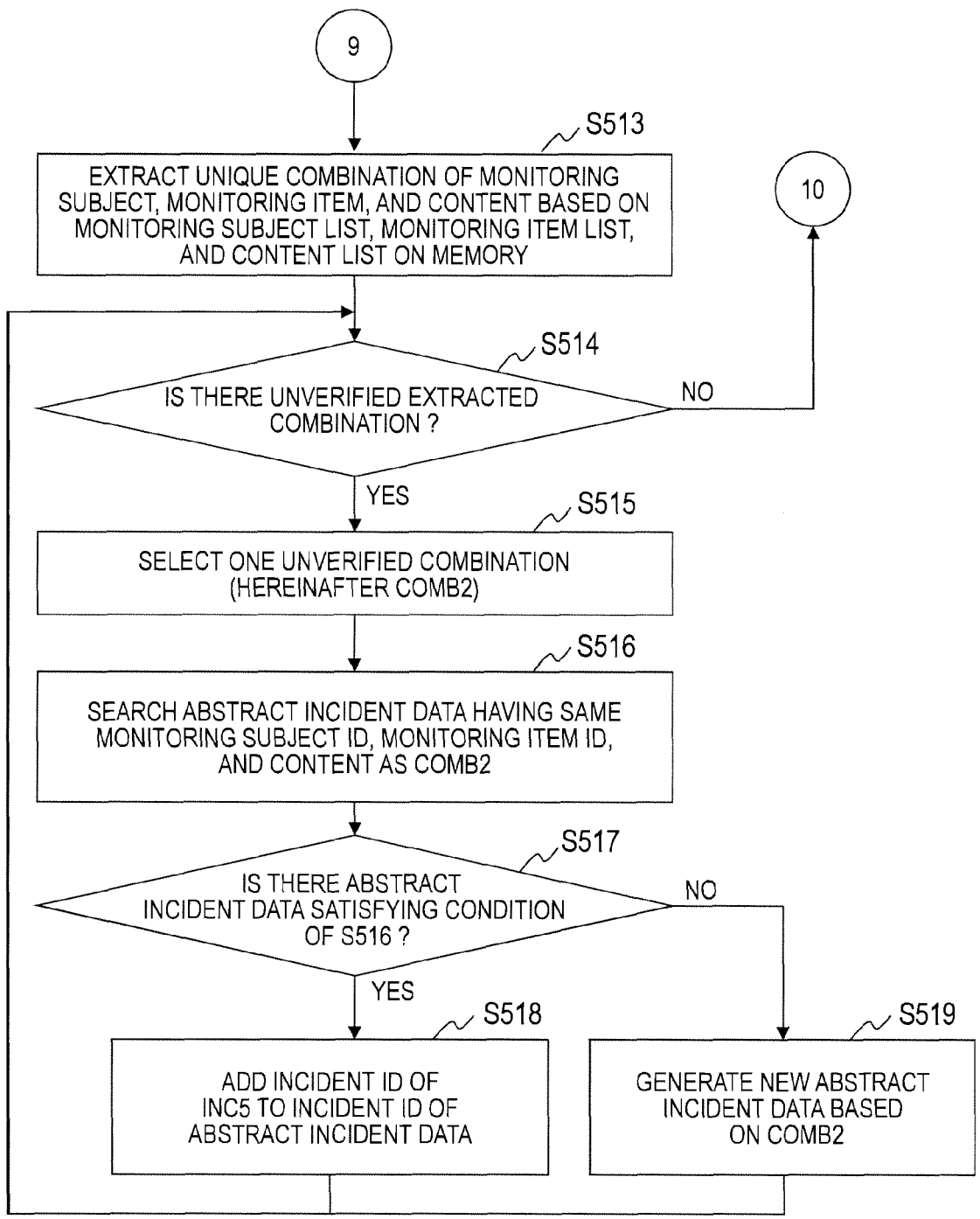
FIG. 24B is a flowchart illustrating a process of storing abstracted incident data in abstract incident data in the process of generating abstract incident data according to the second embodiment of this invention.

FIG. 24B is a flowchart illustrating a process of storing abstracted incident data in the abstract incident data 2200 in the process of generating abstract incident data according to the second embodiment of this invention.

FIG. 24A and FIG. 24B illustrate the processes for the incident data abstraction program 337 to generate the abstract incident data 2200 from the incident data 1400.

The incident data abstraction program 337 acquires every incident data from the incident data 1400 in the database 4 (Step S501). The incident data abstraction program 337 may start the process illustrated in FIG. 24A when the incident data 1400 is updated, or may start the process illustrated in FIG. 24A regularly or at a specified time.

After Step S501, the incident data abstraction program 337 determines whether or not all the incident data acquired in Step S501 includes any incident data which has not been subjected to the processes of Steps S504 and S505 (Step S502). When it is determined in Step S502 that there is not any incident data which has not been subjected to the processes of Steps S504 and S505, the incident data abstraction program 337 terminates the processes in FIGS. 24A and 24B.

When it is determined in Step S502 that there is some incident data which has not been subjected to the processes of Steps S504 and S505, the incident data abstraction program 337 selects one piece of incident data that has not been subjected to the processes of Steps S504 and S505 (Step S503). The incident data selected in Step S503 is hereinafter referred to as "INC5".

In Steps S504 to S512, the incident data abstraction program 337 stores in the memory 33 the result of the abstraction of the monitoring subject shown by the column 1404 of the INC5, the monitoring item shown by the column 1405 of the INC5, and the contents of the incident shown by the column 1406 of the INC5. After Step S503, the incident data abstraction program 337 adds the monitoring subject ID shown by the column 1404 of the INC5 to a monitoring subject list held in the memory 33 (Step S504).

For example, when the INC5 is the row 1421, the incident data abstraction program 337 adds "host 1" shown by the column 1404 to the monitoring subject list. As a result, the value corresponding to the column 2203 of the row 2211 illustrated in FIG. 23 is added to the monitoring subject list.

In the second embodiment, the incident data abstraction program 337 holds the monitoring subject list, a monitoring item list, and a content list in the memory 33. The monitoring subject list holds monitoring subjects where incidents have occurred in terms of an abstracted string of characters. The monitoring item list holds monitoring items where incidents have occurred in terms of an abstracted string of characters. The content list holds the contents of an incident in terms of an abstracted string of characters.

After Step S504, the incident data abstraction program 337 determines whether or not a row that includes the monitoring subject ID shown by the column 1404 of the INC5 in the influencing device (column 1701) or the influenced device (column 1702) can be extracted from the dependency relation data 1700 (Step S505).

When a row that includes the monitoring subject ID shown by the column 1404 of the INC5 in the influencing device (column 1701) or the influenced device (column 1702) has been extracted from the dependency relation data 1700 in Step S505, the incident data abstraction program 337 generates an abstracted monitoring subject ID based on the row in the dependency relation data 1700 extracted in Step S505. Then, the incident data abstraction program 337 adds the generated monitoring subject ID to the monitoring subject list in the memory 33 (Step S506). After Step S506, the incident data abstraction program 337 executes Step S507.

For example, when the INC5 is the row 1421 illustrated in FIG. 8, the incident data abstraction program 337 adds character strings "monitoring subject influenced by switch 1" and "monitoring subject influenced by host 3" to the monitoring subject list in the memory 33 based on the rows 1711 and 1713 illustrated in FIG. 11. Accordingly, the values corresponding to the column 2203 of the rows 2212 and 2213 illustrated in FIG. 23 are added to the monitoring subject list.

When it is determined in Step S505 that a row that includes the monitoring subject shown by the column 1404 of the INC5 in the influencing device or the influenced device is not present in the dependency relation data 1700, or after Step S506, the incident data abstraction program 337 determines whether or not a row that includes the monitoring subject ID shown by the column 1404 of the INC5 in the component (column 1802) can be extracted from the service data 1800.

When a row that includes the monitoring subject ID shown by the column 1404 of the INC5 in the component (column 1802) has been extracted from the service data 1800 in Step S507, the incident data abstraction program 337 generates an abstracted monitoring subject ID based on the row of the service data 1800 extracted in Step S507. The incident data abstraction program 337 then adds the generated monitoring subject ID to the monitoring subject list in the memory 33 (Step S508). After Step S508, the incident data abstraction program 337 executes Step S509.

When the INC5 is the row 1421 illustrated in FIG. 8, the incident data abstraction program 337 adds "Web Server" and "Web server of service service-A" to the monitoring subject list in the memory 33 based on the row 1811 illustrated in FIG. 12. As a result, the values corresponding to the column 2203 of the rows 2214 and 2215 in FIG. 23 are added to the monitoring subject list.

Here, the value, "Web server", corresponding to the column 2203 of the row 2214 refers to the monitoring subject ID that has been abstracted using only the type of service data (column 1803), and the value, "Web server of service service-A", corresponding to the column 2203 of the row 2215 refers to the monitoring subject ID that has been abstracted using the service ID (column 1801) and the type (column 1803) of the service data. The monitoring subject abstracted by using only the type has a higher level of abstraction, and hence it is likely to be associated with multiple pieces of incident data.

When it is determined in Step S507 that a row that includes the monitoring subject shown by the column 1404 of the INC5 in the component (column 1802) cannot be extracted from the service data 1800, or after Step S508, the incident data abstraction program 337 adds the monitoring item ID shown by the column 1405 of the INC5 to the monitoring item list held in the memory 33 (Step S509).

After Step S509, the incident data abstraction program 337 adds a string of characters representing the abstraction of the monitoring item shown by the column 1405 of the INC5 to the monitoring item list held in the memory 33 (Step S510). In Step S510, the incident data abstraction program 337 abstracts the monitoring item ID based on a previously determined rule. This is the same as done in the process (Steps S218 and S219) of abstracting the monitoring item ID in the column 1308 of the access log in the first embodiment.

After Step S510, the incident data abstraction program 337 adds the value included in the column 1406 of the INC5 (contents of the incident) to the content list stored in the memory 33 (Step S511). After Step S511, the incident data abstraction program 337 adds a string of characters representing the abstraction of the contents of the incident shown by the column 1406 of the INC5 to the content list stored in the memory 33 (Step S512).

The following gives the details of the abstraction process in Step S512.

In Step S512, the incident data abstraction program 337 acquires a characteristic word from the contents of the incident shown by the column 1406 of the INC5 using a template for strings of alert characters or the morphological analysis engine. Then, the incident data abstraction program 337 deletes the characteristic word included in the column 1406 of the INC5, or transforms the characteristic word included in the column 1406 of the INC5 into a general expression ("error message" or the like).

When the INC5 is the row 1423 illustrated in FIG. 8, for example, the incident data abstraction program 337 adds "error 'upload data error' occurred" shown by the column 1406 to the content list held in the memory 33. In addition, the incident data abstraction program 337 changes "error 'upload data error' occurred" shown by the column 1406 to "error 'error message' occurred" and adds the changed "error 'error message' occurred" to the content list held in the memory 33. Because "error 'error message' occurred" has a higher level of abstraction as a word expressing a monitoring operation than the character string "error 'upload data error' occurred", it is likely to be associated with multiple pieces of incident data.

The above is the outline of the process of generating the monitoring subject list, the monitoring item list, and the content list in the memory 33. After Step S512, the incident data abstraction program 337 executes Step S513 in FIG. 24B.

After Step S512 illustrated in FIG. 24A, the incident data abstraction program 337 extracts unique combinations of monitoring subjects, monitoring items, and the contents of incidents based on the monitoring subject list, the monitoring item list, and the content list on the memory 33 (Step S513). Then, the incident data abstraction program 337 determines whether or not the combinations extracted in Step S513 include a combination which has not been subjected to the processes in Steps S516 and S517 (Step S514).

When it is determined in Step S514 that the combinations extracted in Step S513 do not include a combination which has not been subjected to the processes in Steps S516 and S517, the incident data abstraction program 337 executes Step S502 illustrated in FIG. 24A to abstract new incident data.

When it is determined in Step S514 that the combinations extracted in Step S513 include a combination which has not been subjected to the processes in Steps S516 and S517, the incident data abstraction program 337 selects one combination which has been extracted in Step S513 but has not been subjected to the processes in Steps S516 and S517 (Step S515). In the following description, this selected combination is referred to as "COMB2".

After Step S515, the incident data abstraction program 337 retrieves abstract incident data including the same monitoring subject ID, monitoring item ID, and incident content as the "COMB2" in the abstract incident data 2200 in the database 4 (Step S516).

After Step S516, the incident data abstraction program 337 determines from the results of the retrieval in Step S516 whether or not a row which has the same monitoring subject ID, monitoring item ID, and incident content as the COMB2 can be extracted from the abstract incident data 2200 (Step S517). When a row which has the same monitoring subject ID, monitoring item ID and incident content as the COMB2 is extracted from the abstract incident data 2200, the incident ID of the INC5 is added to the column 2202 in the extracted row in Step S516 (Step S518).

When it is determined in Step S517 that abstract incident data including the same monitoring subject ID, monitoring item ID, and incident content as the COMB2 cannot be extracted from the abstract incident data 2200, the incident data abstraction program 337 generates a row of new abstract incident data 2200 based on the COMB2. Then, the incident data abstraction program 337 stores the generated row in the abstract incident data 2200 in the database 4 (Step S519). In Step S519, the incident ID of the INC5 is stored in the incident ID (column 2202) of the generated row.

After Step S518, or after Step S519, the incident data abstraction program 337 performs Step S514 to store other combinations in the abstract incident data 2200.

The process illustrated in FIG. 24B allows the incident data abstraction program 337 to add newly added abstract incident data to the abstract incident data 2200 generated in the past. In addition, the value showing the incident data that is the source for generating the abstract incident data is stored in the abstract incident data 2200.

Figure 25:
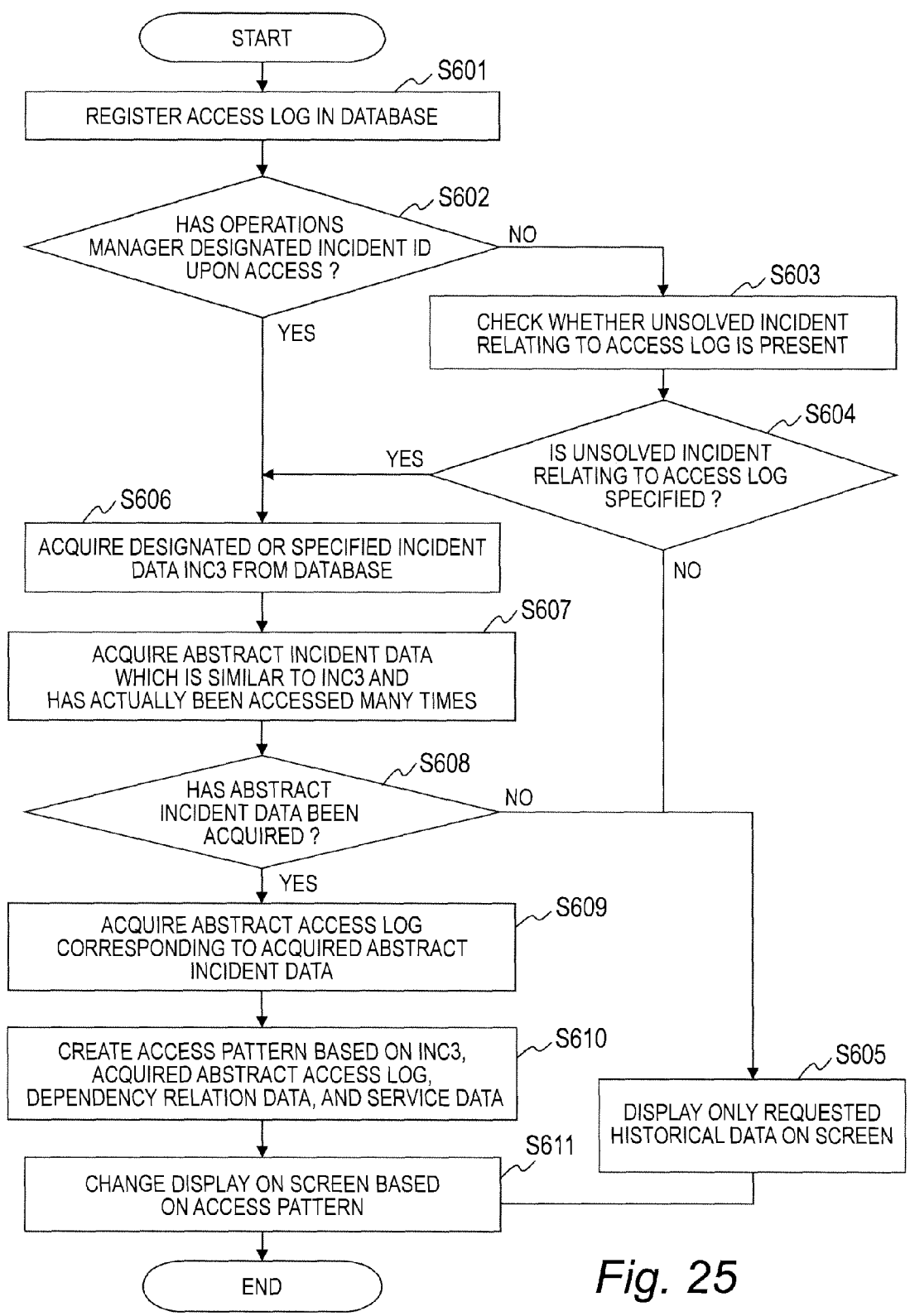
FIG. 25 is a flowchart illustrating a process of recommending historical data when a historical data display request is received from an operations manager by a historical data display program according to the second embodiment of this invention.

FIG. 25 is a flowchart illustrating a process of recommending, by the historical data display program 332 according to the second embodiment of this invention, historical data when a historical data display request is received from the operations manager.

Steps S601 to S606 in FIG. 25 are the same processes as Steps S301 to S306 in FIG. 16 in the first embodiment. The process Step S607 and subsequent processes differ from the processes in the first embodiment. The processes in Steps S601 to S606 permits incident data related to the historical data displayed by the operations manager to be acquired from the incident data 1400 as the INC3.

After Step S606, the historical data display program 332 acquires abstract incident data similar to the INC3 and has actually been accessed many times from the abstract incident data 2200 in the database 4 (Step S607). The abstract incident data that is generated by the abstraction of the INC3 is similar to the INC3 in this embodiment. Accordingly, in order to acquire abstract incident data similar to the INC3, the historical data display program 332 acquires abstract incident data including the incident ID shown by the column 1401 of the INC3 in the column 2202 from the abstract incident data 2200.

Further, in Step S607, the historical data display program 332 quantifies the actual accesses made to abstract incident data similar to the INC3 by calculating first to eleventh evaluation values given below. Then, the historical data display program 332 acquires abstract incident data which has been actually accessed many times as apparent from the quantization results and similar to the INC3 from the abstract incident data 2200.

The first evaluation value is the number of abstract access log associated with the incident data that is the source of the abstract incident data similar to the INC3. In other words, the first evaluation value is the number of rows in the abstract access log 1900 whose column 1903 includes the incident ID in the column 2202 of the abstract incident data 2200.

The second evaluation value is a value which is C1 times the number of only the abstract access logs associated with the incident data that has been solved in the incident data that is the source of the abstract incident data similar to the INC3 (C1 being a value set in advance). In other words, the second evaluation value is C1 times the number of rows in the abstract access log 1900 whose column 1903 includes the incident ID that is the value in the column 2202 of the abstract incident data 2200 and the value in the column 1401 in the row where "solved" is stored in the column 1409 of the incident data 1400.

The third evaluation value is a value which is C2 times the number of only the abstract access logs associated with the incident data that has occurred in the same group 12 as the group 12 shown by the column 1402 of the INC3 in the incident data that is the source of the abstract incident data similar to the INC3 (C2 being a value set in advance). In other words, the third evaluation value is C2 times the number of rows in the abstract access log 1900 whose column 1903 includes the incident ID that indicates incident data having the same value in the column 1402 among the incident IDs in the column 2202 of the abstract incident data 2200.

The fourth evaluation value is a value which is C3 times the number of only the abstract access logs associated with the incident data that has occurred in the same monitoring subject as the monitoring subject shown by the column 1404 of the INC3 in the incident data that is the source of the abstract incident data similar to the INC3 (C3 being a value set in advance). In other words, the fourth evaluation value is C3 times the number of rows in the abstract access log 1900 whose column 1903 includes the incident ID that indicates incident data having the same value in the column 1404 among the incident IDs in the column 2202 of the abstract incident data 2200.

The fifth evaluation value is a value which is C4 times the number of only the abstract access logs associated with the incident data that has occurred in the same monitoring item as the monitoring item shown by the column 1405 of the INC3 in the incident data that is the source of the abstract incident data similar to the INC3 (C4 being a value set in advance). In other words, the fifth evaluation value is C4 times the number of rows in the abstract access log 1900 whose column 1903 includes the incident ID that indicates incident data having the same value in the column 1405 among the incident IDs in the column 2202 of the abstract incident data 2200.

The sixth evaluation value is a value which is C5 times the number of only the abstract access logs associated with the incident data having the same incident content as the incident content shown by the column 1406 of the INC3 in the incident data that is the source of the abstract incident data similar to the INC3 (C5 being a value set in advance). In other words, the sixth evaluation value is C5 times the number of rows in the abstract access log 1900 whose column 1903 includes the incident ID that indicates incident data having the same value in the column 1406 among the incident IDs in the column 2202 of the abstract incident data 2200.

The seventh evaluation value is the number of pieces of incident data that is the source of the abstract incident data similar to the INC3. In other words, the seventh evaluation value is the number of incident IDs in the column 2202 of the abstract incident data 2200.

The eighth evaluation value is a value which is C6 times the number of only pieces of incident data that has occurred in the same group 12 as the group 12 shown by the column 1402 of the INC3 in the incident data that is the source of the abstract incident data similar to the INC3 (C6 being a value set in advance). In other words, the eighth evaluation value is C6 times the number of incident IDs that indicate incident data having the same value in the column 1402 among the incident IDs in the column 2202 of the abstract incident data 2200.

The ninth evaluation value is a value which is C7 times the number of only pieces of incident data that has occurred in the same monitoring subject as the monitoring subject shown by the column 1404 of the INC3 in the incident data that is the source of the abstract incident data similar to the INC3 (C7 being a value set in advance). In other words, the ninth evaluation value is C7 times the number of incident IDs that indicate incident data having the same value in the column 1404 among the incident IDs in the column 2202 of the abstract incident data 2200.

The tenth evaluation value is a value which is C8 times the number of only pieces of incident data that has occurred in the same monitoring item as the monitoring item shown by the column 1405 of the INC3 in the incident data that is the source of the abstract incident data similar to the INC3 (C8 being a value set in advance). In other words, the tenth evaluation value is C8 times the number of the incident IDs that indicate incident data having the same value in the column 1405 among the incident IDs in the column 2202 of the abstract incident data 2200.

The eleventh evaluation value is a value which is C9 times the number of only pieces of incident data having the same incident content as the incident content shown by the column 1406 of the INC3 in the incident data that is the source of the abstract incident data similar to the INC3 (C9 being a value set in advance). In other words, the eleventh evaluation value is C9 times the number of the incident IDs that indicate incident data having the same value in the column 1406 among the incident IDs in the column 2202 of the abstract incident data 2200.

When the calculation of the evaluation values and the quantization of the actual accesses described above show that an incident quite identical to the incident shown by the INC3 has occurred multiple times in the past, the historical data display program 332 can acquire abstract incident data with a lower level of abstraction, namely, more specific abstract incident data in Step S607. For example, the historical data display program 332 can acquire abstract incident data with a lower level of abstraction with a specific monitoring subject ID of "host 1", for example, shown in the column 2203 as shown in the row 2211 illustrated in FIG. 23.

Even when an incident quite identical to the incident shown by the INC3 has occurred in the past, in a case where incidents similar to the incident shown by the INC3 have occurred multiple times in the past, the historical data display program 332 can acquire abstract incident data that has been accessed frequently in Step S607 to evaluate the abundance of the evaluation value. For example, the historical data display program 332 acquires abstract incident data with a higher level of abstraction with an abstract monitoring subject ID of "Web server", for example, shown in the column 2203 as shown in the row 2214 illustrated in FIG. 23.

After Step S607, the historical data display program 332 determines whether or not abstract incident data has been acquired from the abstract incident data 2200 through the process of Step S607 (Step S608). When the historical data display program 332 cannot acquire abstract incident data from the abstract incident data 2200 through the process of Step S607, the historical data display program 332 displays only historical data requested to be displayed by the operations manager on the screen, and then terminates the process (Step S605).

When it is determined in Step S608 that abstract incident data has been acquired from the abstract incident data 2200 through the process of Step S607, the historical data display program 332 acquires an abstract access log corresponding to the abstract incident data acquired in Step S607 from the abstract access log 1900 in the database 4 (Step S609). Specifically, the row in the abstract access log that includes, in the column 1903, the same value as that included in the column 2202 of the abstract incident data acquired in Step S607 is acquired.

After Step S609, the historical data display program 332 generates an access pattern based on the INC3, the abstract access log acquired in Step S609, the dependency relation data 1700, and the service data 1800 (Step S610). The process of Step S610 is the same as the process in FIGS. 19A and 19B according to the first embodiment.

After Step S610, the historical data display program 332 changes the display of the screen of the manager terminal 20 based on the access pattern generated in Step S610 and the abstract incident acquired in Step S607 (Step S611).

The above is the outline of the processing of the historical data display program 332.

It should be noted that when the operations manager instructs an incident whose data is to be displayed, the historical data display program 332 according to the first embodiment generates the weighted abstract access log 2000. This is because the set of abstract access logs that are used in recommendation (abstract access log acquired in Step S309) cannot be determined until an access is made by the operations manager.

In the second embodiment, however, the incident data abstraction program 337 generates the abstract incident data 2200 to recommend historical data. Therefore, the historical data display program 332 can generate the weighted abstract access log 2000 for each abstract incident data before execution of Step S602 by the operations manager based on an abstract access log associated with each abstract incident data (corresponding to the calculation of Steps S405 to S408). This makes it possible to shorten the processing times of the historical data display program 332 for Step S610 (including the process illustrated in FIGS. 19B and 19A) and Step S611.

Further, the generation of the weighted abstract access log 2000 prior to Step S602 permits calculation of the distribution of the importance (column 2005) of the weighted abstract access logs 2000 in advance. The importance of the weighted abstract access log for each abstract incident data can be calculated in advance, and hence as a result, when the distribution of the importance of the abstract access logs associated with certain abstract incident data is uniform, for example, the operations manager or the service management server 3 can determine that historical data needed to solve an incident indicated by the abstract incident data cannot be determined from the access logs collected so far.

When the standard deviation of the importance of weighted abstract access logs associated with certain abstract incident data is smaller than M1 (M1 being a value set in advance), for example, the access log abstraction program 336 can delete unnecessary weighted abstract access logs by deleting the abstract access logs. In other words, it is possible to delete the unnecessary abstract incident data. Accordingly, an access pattern is not generated from unnecessary weighted abstract access logs, and hence the historical data display program 332 can recommend historical data with higher accuracy to the operations manager.

In addition, the access log abstraction program 336 may leave upper M2 pieces of abstract incident data (M2 being a value set in advance) having a large standard deviation in importance of the weighted abstract access logs which are related to certain abstract incident data, and delete other abstract incident data. With this, the historical data display program 332 can recommend historical data with higher accuracy to the operations manager.

The service management server 3 deletes, in advance, abstract incident data whose importance has a distribution not suitable for recommendation in the above-mentioned manner, thereby bringing about an effect that abstract incident data which is not practically recommendable can be eliminated beforehand. The uniformness of the distribution may be determined using a method other than the standard deviation.

Figure 26:
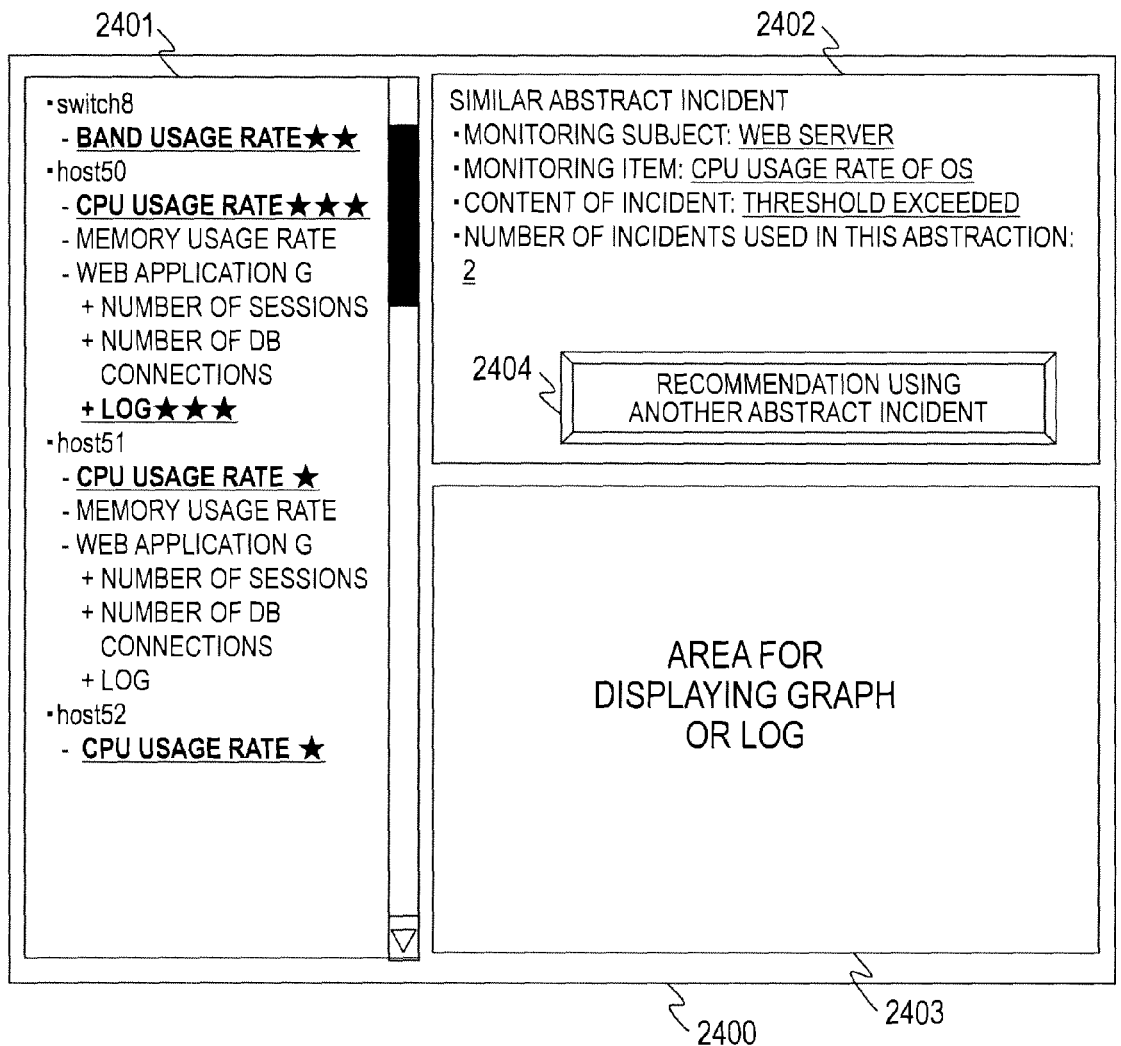
FIG. 26 is an explanatory diagram illustrating a screen for displaying historical data that is recommended to an operations manager according to the second embodiment of this invention.

FIG. 26 is an explanatory diagram illustrating a screen 2400 for displaying historical data that is recommended to the operations manager according to the second embodiment of this invention.

FIG. 26 shows the screen 2400 for recommending, to the operations manager, the historical data to be viewed by the operations manager. The screen 2400 includes three panes of a pane 2401, a pane 2402, and a pane 2403.

The pane 2401 displays links for selecting historical data. The pane 2403 displays the historical data selected on the pane 2401. The pane 2402 displays abstract incident data used in the recommendation of historical data.

When abstract incident data in the row 2214 illustrated in FIG. 23 is acquired in Step S607 illustrated in FIG. 25, for example, in Step S611 illustrated in FIG. 25, the historical data display program 332 displays, to the operations manager, the abstract incident data that has been used in recommendation as shown in the pane 2402 illustrated in FIG. 26. The pane 2402 permits the operations manager to understand on what kinds of incidents recommendation of historical data by the service management server 3 has been based. The function of displaying the pane 2402 helps the operations manager resolve a question on historical data recommended when the question arises.

In the pane 2402 on the screen 2400 illustrated in FIG. 26, the historical data display program 332 displays the abstracted monitoring subject ID, the abstracted monitoring item ID, and the abstracted contents of the incident.

When the monitoring subject ID of the cause shown by the column 1412 of the incident data or the monitoring item ID of the cause shown by the column 1413 is abstracted by the incident data abstraction program 337, however, the historical data display program 332 may display the abstracted monitoring subject ID of the cause or the abstracted monitoring item ID of the cause on the pane 2402. Accordingly, the historical data display program 332 can provide the operations manager with a key for checking historical data related to the abstracted monitoring subject ID of the cause or the abstracted monitoring item ID of the cause by priority. As a result, the time for solving an incident can be shortened.

When recommendation displayed on the screen 2400 by the historical data display program 332 is not helpful, the operations manager may instruct the historical data display program 332 to make recommendation using another abstract incident data. Specifically, the historical data display program 332 permits the operations manager to operate a button 2404 displayed on the pane 2402 to input "useless" abstract incident data.

Then, the historical data display program 332 executes the process illustrated in FIG. 25 again based on the input "useless" abstract incident data. Specifically, the historical data display program 332 does not acquire the abstract incident data, which has been inputted as "useless" by the operations manager, at the time of acquiring abstract incident data in Step S607.

As described above, the historical data display program 332 according to the second embodiment recommend historical data similarly to the first embodiment. Further, the historical data display program 332 according to the second embodiment can present the operations manager with past incident data which is the ground for the recommendation.

Further, the incident data 1400 includes secrets of companies in each group 12, and hence the historical data display program 332 cannot display similar incident data on the screen 2300 according to the first embodiment. For example, the historical data display program 332 cannot display incident data in the rows 1421 and 1422 illustrated in FIG. 8 to the operations managers belonging to the group 12 with the group ID of "D".

According to the second embodiment, however, the historical data display program 332 may display abstract incident data as shown in, for example, the row 2214 in FIG. 23. Accordingly, when the operations manager feels that recommendation of historical data performed by the historical data display program 332 is not helpful, the operations manager may change similar abstract incident data so that the operations manager may be recommended with other historical data. This brings about effects of shortening the time for the operations manager to solve the incident and shortening the service downtime.

Further, according to the second embodiment, the historical data display program 332 can recommend historical data faster than the historical data display program 332 of the first embodiment by calculating in advance the importance of the abstract access log for each abstract incident data. In addition, abstract incident data having a small standard deviation in importance of the abstract access log may be removed in advance, thus removing access patterns which are not helpful for the operations manager to select historical data. This brings about effects of shortening the time for the operations manager to solve the incident and shortening the service downtime.

According to this embodiment, even if an incident for which the operations manager has not prepared a procedure manual in advance occurs, the service management server 3 can recommend historical data to be viewed by the operations manager by priority to the operations manager using abstract access logs related to past incidents. This can shorten the time for the operations manager to analyze the cause for the incident.

In addition, company secrets are not included in abstract access logs, and hence the abstract access logs can be shared among different companies or organizations, and among different computer systems. Therefore, the service management server according to this invention can shorten the time for the operations manager to analyze the cause for an incident even in a new service for which monitoring operations have not been carried out in the past.

Although the embodiments of this invention have been described in detail with reference to the drawings, the specific configurations are not limited to those of the embodiments, and this invention also encompasses design modifications and the like without departing from the gist of this invention.

This invention can be applied to a server to be used by an operations manager in a monitoring operation of monitoring a plurality of devices.

What is claimed is:

1. A management server coupled to devices and configured to collect historical data indicating a status of each of the devices,
the historical data including a value indicating the status of the each of the devices, a time at which the historical data is generated, a monitoring subject ID assigned to the each of the devices whose status is indicated by the historical data, and a monitoring item ID indicating a meaning of the value indicating the status,
the management server comprising:
 a processor;
 a memory; and
 an interface,
wherein the management server is configured to:
 store, in the memory, when receiving, via the interface, an input request requesting an output of historical data, an access log including at least one of an input request time, the monitoring subject ID included in the output of the historical data requested, or the monitoring item ID included in the output of the historical data requested;
 store, in the memory, when an incident indicating a failure or prediction of a failure occurs in the each of the devices, incident data including at least one of an incident occurrence time, a monitoring subject ID assigned to the each of the devices where the incident has occurred, or a monitoring item ID for which the incident has occurred;
 associate the incident data with the access log;
 update data included in the access log to a string of characters abstracted by a predetermined rule in accordance with the incident data associated with the access log and the access log;
 generate an abstract access log including the data updated to the abstracted string of characters;
 identify, when receiving, via the interface, an input value indicating first incident data, at least one first abstract access log from the generated abstract access log based on the first incident data;
identify, based on the first abstract access log and the first incident data, a condition for the output of the historical data, the condition including at least one of pieces of data including a generation time of the historical data, a monitoring subject ID included in the historical data, and a monitoring item ID included in the historical data; and
output the identified condition for the historical data.

2. The management server according to claim 1, wherein the management server is further configured to:
identify, when receiving, via the interface, the input value indicating first incident data, second incident data similar to the first incident data from the incident data stored in the memory;
identify at least one first access log associated with the second incident data from the access logs stored in the memory; and
identify the abstract access log as the first abstract access log, the abstract access log being generated in accordance with the first access logs and the second incident data.

3. The management server according to claim 2, wherein the management server is further configured to:
calculate a first degree of importance in a work of solving an incident indicated by the second incident data from the first access log and the second incident data for the at least one first abstract access log; and
output the condition for the historical data identified, based on the first abstract access log and the first incident data, in descending order of the first degree of importance.

4. The management server according to claim 3, wherein:
each of the devices is classified into at least one group classification;
the access log includes a group ID indicating the group classification;
the incident data includes a group ID indicating the group classification for each of the devices where the incident has occurred; and
the management server is further configured to calculate, when a group ID included in the second incident data matches the group ID included in the first access log, the first degree of importance by adding a predetermined value to the first degree of importance.

5. The management server according to claim 1, wherein the management server is further configured to:
define dependency relation data indicating a relation between a device where an incident has occurred and the each of the devices which are influenced by the incident;
determine whether one of the devices indicated by the monitoring subject ID included in the incident data and one of the devices indicated by the monitoring subject ID included in the access log have the relation defined by the dependency relation data; and
update when a result of the determination shows that the one of the devices indicated by the monitoring subject ID included in the incident data and the one of the devices indicated by the monitoring subject ID included in the access log have the relation defined by the dependency relation data, the monitoring subject ID included in the access log to a string of characters indicating the defined relation to generate the abstract access log.

6. The management server according to claim 1, wherein the management server is further configured to:
define service data indicating services provided by the devices;
determine whether the service data defines one of the services provided by one of the devices indicated by the monitoring subject ID included in the incident data which matches a service provided by one of the devices indicated by the monitoring subject ID included in the access log; and
update, when a result of the determination shows that the service data defines the one of the services provided by the one of the devices indicated by the monitoring subject ID included in the incident data which matches the service provided by the one of the devices indicated by the monitoring subject ID included in the access log, the monitoring subject ID included in the access log to a string of characters indicating the defined service to generate the abstract access logs.

7. The management server according to claim 1, wherein:
the access log includes a requester ID indicating a requester requesting output of the historical data;
the incident data includes a time at which the incident was solved; and
the management server is further configured to:
hold responsibility data including the requester ID, the monitoring subject ID indicating a device to be monitored by the requester, and a monitoring item ID indicating an item to be monitored by the requester;
determine whether the access log is related to the incident data by determining, based on the access log, the incident data, and the responsibility data, whether the access log indicates that output of the historical data was requested until solution of an incident indicated by the incident data since occurrence of the incident, whether the monitoring subject ID and the monitoring item ID included in the incident data indicate a monitoring subject and a monitoring item which the requester ID included in the access log is responsible for, or whether the monitoring subject ID included in the incident data matches the monitoring subject ID included in the access log; and
associate the incident data with the access log when a result of the determination shows that the access log is related to the incident data.

8. The management server according to claim 1, wherein:
the abstract access log includes an incident ID indicating the incident data associated with the access log updated with the abstracted string of characters; and
the management server is further configured to:
update, when storing, in the memory via the interface, the first incident data, data included in the first incident data to at least one string of characters abstracted by a predetermined rule;
generate at least one piece of first abstract incident data including the data updated to the abstracted string of characters, and the incident ID indicating the first incident data;
identify, when receiving, via the interface, the input value indicating the first incident data, the first abstract incident data; and
identify at least one second abstract access log including the incident ID included in the identified first abstract incident data as the first abstract access log.

9. The management server according to claim 8, wherein the management server is further configured to:
calculate second degree of importance in a work of solving an incident indicated by the first abstract incident data from the second abstract access logs and the first abstract incident data for each piece of the first abstract incident data; and delete the first abstract incident data that includes the second abstract access log whose second degree of importance has a distribution smaller than a predetermined value.

10. A management system, comprising a management server coupled to devices and configured to collect historical data indicating a status of each of the devices,
the historical data including a value indicating the status of the each of the devices, a time at which the historical data is generated, a monitoring subject ID assigned to that device whose status is indicated by the historical data, and a monitoring item ID indicating a meaning of the value indicating the status,
the management server comprising:
a processor;
a memory; and
an interface,
wherein the management system is configured to:
store, in the memory, when receiving, via the interface, an input request requesting on output of historical data, an access log including at least one of an input request time, the monitoring subject ID included in the output of the historical data requested, or the monitoring item ID included in the output of the historical data requested;
store, in the memory, when an incident indicating a failure or prediction of a failure occurs in the each of the devices, incident data including at least one of an incident occurrence time, a monitoring subject ID assigned to the each of the devices where the incident has occurred, or a monitoring item ID for which the incident has occurred;
associate the incident data with the access log;
update data included in the access log to a string of characters abstracted by a predetermined rule in accordance with the incident data associated with the access log and the access log;
generate an abstract access log including the data updated to the abstracted string of characters;
identify, when receiving, via the interface, an input value indicating first incident data, at least one first abstract access log from the generated abstract access log based on the first incident data;
identify, based on the first abstract access log and the first incident data, a condition for the output of the historical data, the condition including at least one of pieces of data including a generation time of the historical data, a monitoring subject ID included in the historical data, and a monitoring item ID included in the historical data; and
output the identified condition for the historical data.

11. The management system according to claim 10, wherein the management system is further configured to:
identify, when receiving, via the interface, the input value indicating first incident data, second incident data similar to the first incident data from the incident data stored in the memory;
identify at least one first access log associated with the second incident data from the access logs stored in the memory; and
identify the abstract access log as the first abstract access log, the abstract access log being generated in accordance with the first access log and the second incident data.

12. The management system according to claim 10, wherein:
the abstract access log includes an incident ID indicating the incident data associated with the access log updated with the abstracted string of characters; and
the management system is further configured to:
update, when storing, in the memory via the interface, the first incident data, data included in the first incident data to at least one string of characters abstracted by a predetermined rule;
generate at least one piece of first abstract incident data including the data updated to the abstracted string of characters, and the incident ID indicating the first incident data;
identify, when receiving, via the interface, the input value indicating the first incident data, the first abstract incident data; and
identify at least one second abstract access log including the incident ID included in the identified first abstract incident data as the first abstract access log.

13. A management method, which is to be performed by a management server coupled to devices and configured to collect historical data indicating a status of each of the devices,
the historical data including a value indicating the status of the each of the devices, a time at which the historical data is generated, a monitoring subject ID assigned to the each of the devices whose status is indicated by the historical data, and a monitoring item ID indicating a meaning of the value indicating the status,
the management server comprising:
a processor;
a memory; and
an interface,
the management method comprising:
storing, by the processor, in the memory, when receiving, via the interface, an input request requesting an output of historical data, an access log including at least one of an input request time, the monitoring subject ID included in the output of the historical data requested, or the monitoring item ID included in the output of the historical data requested;
storing, by the processor, in the memory, when an incident indicating one of a failure that has occurred in the each of the devices and prediction of the failure, incident data including at least one of an incident occurrence time, a monitoring subject ID assigned to the each of the devices where the incident has occurred, or a monitoring item ID for which the incident has occurred;
associating, by the processor, the incident data with the access log;
updating, by the processor, data included in the access log to a string of characters abstracted by a predetermined rule in accordance with the incident data associated with the access log and the access log;
generating, by the processor, an abstract access log including the data updated to the abstracted string of characters;
identifying, by the processor, when receiving, via the interface, an input value indicating first incident data, at least one first abstract access log from the generated abstract access log based on the first incident data;
identifying, by the processor, based on the first abstract access log and the first incident data, a condition for the output of the historical data, the condition including at least one of pieces of data including a generation time of the historical data, a monitoring subject ID included in the historical data, and a monitoring item ID included in the historical data; and outputting, by the processor, the identified condition for the historical data.

14. The management method according to claim 13, further comprising:

identifying, by the processor, when receiving, via the interface, the input value indicating first incident data, second incident data similar to the first incident data from the incident data stored in the memory;

identifying, by the processor, at least one first access log associated with the second incident data from the access logs stored in the memory; and identifying, by the processor, the abstract access log as the first abstract access log, the abstract access log being generated in accordance with the first access log and the second incident data.

15. The management method according to claim 13, wherein:

the abstract access log includes an incident ID indicating the incident data associated with the access log updated with the abstracted string of characters; and the management method further comprises:

updating, by the processor, when storing, in the memory via the interface, the first incident data, data included in the first incident data to at least one string of characters abstracted by a predetermined rule;

generating, by the processor, at least one piece of first abstract incident data including the data updated to the abstracted string of characters, and the incident ID indicating the first incident data;

identifying, by the processor, when receiving, via the interface, the input value indicating the first incident data, the first abstract incident data; and identifying, by the processor, at least one second abstract access log including the incident ID included in the identified first abstract incident data as the first abstract access log.

* * * * *